United States Patent
Chen et al.

(10) Patent No.: US 11,550,447 B2
(45) Date of Patent: Jan. 10, 2023

(54) APPLICATION MENU FOR VIDEO SYSTEM

(71) Applicant: Apple Inc., Cupertino, CA (US)

(72) Inventors: Elbert D. Chen, Cupertino, CA (US); Joe Howard, San Jose, CA (US); Joshua McGlinn, Mooresville, NC (US); Jonathan Lochhead, Scotts Valley, CA (US); Benjamin W. Keighran, Palo Alto, CA (US); Marcel Van Os, San Francisco, CA (US); William M. Bachman, San Jose, CA (US); Jeffrey L. Robbin, Los Altos, CA (US); Jennifer L. C. Folse, San Francisco, CA (US); Lynne Kress, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/187,572

(22) Filed: Feb. 26, 2021

(65) Prior Publication Data

US 2021/0181907 A1 Jun. 17, 2021

Related U.S. Application Data

(63) Continuation of application No. 16/012,345, filed on Jun. 19, 2018, now Pat. No. 10,936,154, which is a
(Continued)

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 3/0485* (2013.01); *G06F 3/04817* (2013.01); *G06F 3/04842* (2013.01)

(58) Field of Classification Search
CPC ............... G06F 3/0482; G06F 3/04817; G06F 3/04842; G06F 3/0485
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 101635768 A | 1/2010 |
| CN | 102768605 A | 11/2012 |

(Continued)

OTHER PUBLICATIONS

Final Office Action received for U.S. Appl. No. 14/747,849, dated Feb. 7, 2018, 16 pages.
(Continued)

*Primary Examiner* — Tadesse Hailu
(74) *Attorney, Agent, or Firm* — Kubota & Basol LLP

(57) ABSTRACT

The invention is directed to an electronic device. The electronic device generates for presentation on a display a user interface including a plurality of groups of icons. A plurality of the icons have been grouped based at least in part on metadata of applications associated with the icons. The electronic device receives input selecting a respective icon. In response to receiving the input selecting a respective icon, the electronic device invokes an instance of an application associated with the respective icon.

18 Claims, 62 Drawing Sheets

Related U.S. Application Data continuation of application No. 14/747,849, filed on Jun. 23, 2015, now Pat. No. 10,067,643.

(60) Provisional application No. 62/016,601, filed on Jun. 24, 2014.

(51) Int. Cl.
*G06F 3/0485* (2022.01)
*G06F 3/04842* (2022.01)

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,141,010 A | 10/2000 | Hoyle |
| 6,188,391 B1 | 2/2001 | Seely et al. |
| 6,310,610 B1 | 10/2001 | Beaton et al. |
| 6,323,846 B1 | 11/2001 | Westerman et al. |
| 6,570,557 B1 | 5/2003 | Westerman et al. |
| 6,677,932 B1 | 1/2004 | Westerman |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,600,192 B1 | 10/2009 | Hashimoto et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 3,006,002 A1 | 8/2011 | Kalayjian et al. |
| 8,239,784 B2 | 8/2012 | Hotelling et al. |
| 8,271,898 B1 | 9/2012 | Mattos et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,745,513 B2 | 6/2014 | Crystal |
| 9,176,620 B2 | 11/2015 | Ryu et al. |
| 9,280,589 B2 | 3/2016 | Arend et al. |
| 9,348,458 B2 | 5/2016 | Hotelling et al. |
| 9,529,440 B2 * | 12/2016 | Piemonte .............. G06T 19/003 |
| 9,933,937 B2 | 4/2018 | Lemay et al. |
| 2002/0015024 A1 | 2/2002 | Westerman et al. |
| 2004/0044723 A1 | 3/2004 | Bell et al. |
| 2005/0190059 A1 | 9/2005 | Wehrenberg |
| 2006/0017692 A1 | 1/2006 | Wehrenberg et al. |
| 2006/0020900 A1 | 1/2006 | Kumagai et al. |
| 2006/0033724 A1 | 2/2006 | Chaudhri et al. |
| 2006/0197753 A1 | 9/2006 | Hotelling |
| 2007/0143702 A1 | 6/2007 | Maggi |
| 2007/0161868 A1 | 7/2007 | Root |
| 2008/0307350 A1 | 12/2008 | Sabatelli et al. |
| 2008/0307351 A1 | 12/2008 | Louch et al. |
| 2009/0034931 A1 | 2/2009 | Stone et al. |
| 2009/0150775 A1 | 6/2009 | Miyazaki et al. |
| 2009/0259971 A1 | 10/2009 | Rankine et al. |
| 2010/0002013 A1 | 1/2010 | Kagaya |
| 2010/0023858 A1 | 1/2010 | Ryu et al. |
| 2010/0058244 A1 | 3/2010 | Wang |
| 2010/0214237 A1 | 8/2010 | Echeverri et al. |
| 2010/0262938 A1 | 10/2010 | Woods et al. |
| 2011/0041096 A1 | 2/2011 | Larco et al. |
| 2011/0060988 A1 | 3/2011 | Mysliwy et al. |
| 2011/0074699 A1 | 3/2011 | Marr et al. |
| 2012/0110483 A1 | 5/2012 | Arcese et al. |
| 2012/0185456 A1 | 7/2012 | Hart et al. |
| 2012/0192056 A1 | 7/2012 | Migos et al. |
| 2012/0192117 A1 * | 7/2012 | Migos ................ G06F 3/04883 345/173 |
| 2012/0240044 A1 * | 9/2012 | Johnson ............... G06F 3/0481 715/769 |
| 2012/0242598 A1 | 9/2012 | Won et al. |
| 2012/0262386 A1 | 10/2012 | Kwon et al. |
| 2012/0266106 A1 | 10/2012 | Asaimuthu |
| 2013/0055127 A1 | 2/2013 | Saito et al. |
| 2013/0103550 A1 | 4/2013 | Nygaard et al. |
| 2013/0127921 A1 | 5/2013 | Funabashi et al. |
| 2013/0204862 A1 | 8/2013 | Marchiori |
| 2013/0290886 A1 | 10/2013 | Chen et al. |
| 2013/0321340 A1 | 12/2013 | Seo et al. |
| 2013/0326557 A1 | 12/2013 | Kang et al. |
| 2013/0342580 A1 | 12/2013 | Arend et al. |
| 2014/0009273 A1 | 1/2014 | Grant et al. |
| 2014/0022192 A1 | 1/2014 | Hatanaka |
| 2014/0026166 A1 | 1/2014 | Jeong |
| 2014/0078078 A1 | 3/2014 | Lee et al. |
| 2014/0096092 A1 * | 4/2014 | Johnson .............. G06F 3/04883 715/863 |
| 2014/0130098 A1 | 5/2014 | Kim et al. |
| 2014/0152597 A1 | 6/2014 | Lee |
| 2014/0189608 A1 | 7/2014 | Shuttleworth et al. |
| 2014/0317500 A1 | 10/2014 | Kim et al. |
| 2014/0324873 A1 | 10/2014 | Lee |
| 2014/0362056 A1 * | 12/2014 | Zambetti ............... G06F 3/0485 345/179 |
| 2015/0067559 A1 * | 3/2015 | Missig .................. G06F 3/0481 715/765 |
| 2015/0067601 A1 * | 3/2015 | Bernstein .............. G06F 3/0412 715/823 |
| 2015/0205475 A1 | 7/2015 | Donelan et al. |
| 2015/0212580 A1 | 7/2015 | Tabone |
| 2015/0229987 A1 | 8/2015 | Kim et al. |
| 2015/0277711 A1 | 10/2015 | Masterson et al. |
| 2015/0370425 A1 | 12/2015 | Chen et al. |
| 2017/0357409 A1 * | 12/2017 | Wagner ................. G06F 3/0488 |
| 2018/0300025 A1 | 10/2018 | Chen et al. |

FOREIGN PATENT DOCUMENTS

| | | |
|---|---|---|
| CN | 103348669 A | 10/2013 |
| EP | 2172837 A2 | 4/2010 |
| EP | 2325741 A2 | 5/2011 |
| EP | 2631738 A1 | 8/2013 |
| GB | 2361612 A | 10/2001 |
| JP | 2000-163031 A | 6/2000 |
| JP | 2002-342033 A | 11/2002 |
| WO | 2013/169849 A2 | 11/2013 |
| WO | 2013/169870 A1 | 11/2013 |
| WO | 2014/105276 A1 | 7/2014 |
| WO | 2015/200365 A1 | 12/2015 |

OTHER PUBLICATIONS

International Search Report received for U.S Patent Application No. PCT/US2015/037254 dated Sep. 2, 2015, 4 pages.
Non-Final Office Action received for U.S. Appl. No. 16/012,345, dated Dec. 23, 2019, 9 pages.
Non-Final Office Action received for U.S. Appl. No. 14/747,849, dated Jun. 26, 2017, 13 pages.
Notice of Allowance received for U.S. Appl. No. 14/747,849, dated May 1, 2018, 8 pages.
Notice of Allowance received for U.S. Appl. No. 16/012,345, dated Jun. 23, 2020, 9 pages.
Notice of Allowance received for U.S. Appl. No. 16/012,345, dated Nov. 2, 2020, 7 pages.
Bohn, Dieter, "Rebooting WebOS: How LG Rethought The Smart TV", The Verge, Available online at: <http://www.theverge.com/2014/1/6/5279220/rebooting-webos-how-lg-rethought-the-smart-tv>, Jan. 6, 2014, 5 pages.
Grey, Melissa, "Comcast's NewX2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Palm, "Handbook for the Palm™ Zire™ 71 Handheld", Available online at: <http://www.palm.com/us/support/fiandbooks/zire71/zire71hbENG.pdf> (submitted in two parts), 2003, pp. 39-45.

(56) References Cited

OTHER PUBLICATIONS

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Woods, B., "12 of the best calendar apps available for your Android smartphone today", Available online at: <https://web.archive.org/web/20130819171139/https://thenextweb.com/apps/2013/08/16/12-ofthe-best-calendar-apps-available-for-your-android-smartphone-today/>, Wavback Machine, Aug. 19, 2013, 17 pages.

Youtube, "How do I get rid of collapsible groups within a folder?", Available online at: <http://social.technet.microsof.com/Forums/windows/en-US/60fad049-78a5-434c-a3a0-ae71f85f1b4/how-do-i-get-rid-of-collapsible-groups-within-a-folder?forum=w7hproul>, Dec. 12, 2011.

Youtube, "Windows Seven Tips—Change your folder list view", Available online at: <https://www.youtube.com/watch?v=UdhF1Upkgis>, Mar. 2, 2010.

Extended European Search Report received for European Patent Application No. 21171674.1, dated Aug. 23, 2021, 9 pages.

\* cited by examiner

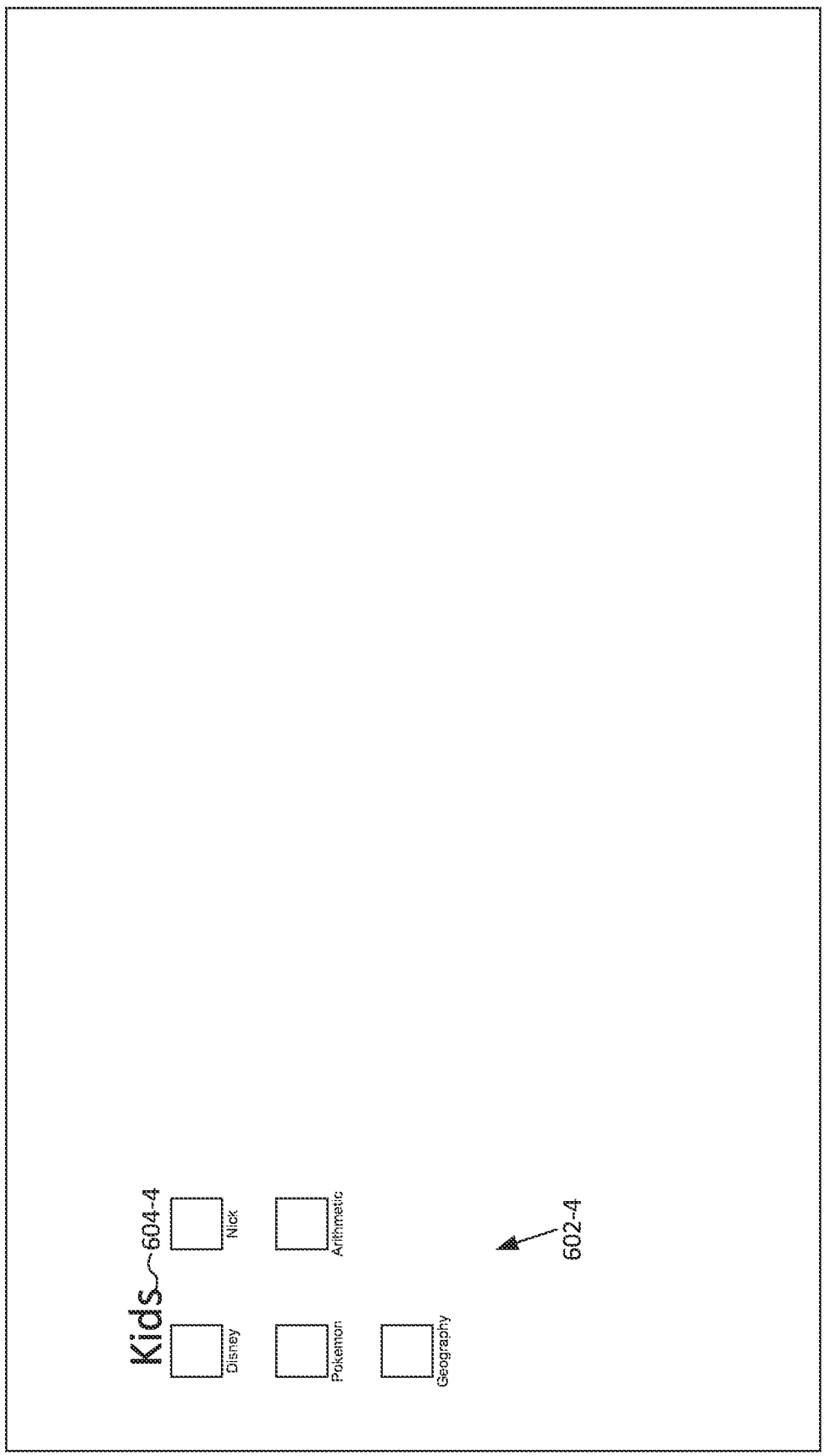

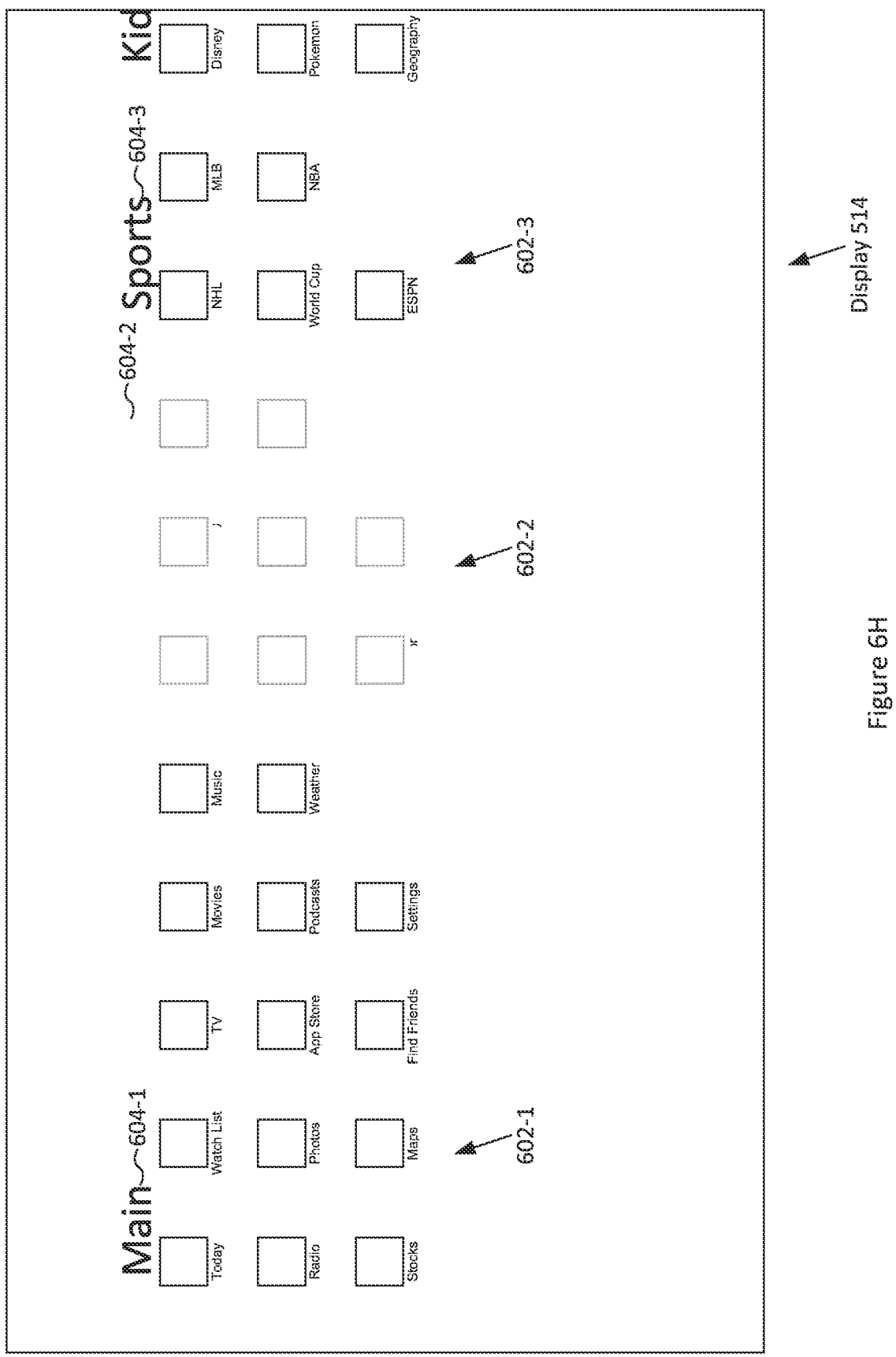

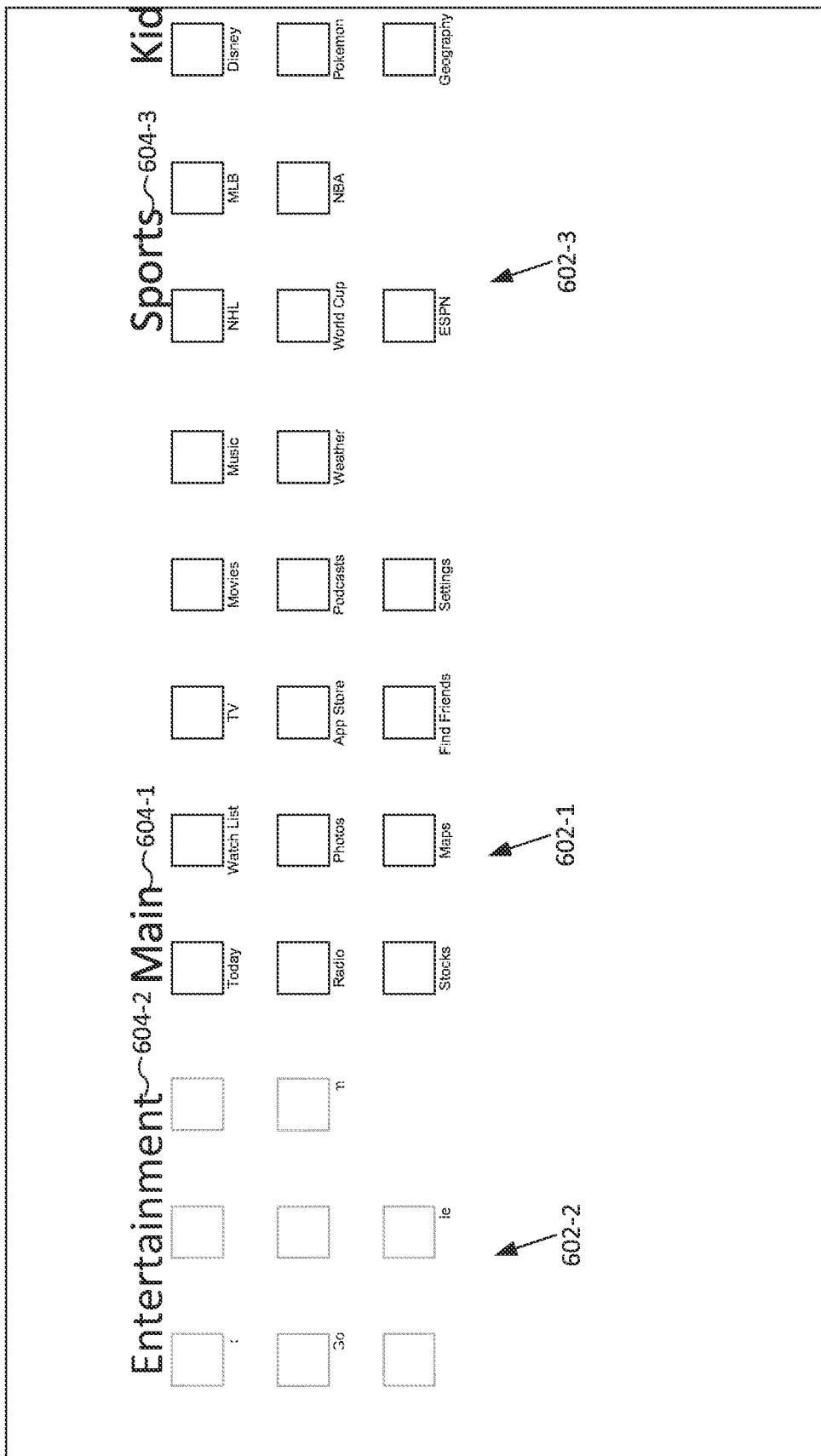

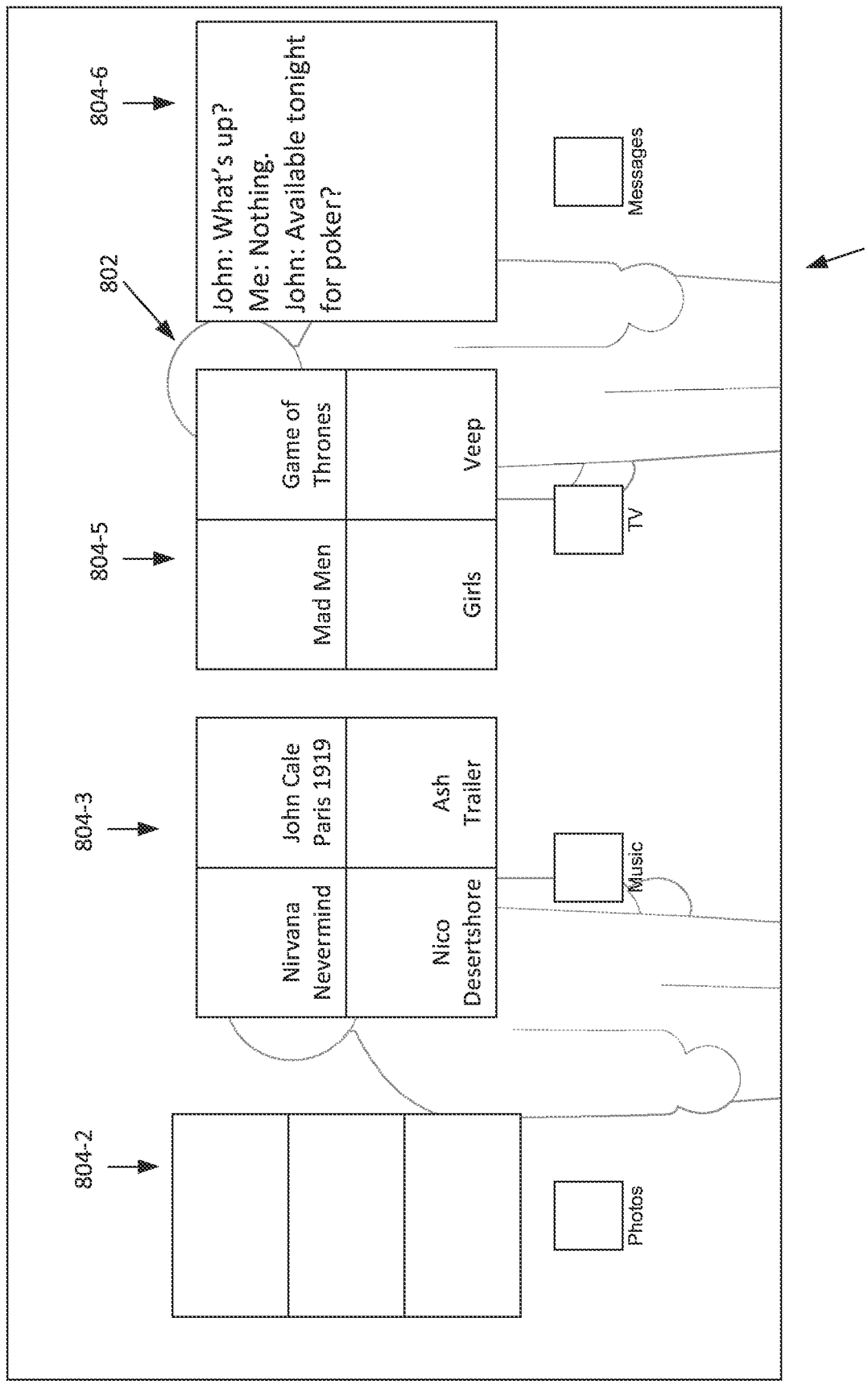

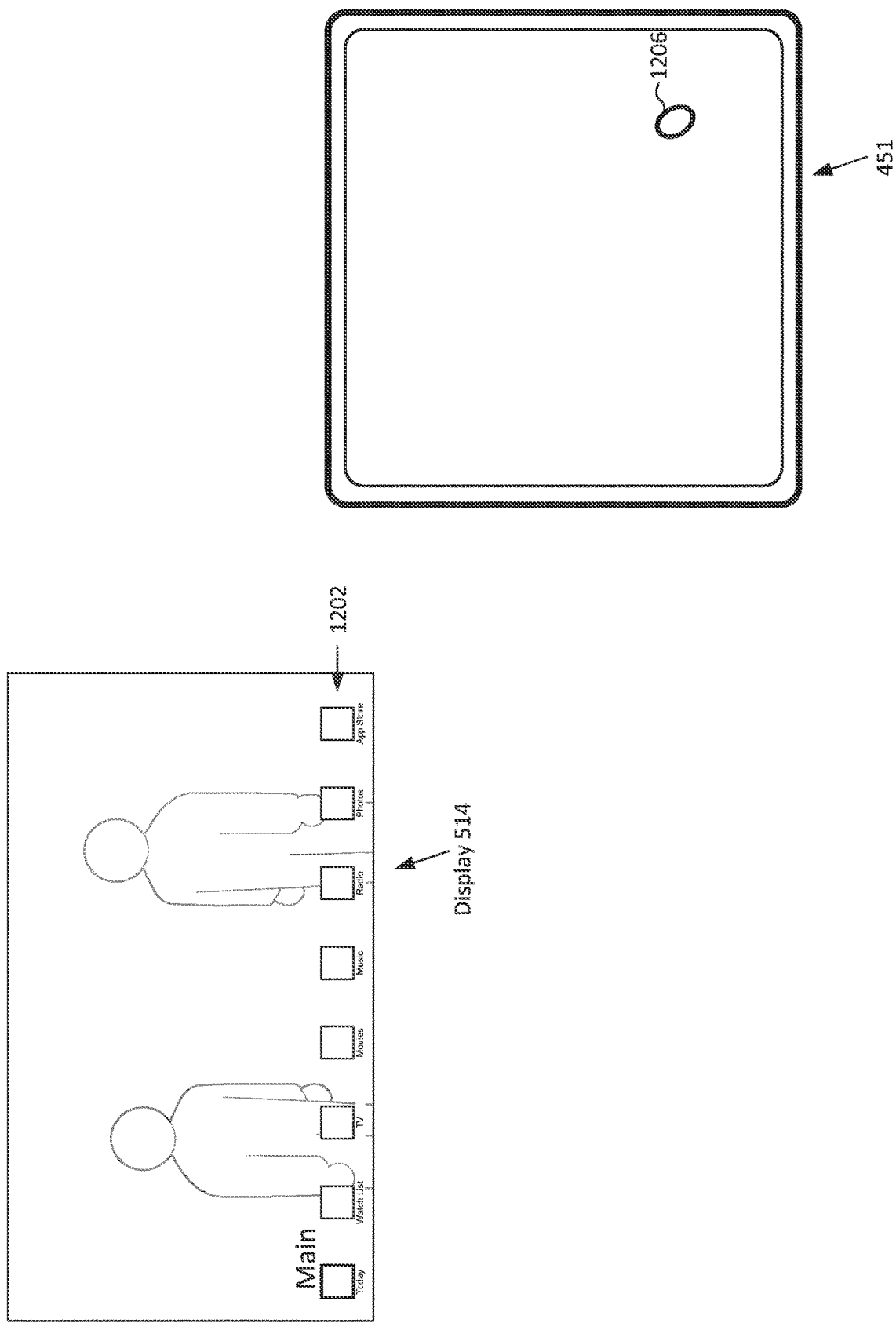

After generating the first animation portion and in accordance with a determination that second gesture criteria have been met, present a third animation portion in the user interface following the first animation portion, the first and third animation portions corresponding to the second user interface response on the display. ~1334

The first animation portion and the third animation portion are part of a single, continuous animation that corresponds to the second user interface response and is different from an animation corresponding to the first user interface response. ~1336

Figure 13C

APPLICATION MENU FOR VIDEO SYSTEM

CROSS REFERENCE TO RELATED APPLICATIONS

This application is a continuation of U.S. application Ser. No. 16/012,345, filed Jun. 19, 2018 (now U.S. Publication 2018-0300025), which is a continuation of U.S. application Ser. No. 14/747,849, filed on Jun. 23, 2015 (now U.S. Pat. No. 10,067,643), which claims the benefit of U.S. Provisional Application No. 62/016,601 filed on Jun. 24, 2014, the entire disclosures of which are incorporated herein by reference for all purposes.

FIELD OF THE DISCLOSURE

The present disclosure relates generally to a user interface for an application menu.

BACKGROUND OF THE DISCLOSURE

Many electronic devices provide user interfaces for viewing and opening applications. However, such interfaces are unwieldy or poorly organized, have clunky methods of switching between apps, and are slow to respond. Further, when the user interfaces overlay visual content they obscure a large portion of the visual content.

SUMMARY OF THE DISCLOSURE

Many electronic devices provide user interfaces for viewing and selecting applications. There is a need to provide a fast way to organize applications of an electronic device in an intuitive manner. The embodiments described below provide an intuitive way to automatically group icons associated with applications of an electronic device based on metadata associated with the applications. Further, there is a need to provide an intuitive interface for switching between content applications in an intuitive manner. The embodiments described below provide an intuitive application switching user interface including representations of states of various applications.

Many application menu user interfaces overlay on visual content. There is a need to provide an intuitive interface overlaid on visual content that obscures a minimal portion of the visual content. The embodiments below provide an intuitive way two switch from a user interface including a two-dimensional array of user interface objects to a user interface including a one-dimensional array of the same user interface objects. Finally, many user interfaces animate based on different inputs. There is a need to provide an intuitive interface that begins such animations before input is complete. The embodiments below provide an intuitive interface that seems to anticipate user intention before input is complete by beginning an animation portion that is common to two or more user interface responses.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 8A-8D illustrate an exemplary application switching user interface in accordance with some embodiments of the disclosure.

FIGS. 12A-12F illustrate an exemplary user interface using a first animation portion to transition to either a first or second user interface response in accordance with some embodiments of the disclosure.

FIGS. 13A-13C are flow diagrams illustrating a method of using a first animation portion to transition to either a first or second user interface response in accordance with some embodiments.

DETAILED DESCRIPTION

Figure 1A:
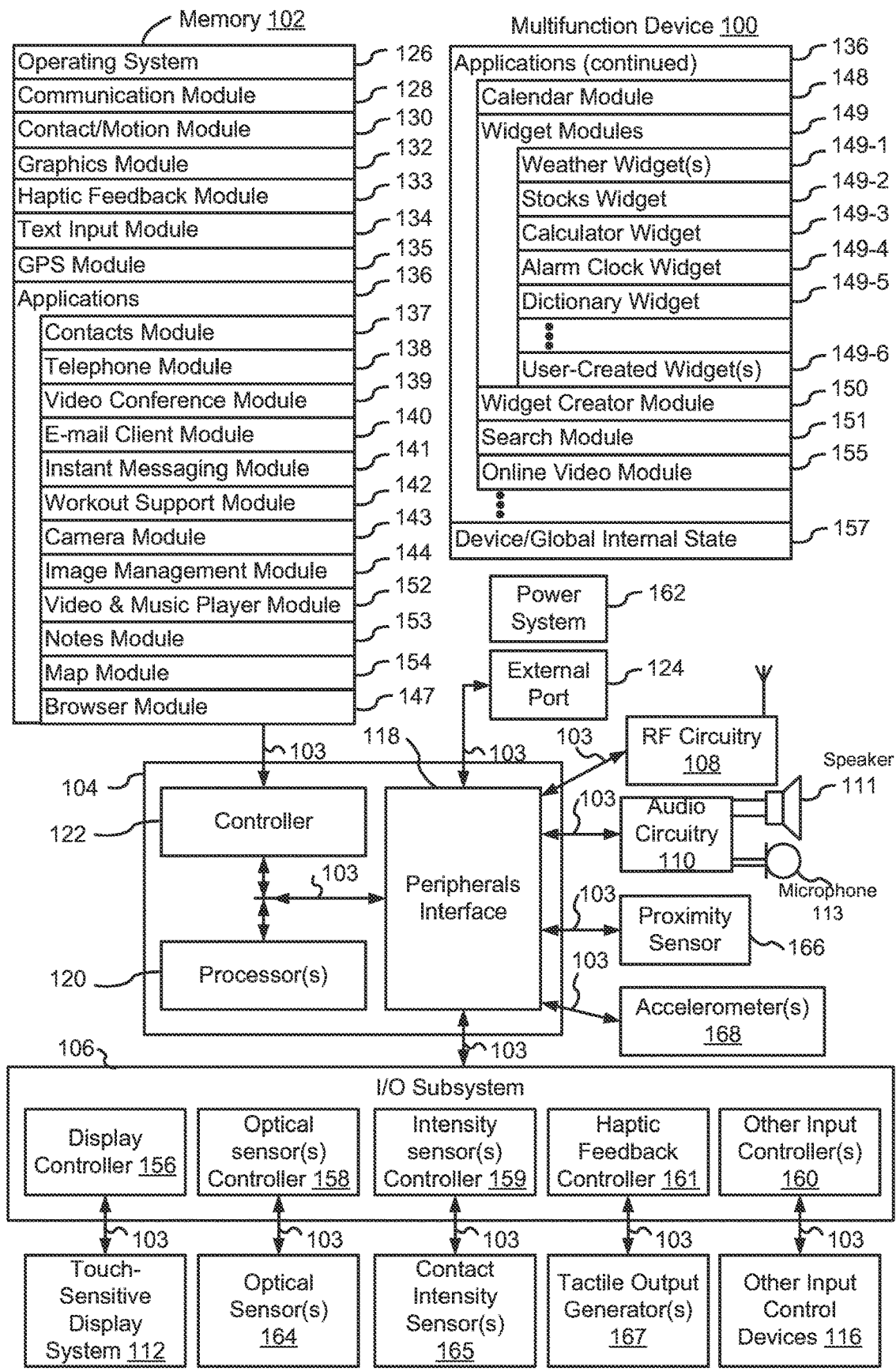
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
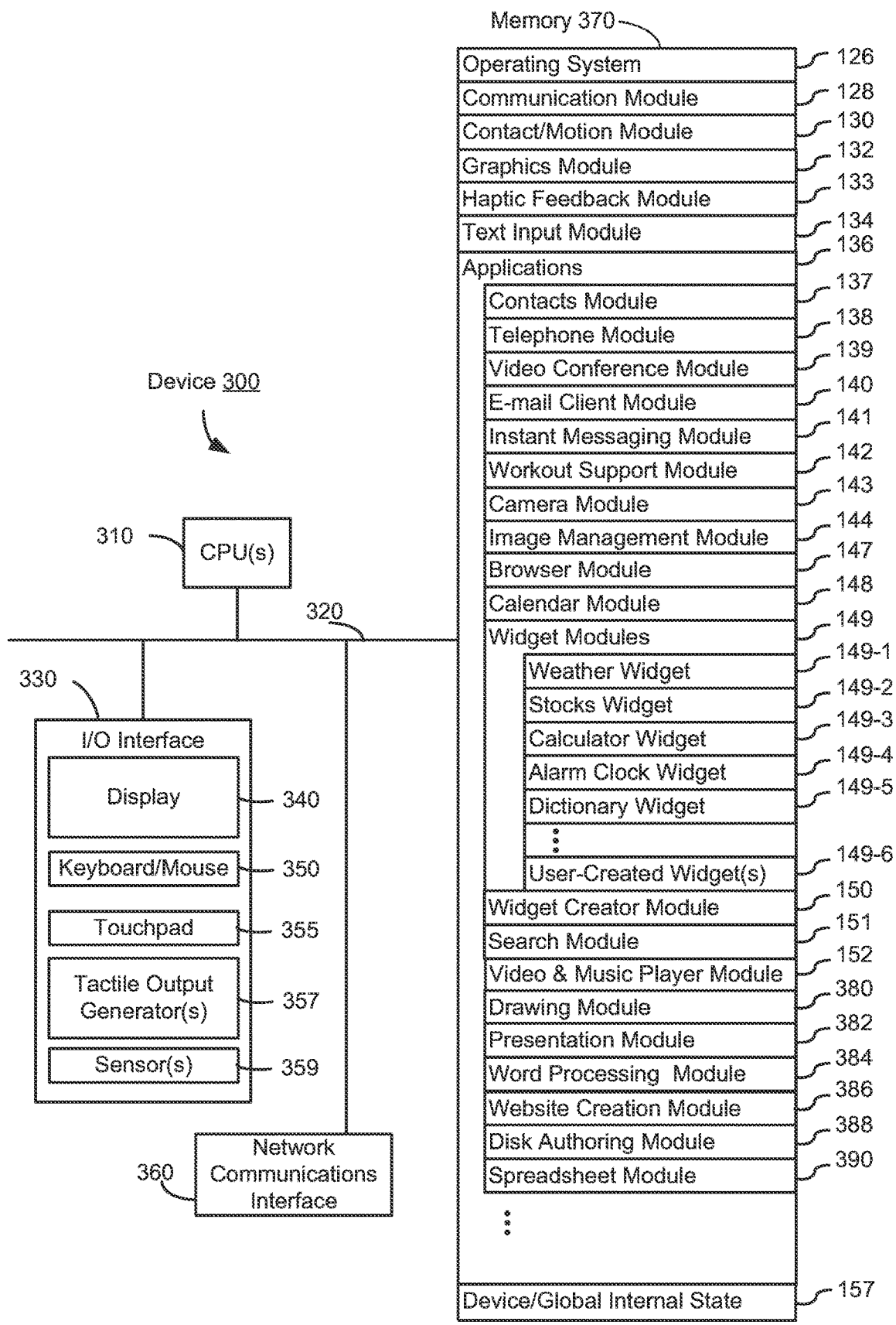
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154;
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
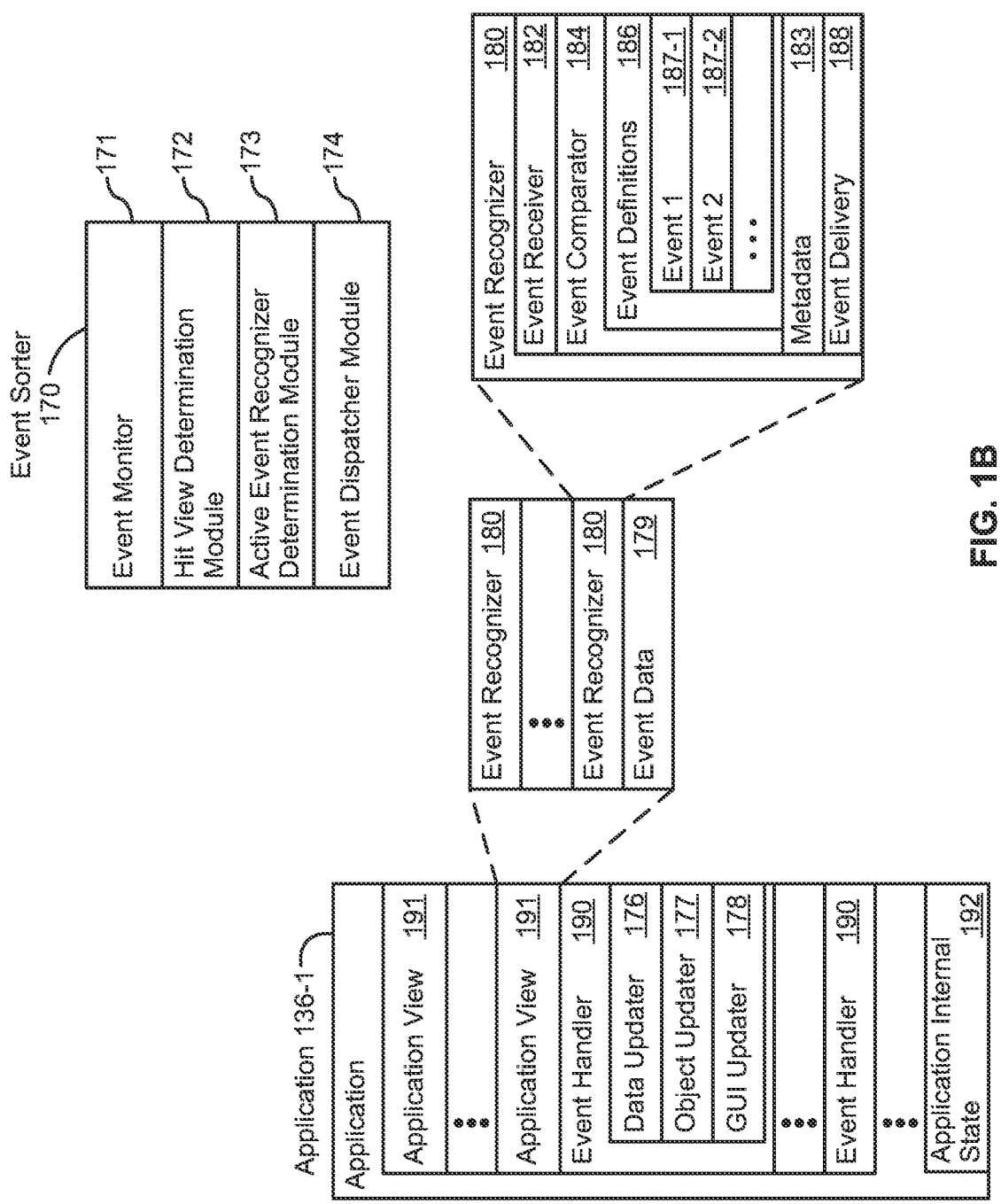
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
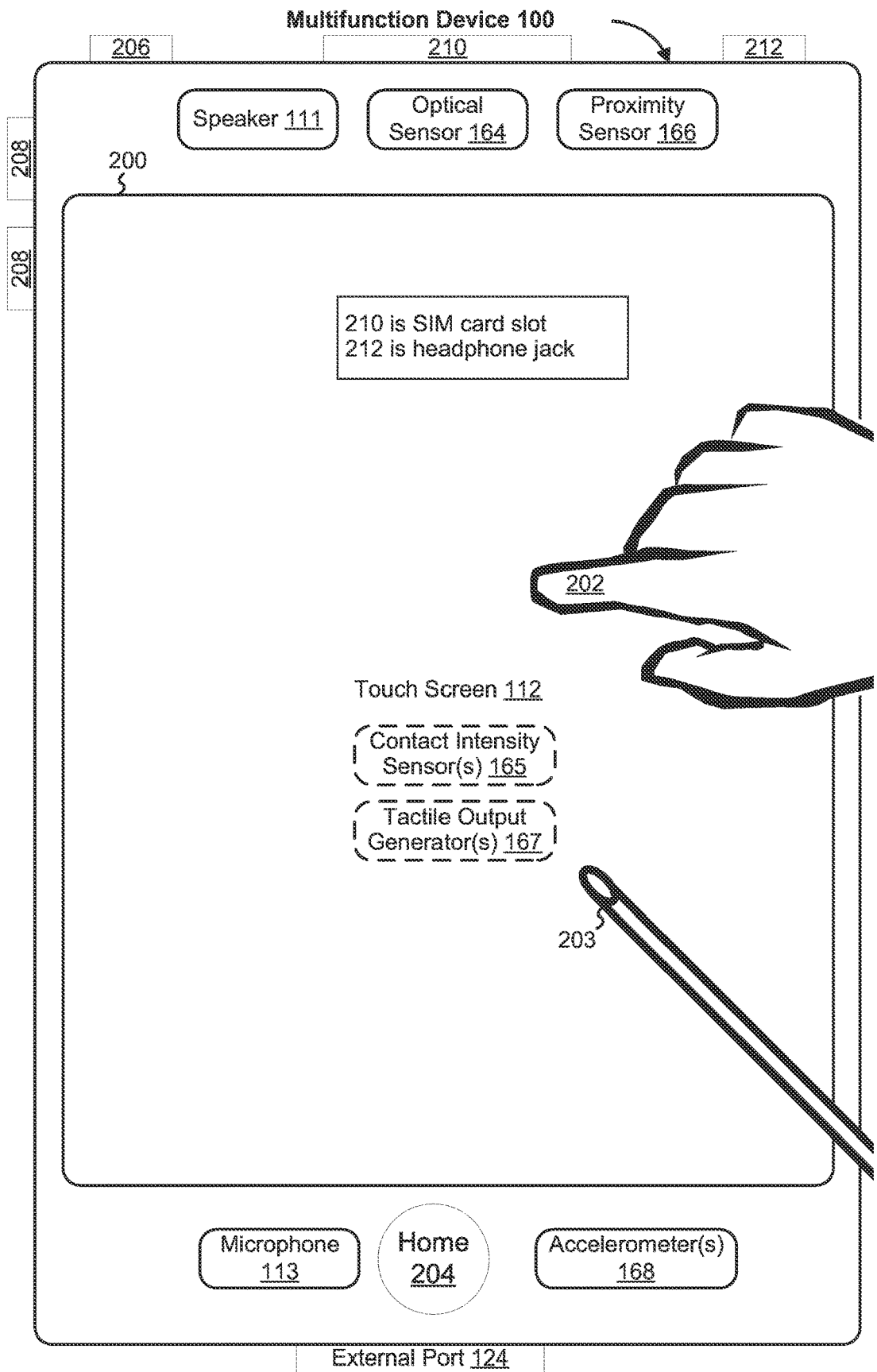
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
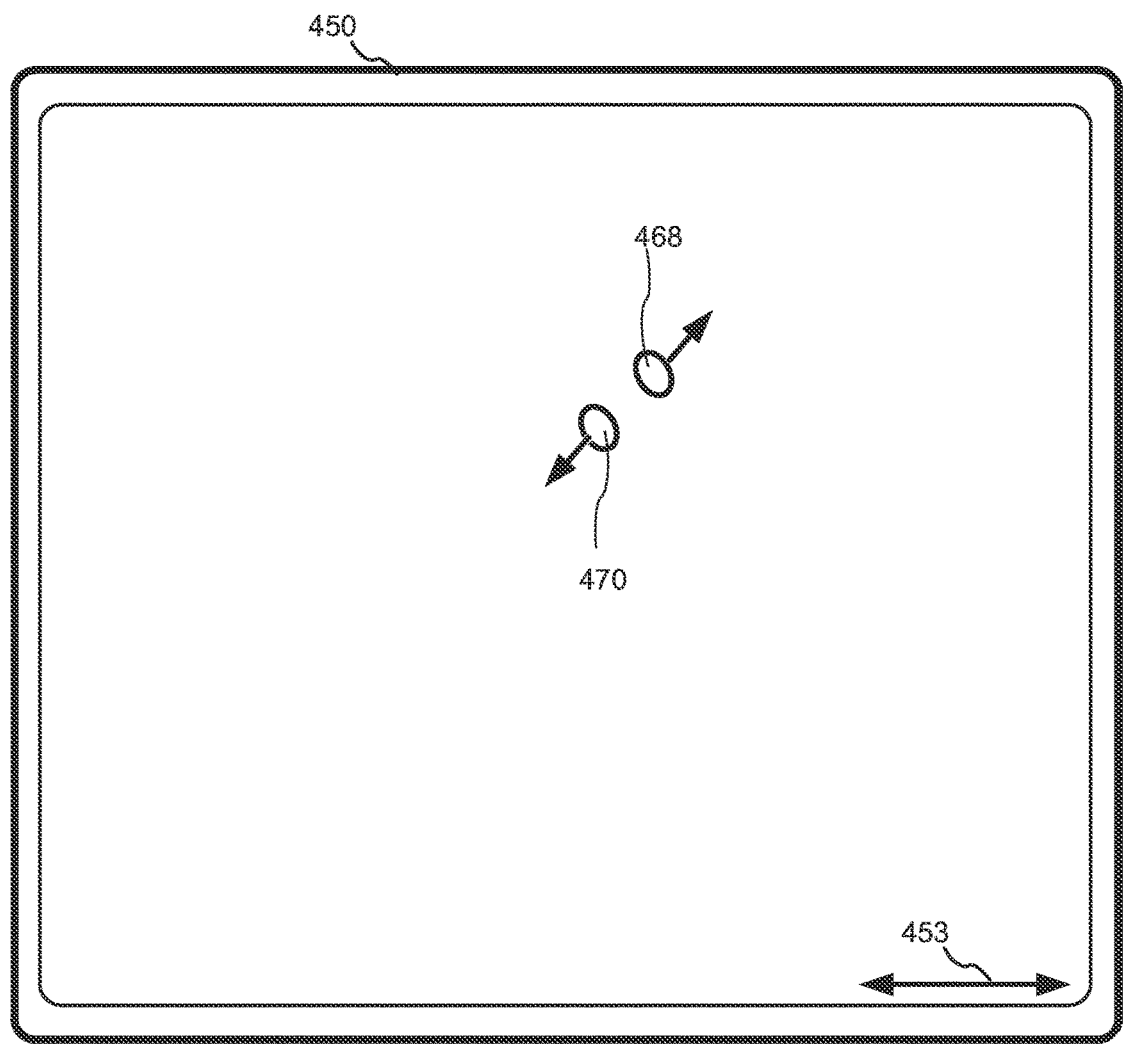
FIG. 4 illustrates an exemplary user interface for a multifunction device with a touch-sensitive surface that is separate from the display in accordance with some embodiments.
Figure 4:
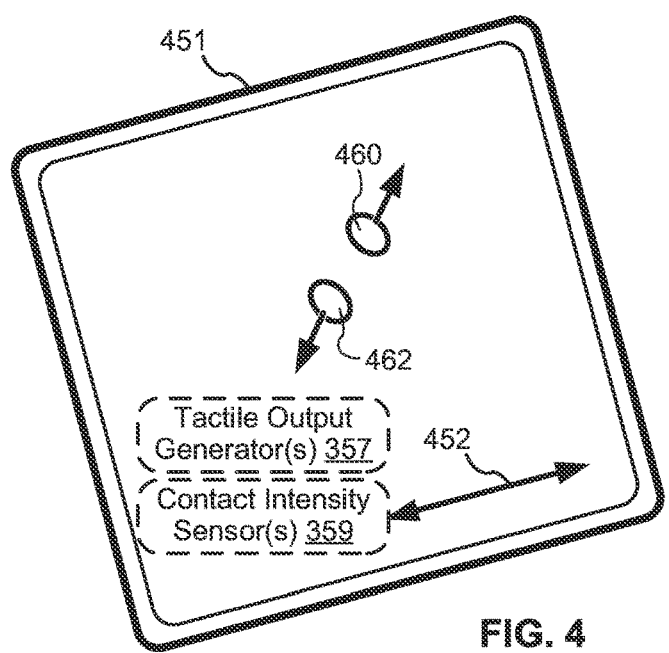

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
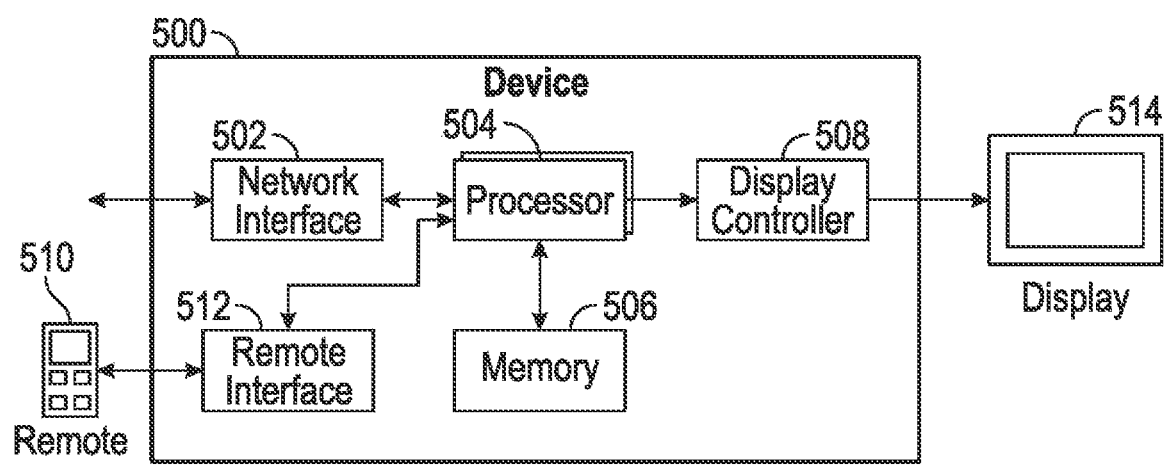
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, and/or 1500).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

User Interfaces and Associated Processes

Automatic Grouping of Icons

Many electronic devices provide user interfaces for viewing and selecting applications. There is a need to provide a fast way to organize applications of an electronic device in an intuitive manner. The embodiments described below provide an intuitive way to automatically group icons associated with applications of an electronic device based on metadata associated with the applications.

Figure 6A:
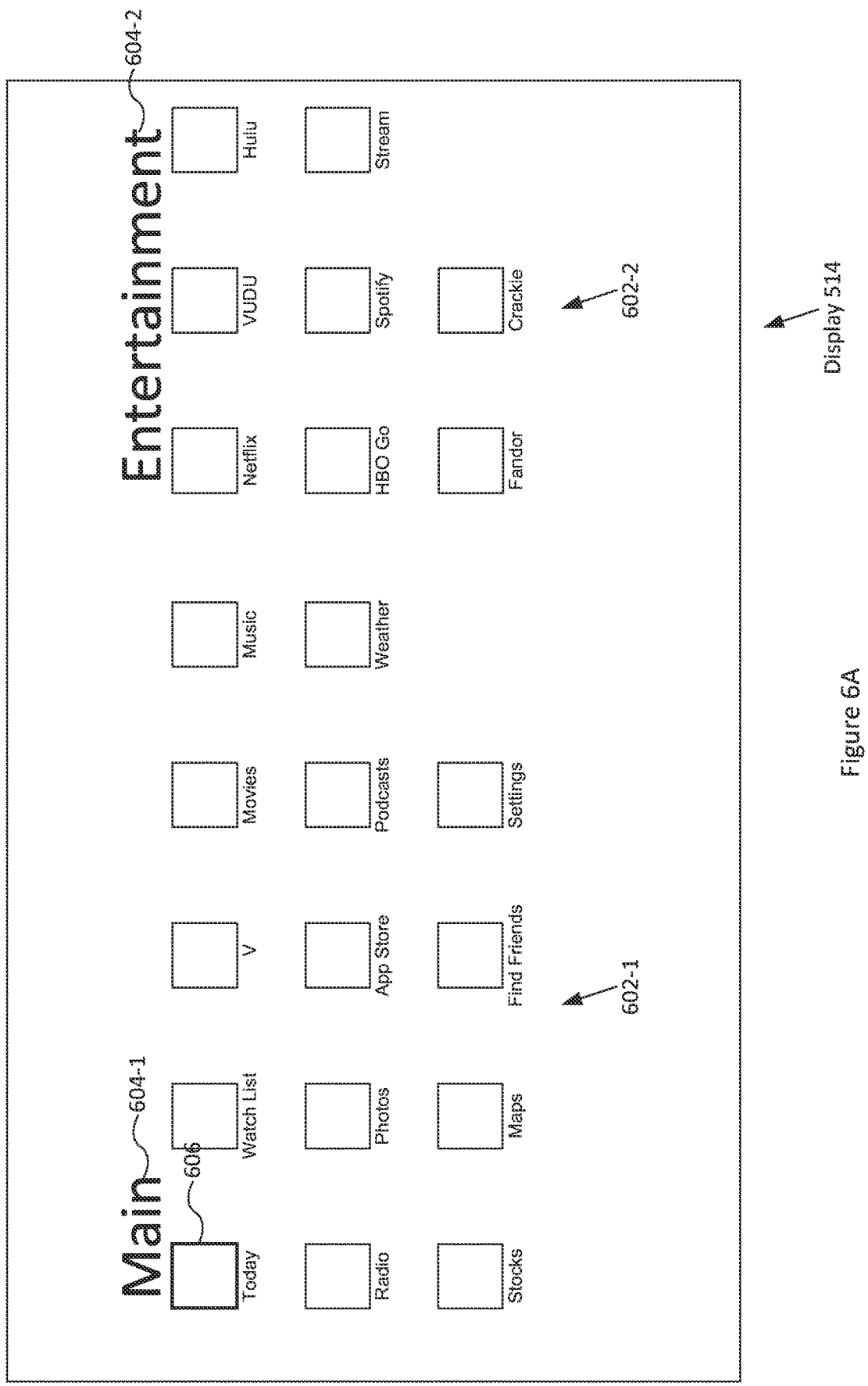
FIGS. 6A-6S illustrate an exemplary user interface for automatically grouping icons in accordance with some embodiments of the disclosure.
Figure 6B:
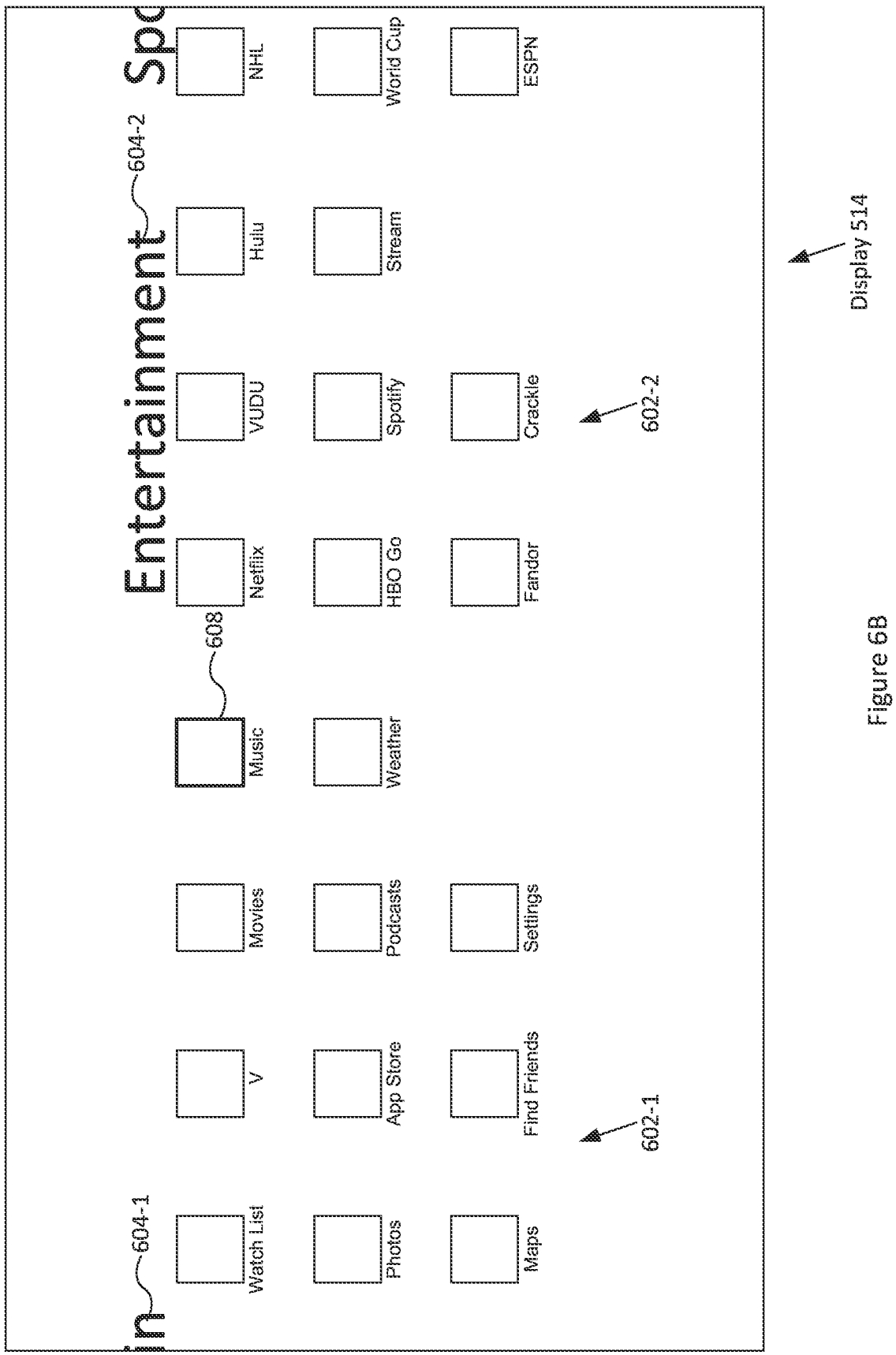
Figure 6C:
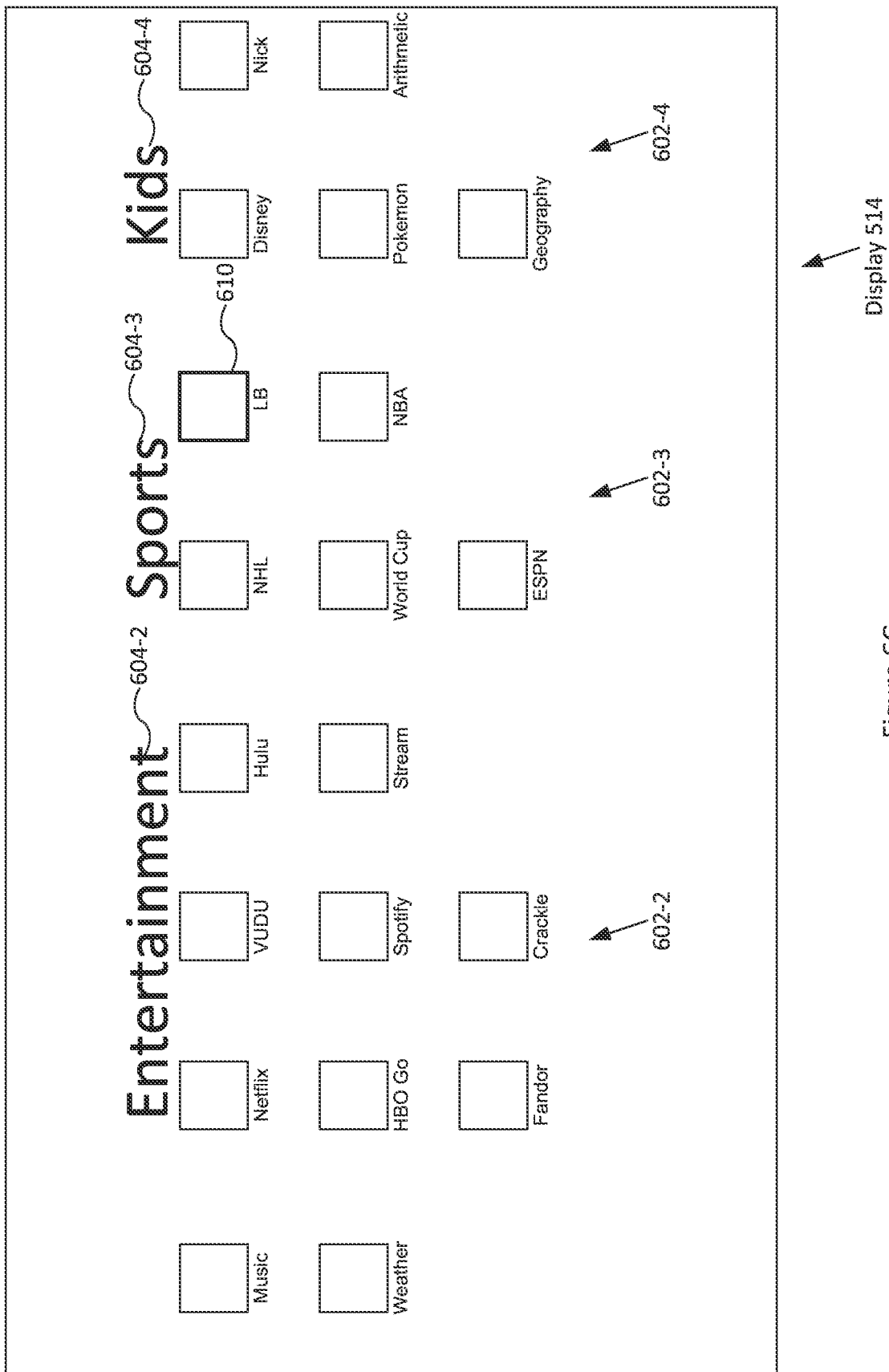
Figure 6D:
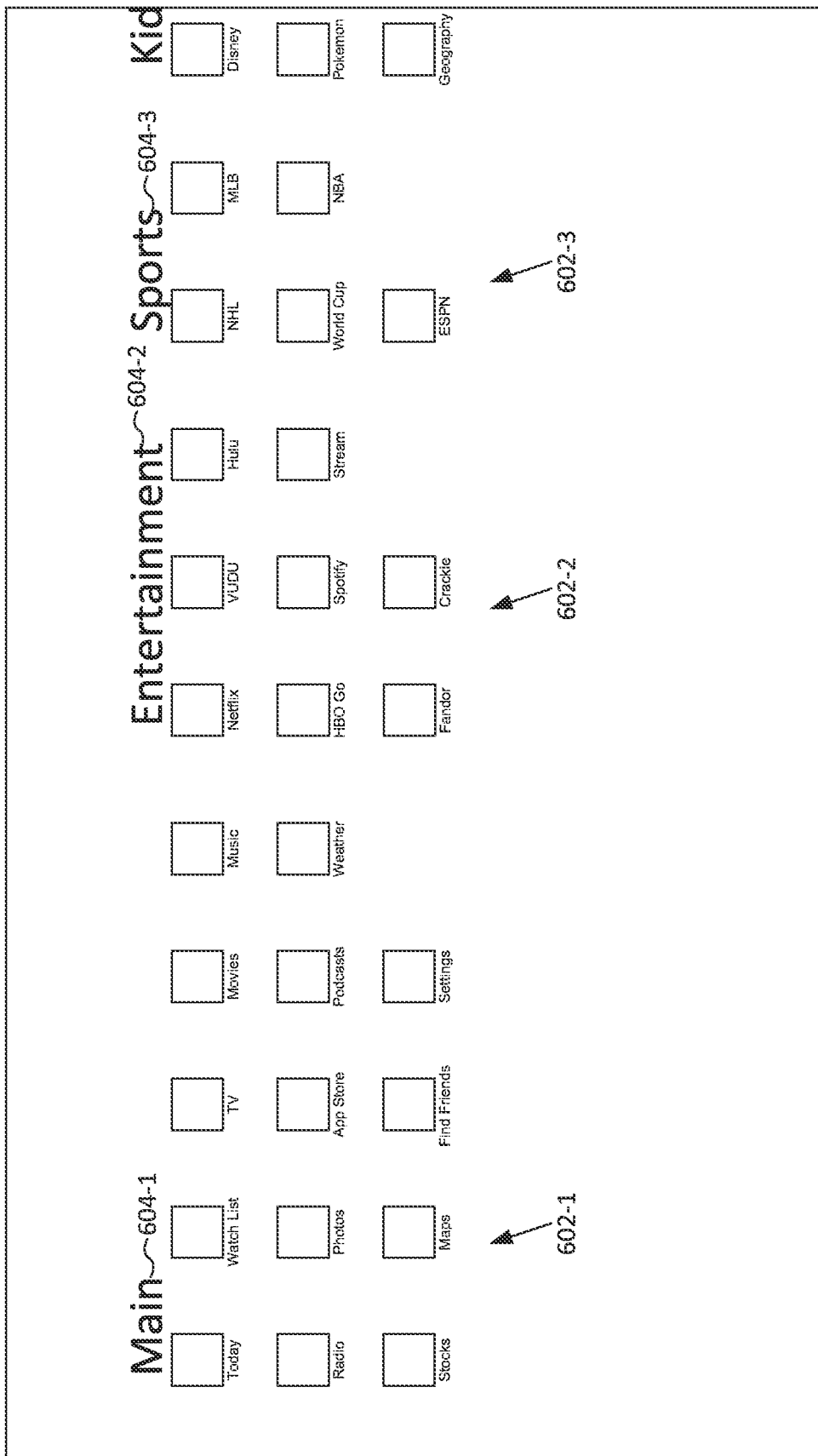
Figure 6E:
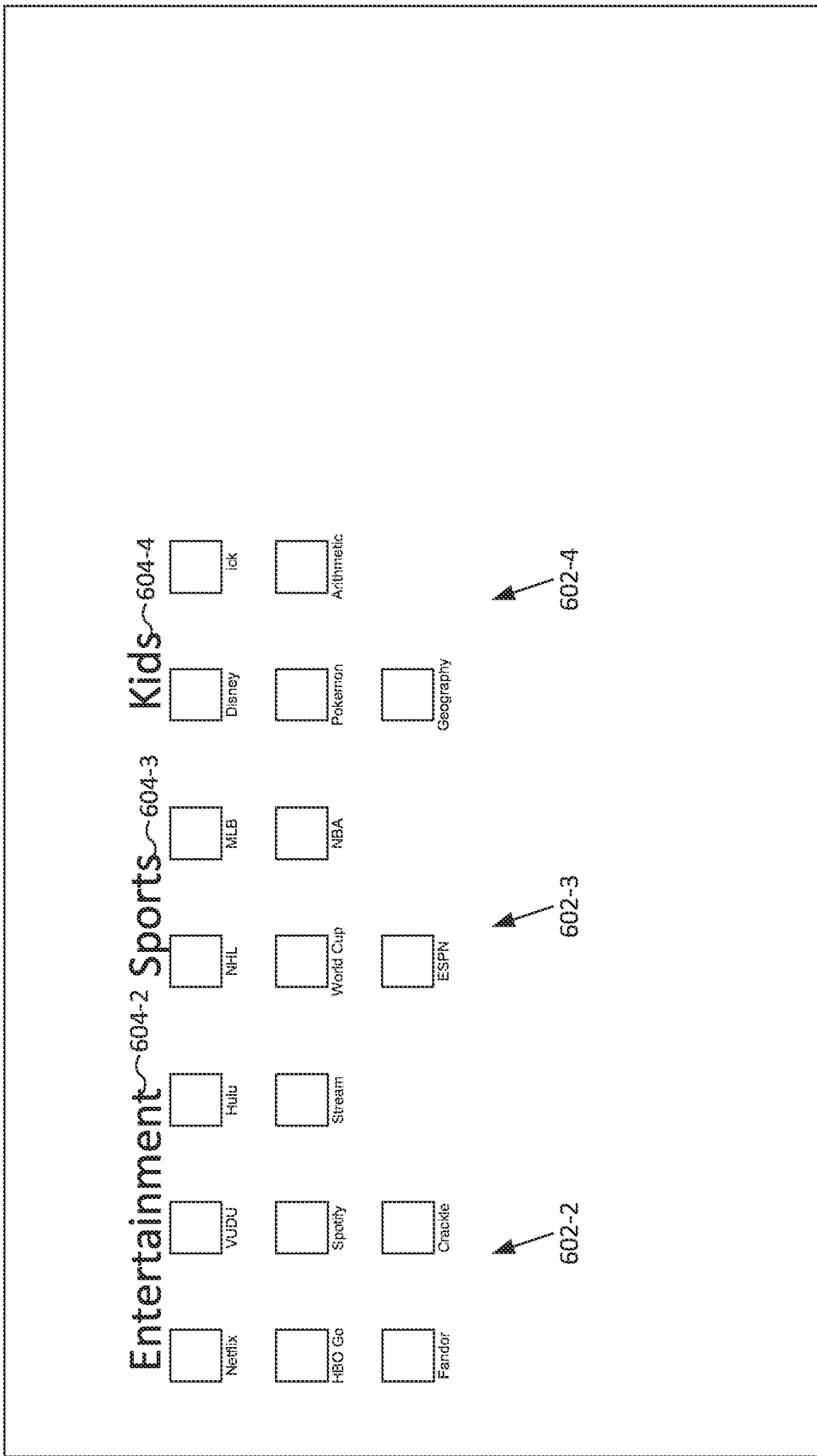
Figure 6F:
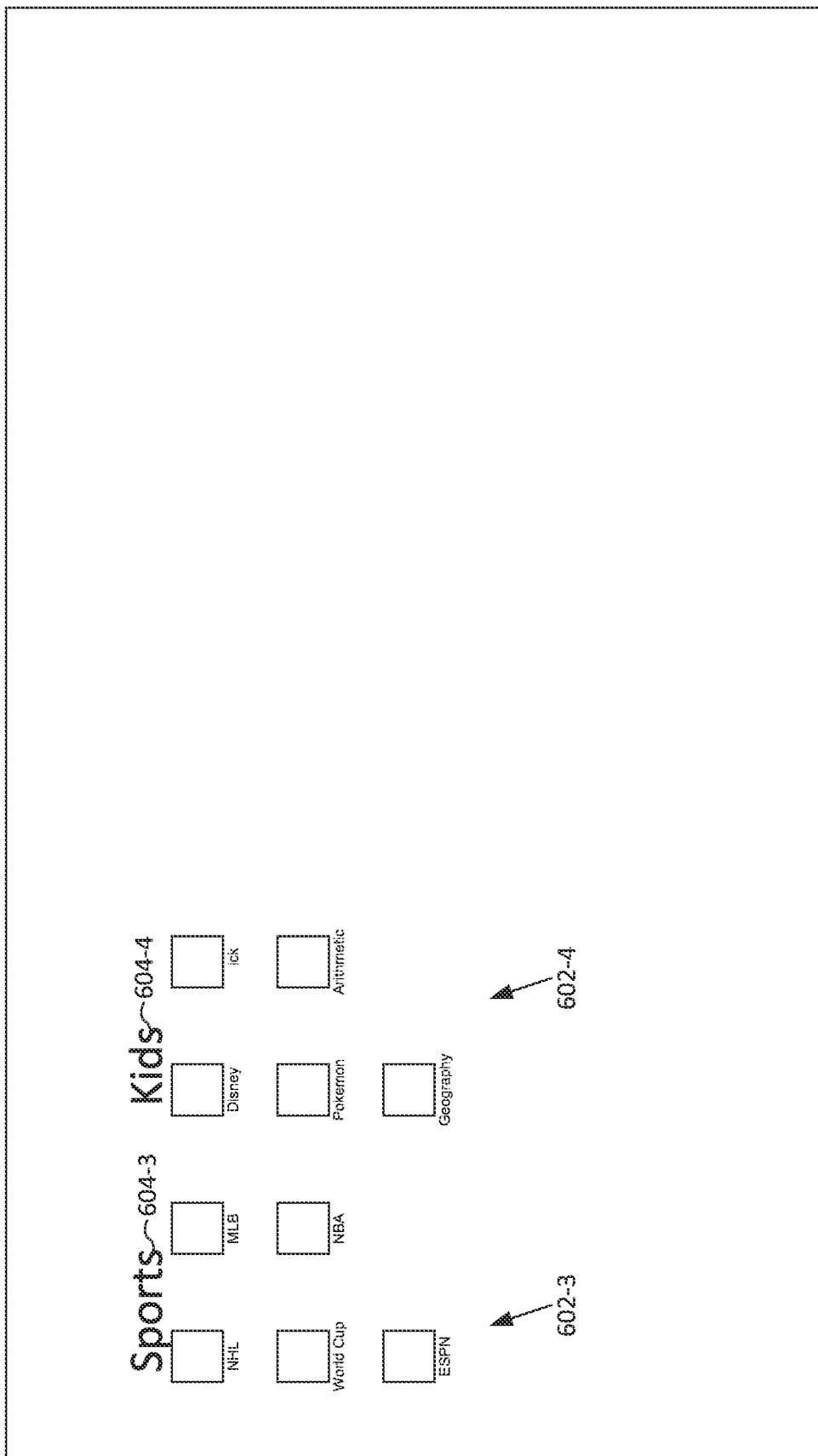
Figure 6I:
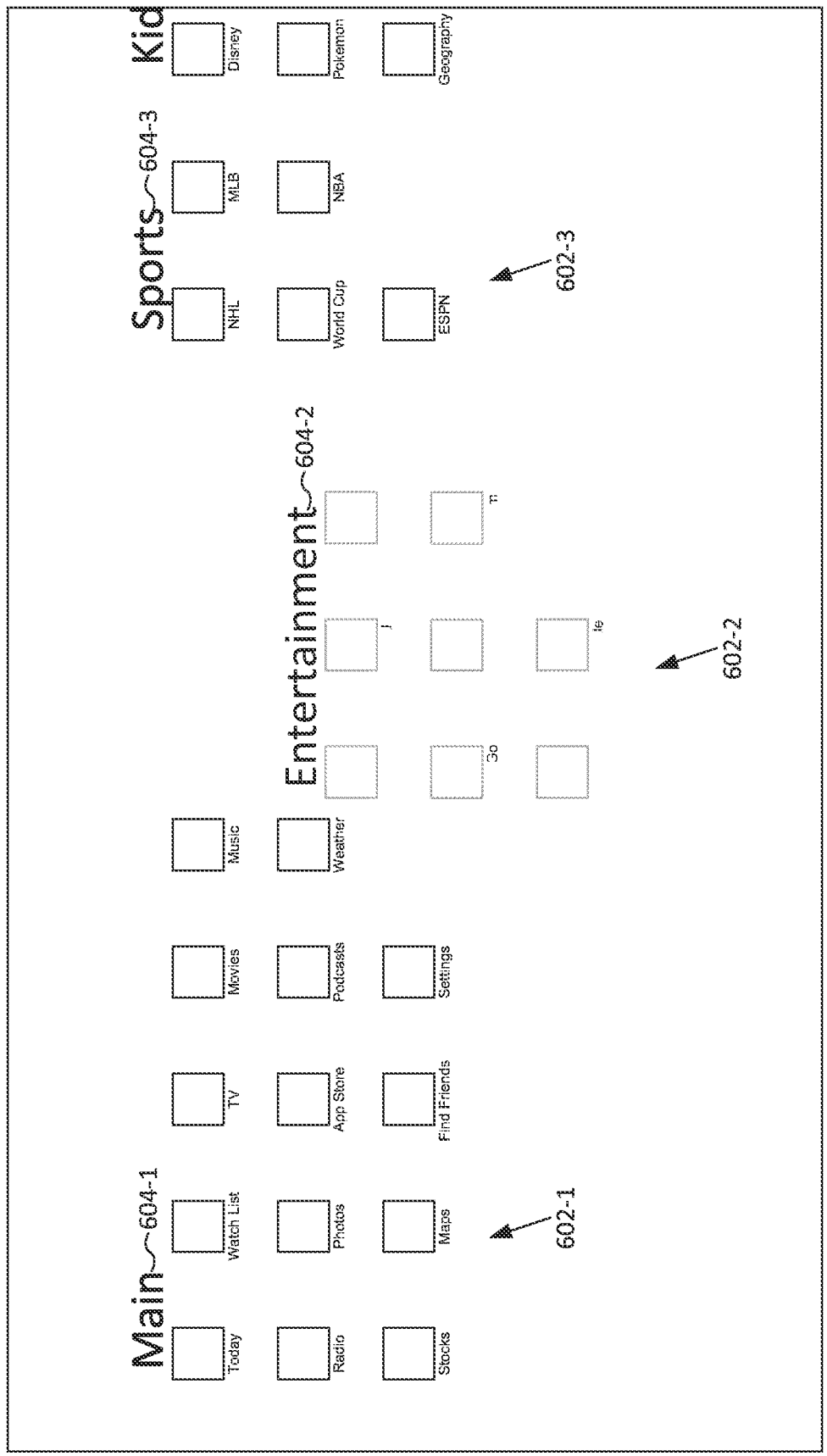
Figure 6J:
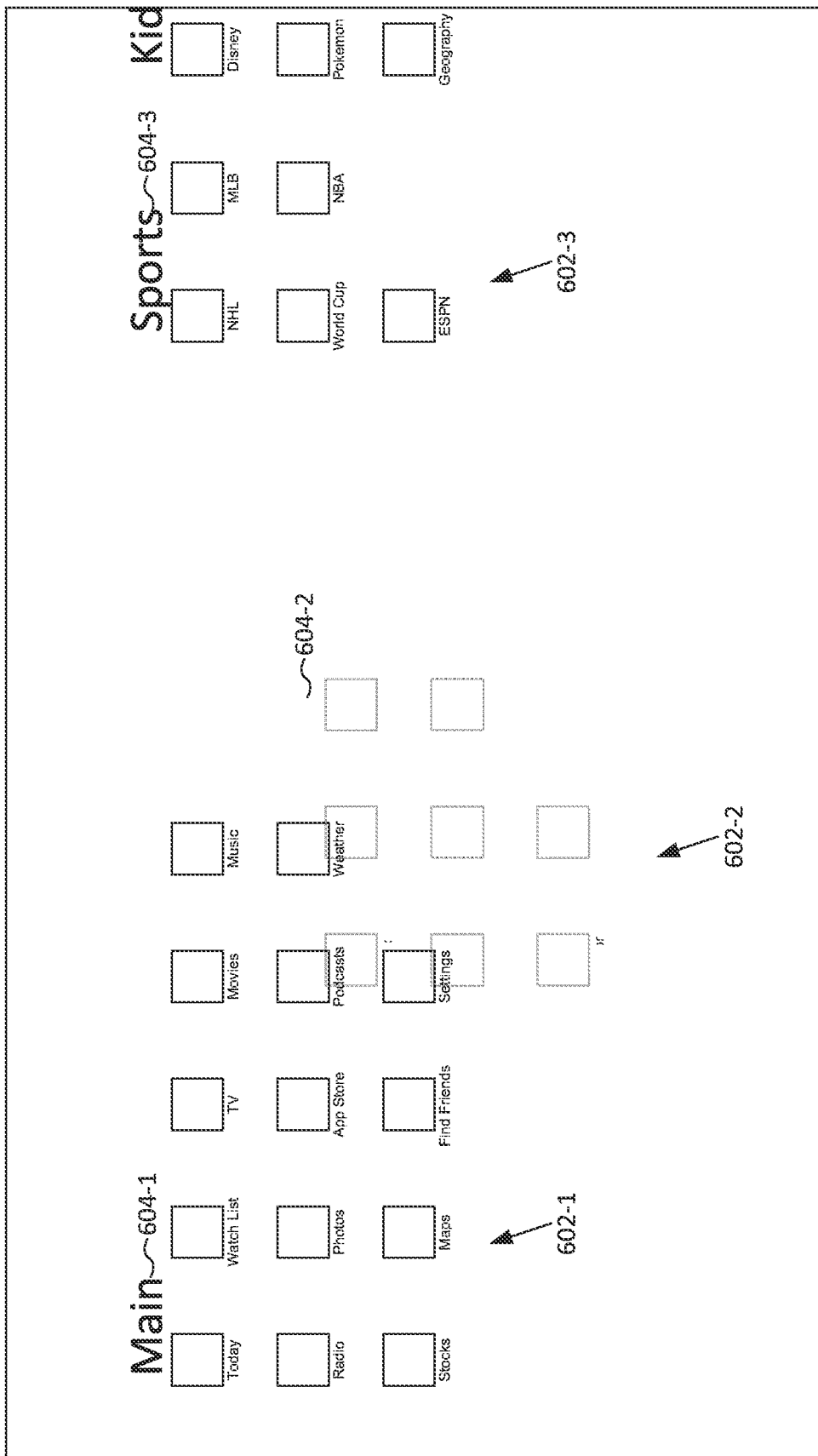
Figure 6L:
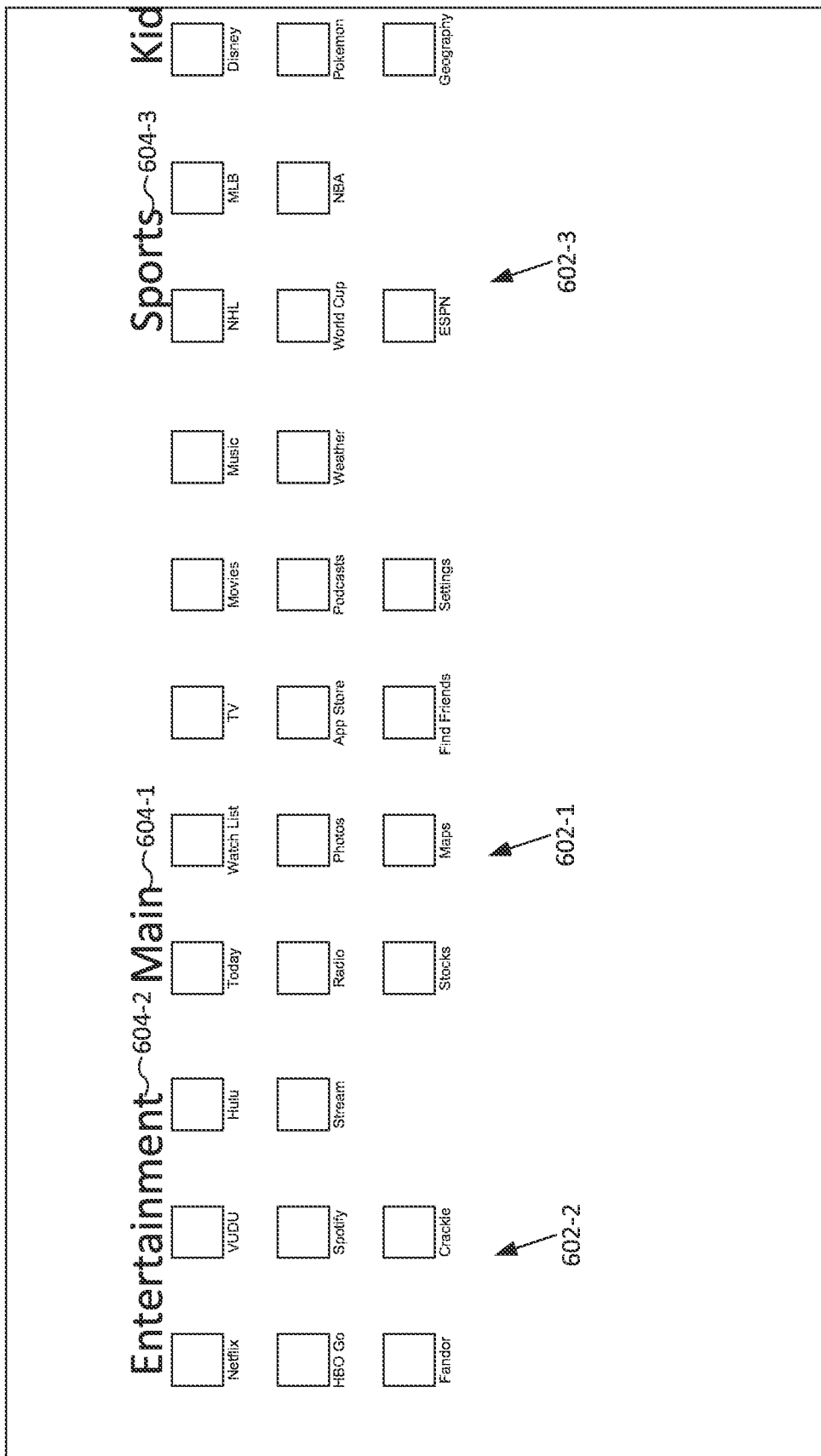
Figure 6M:
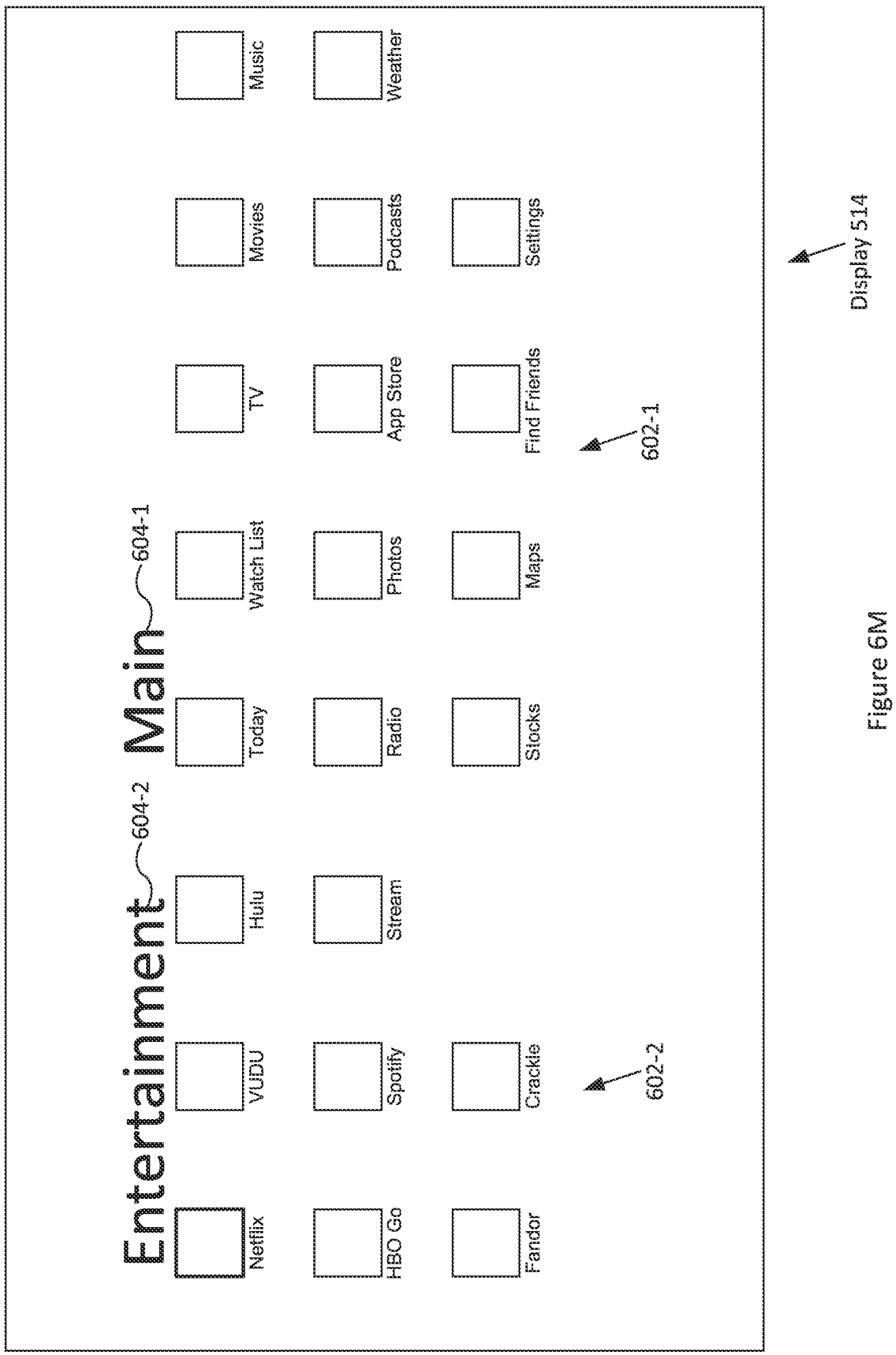
Figure 6N:
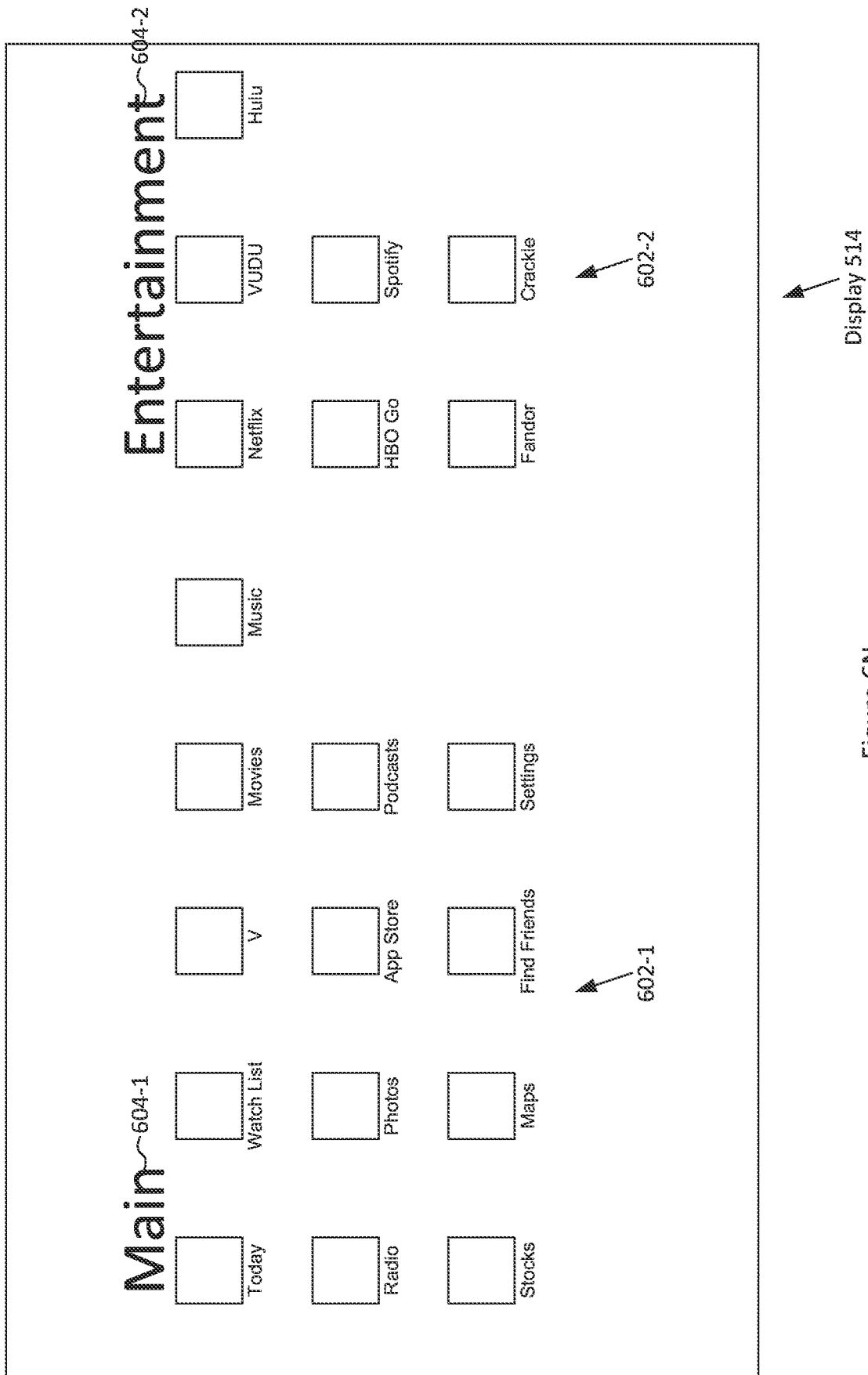
Figure 6O:
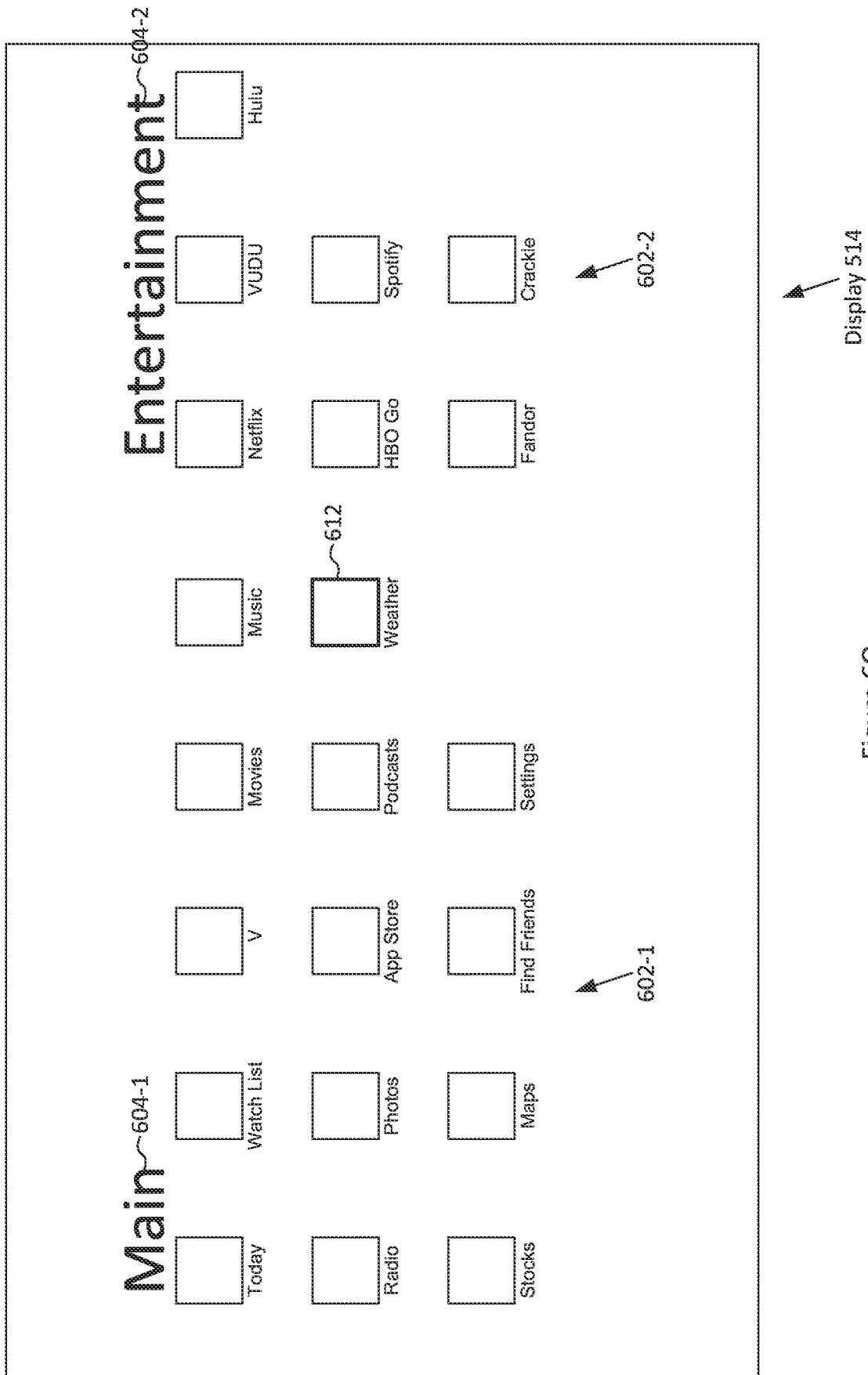
Figure 6P:
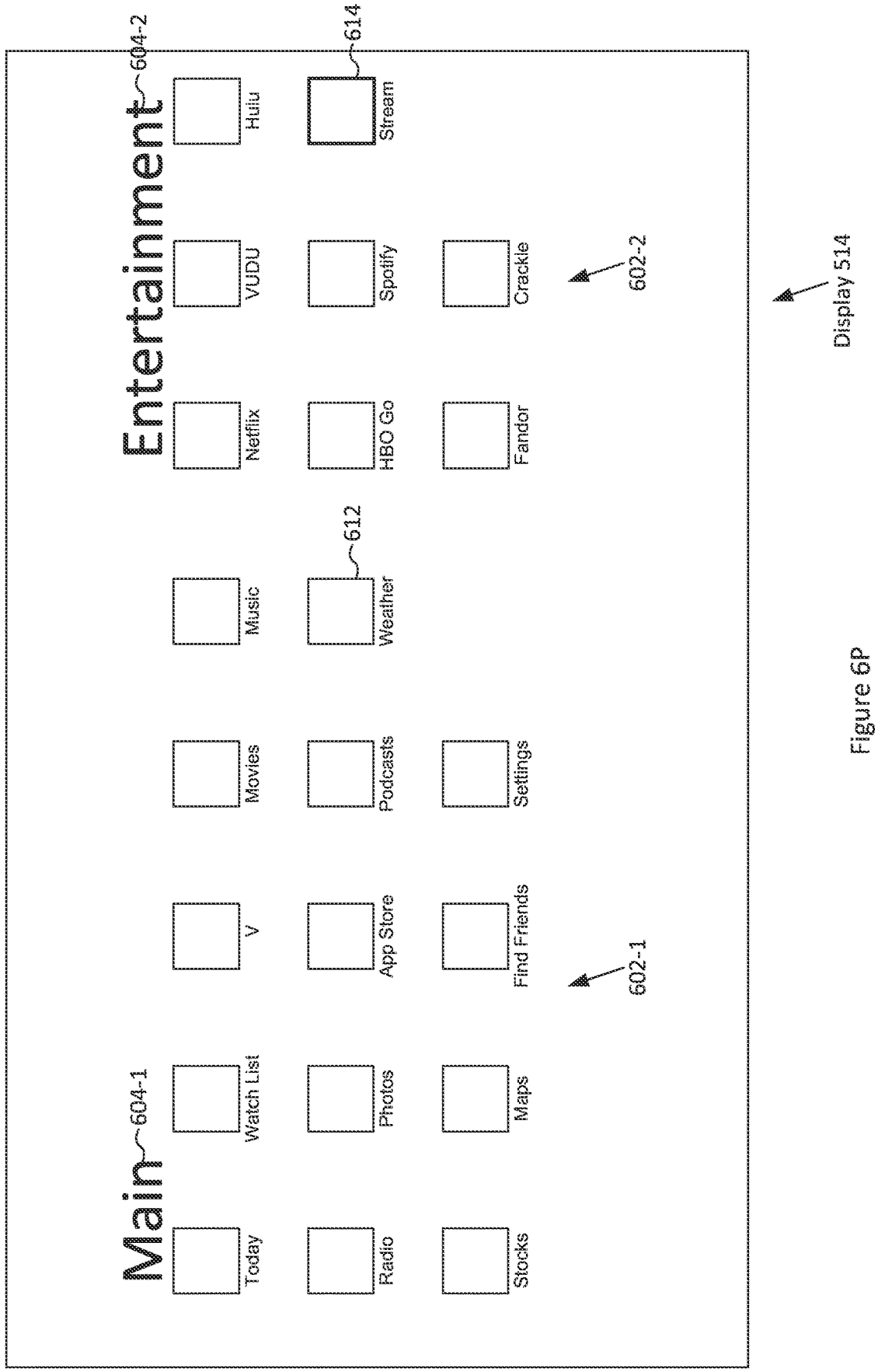
Figure 6Q:
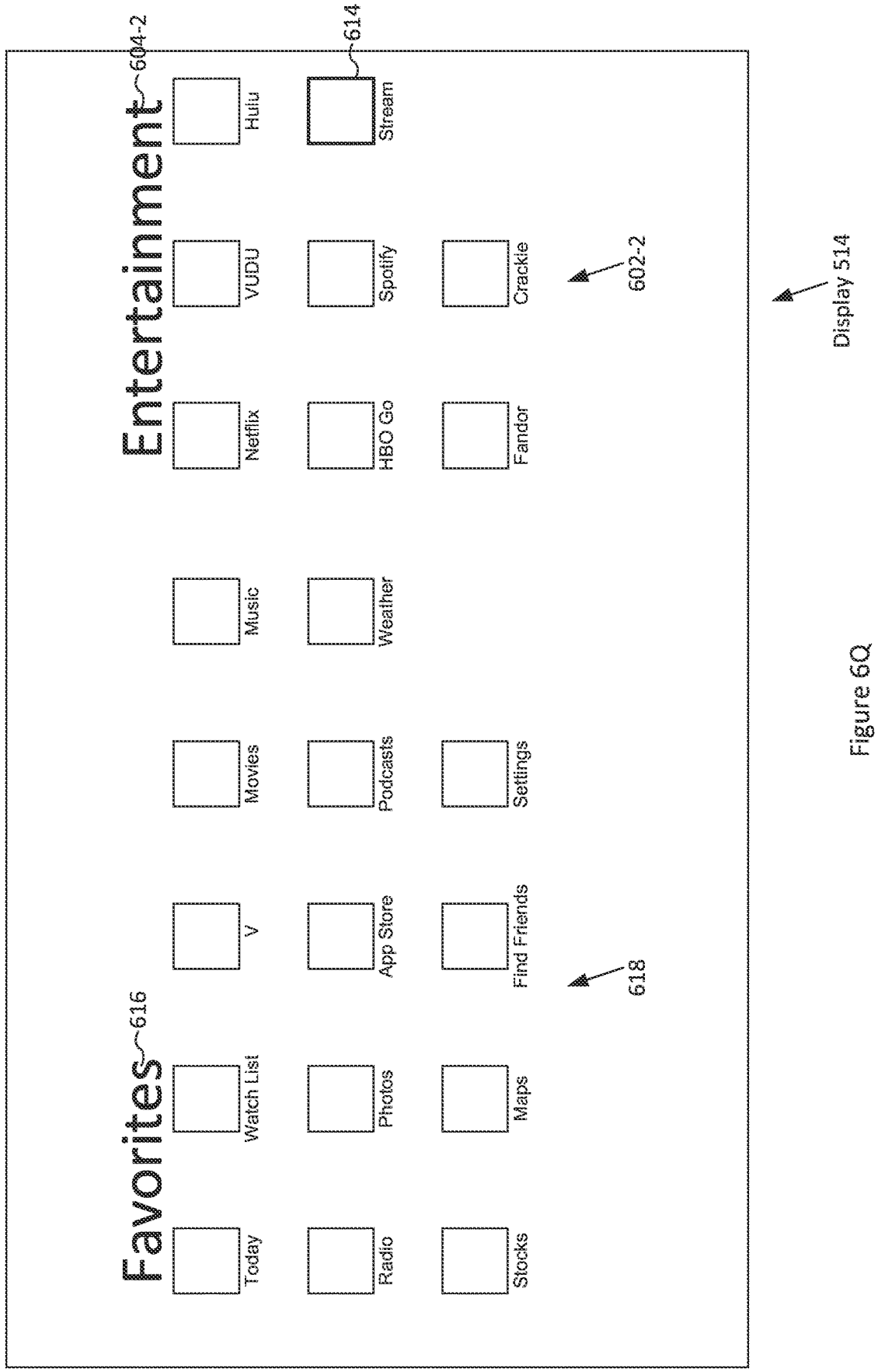
Figure 6R:
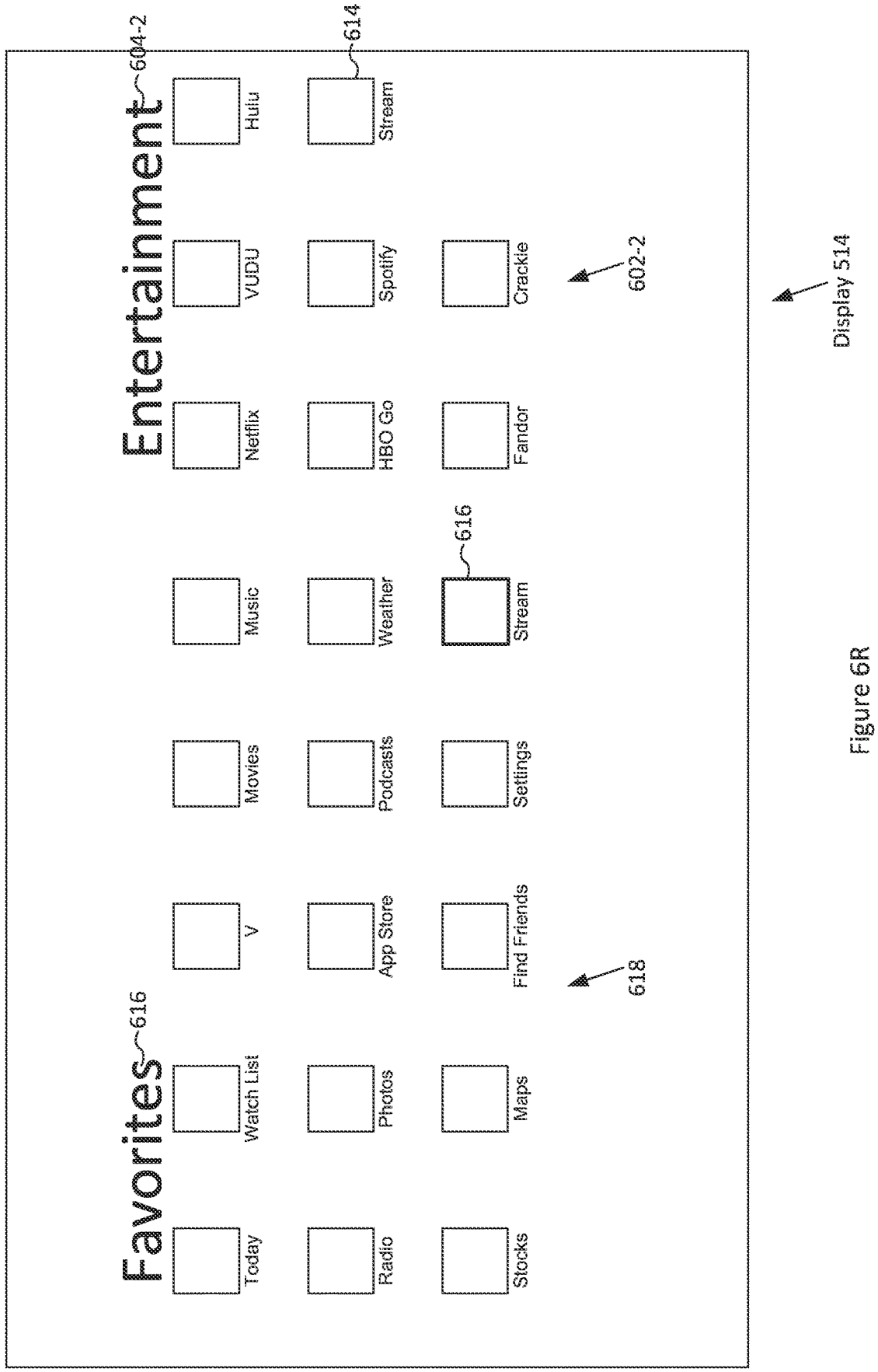
Figure 6S:
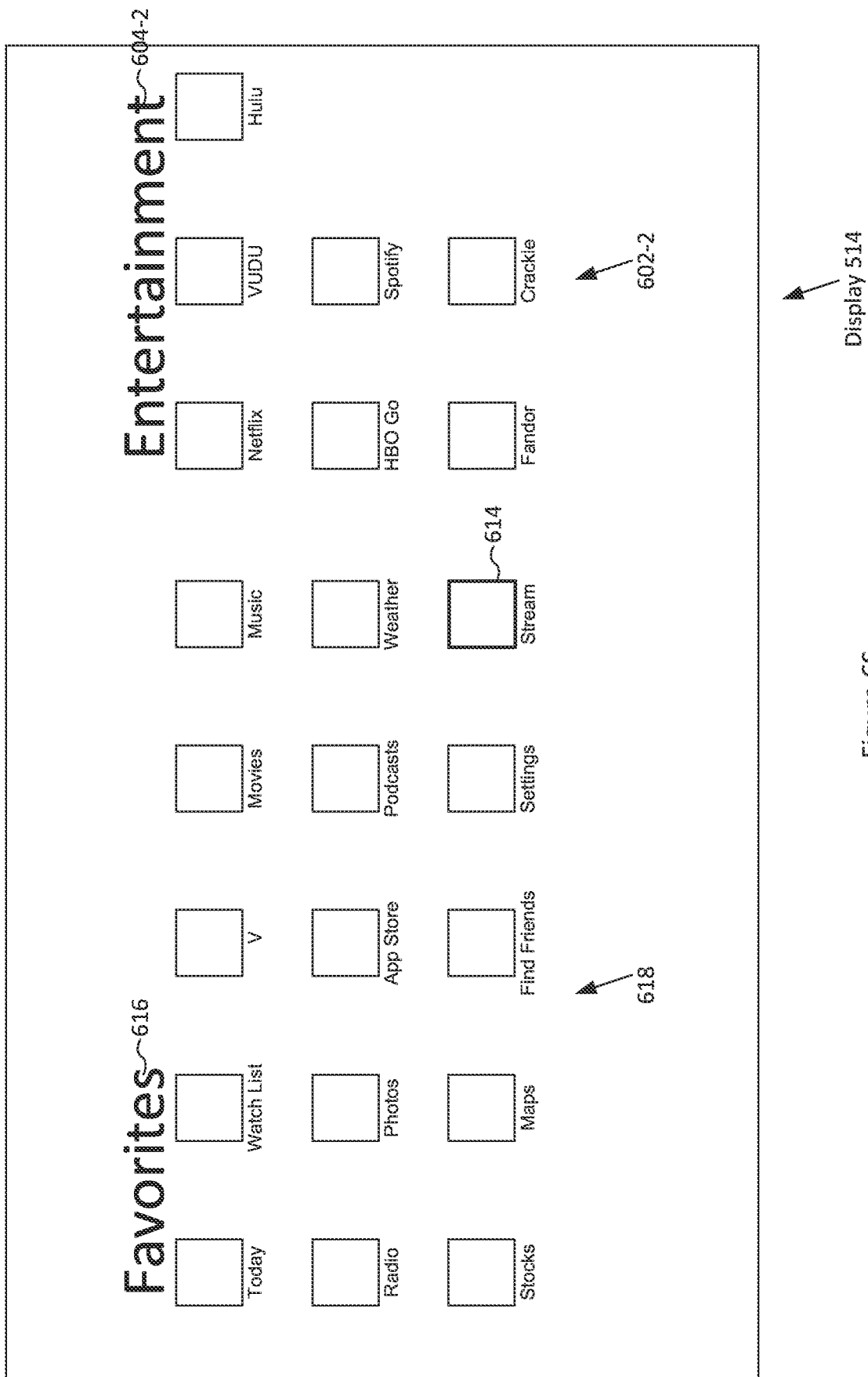
Figure 7A:
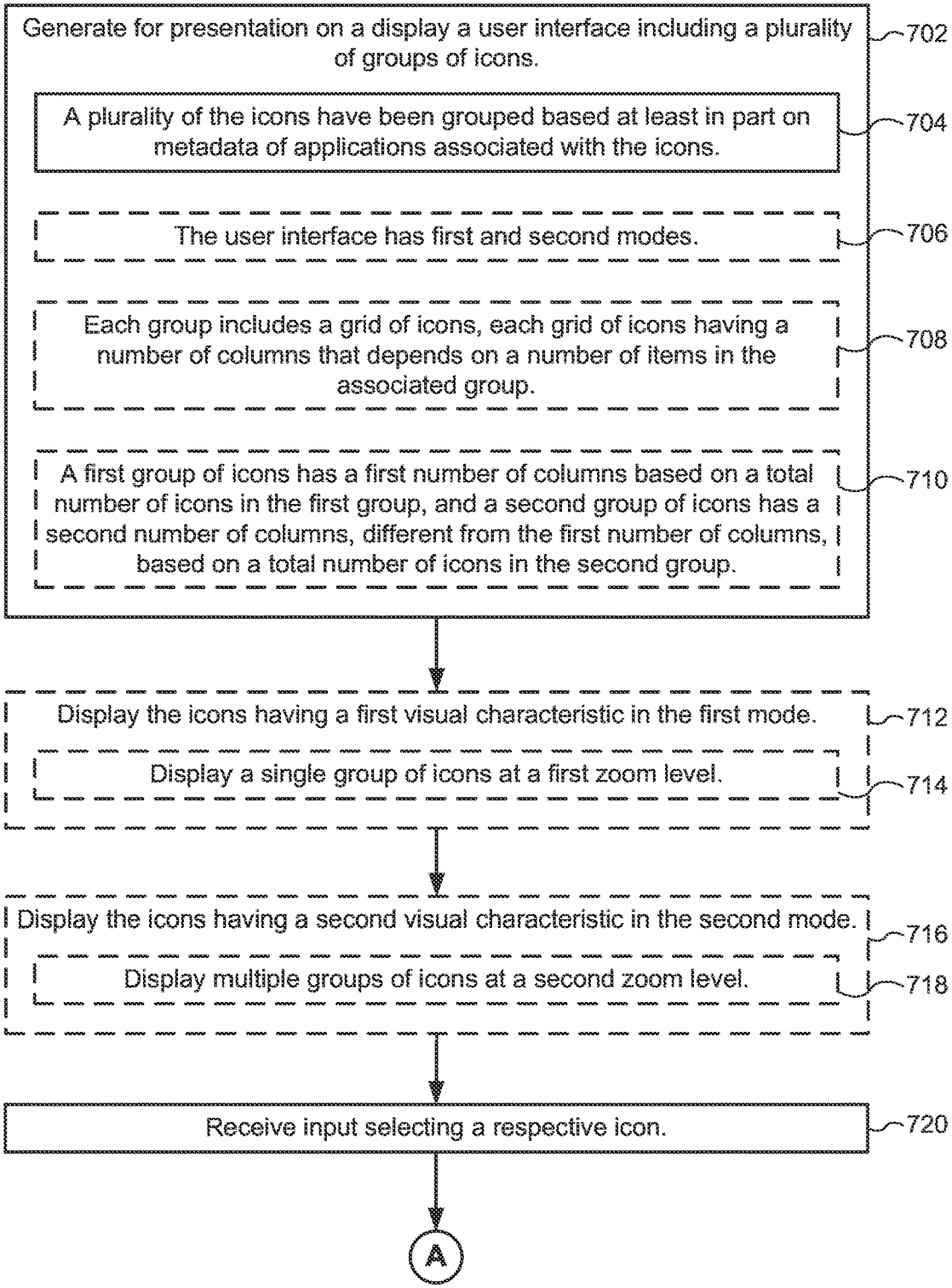
FIGS. 7A-7D are flow diagrams illustrating a method of automatically grouping icons in accordance with some embodiments.
Figure 7B:
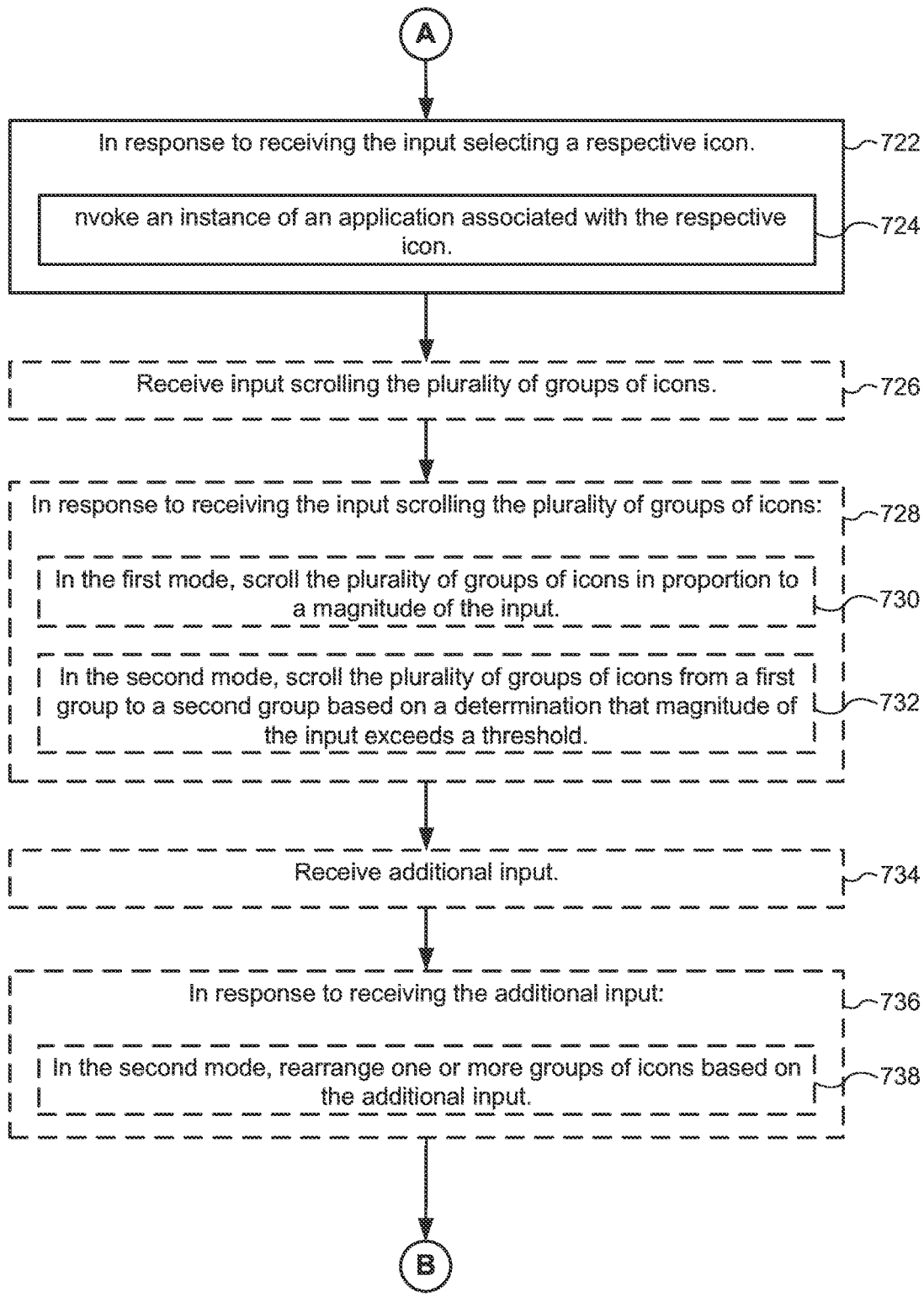
Figure 7C:
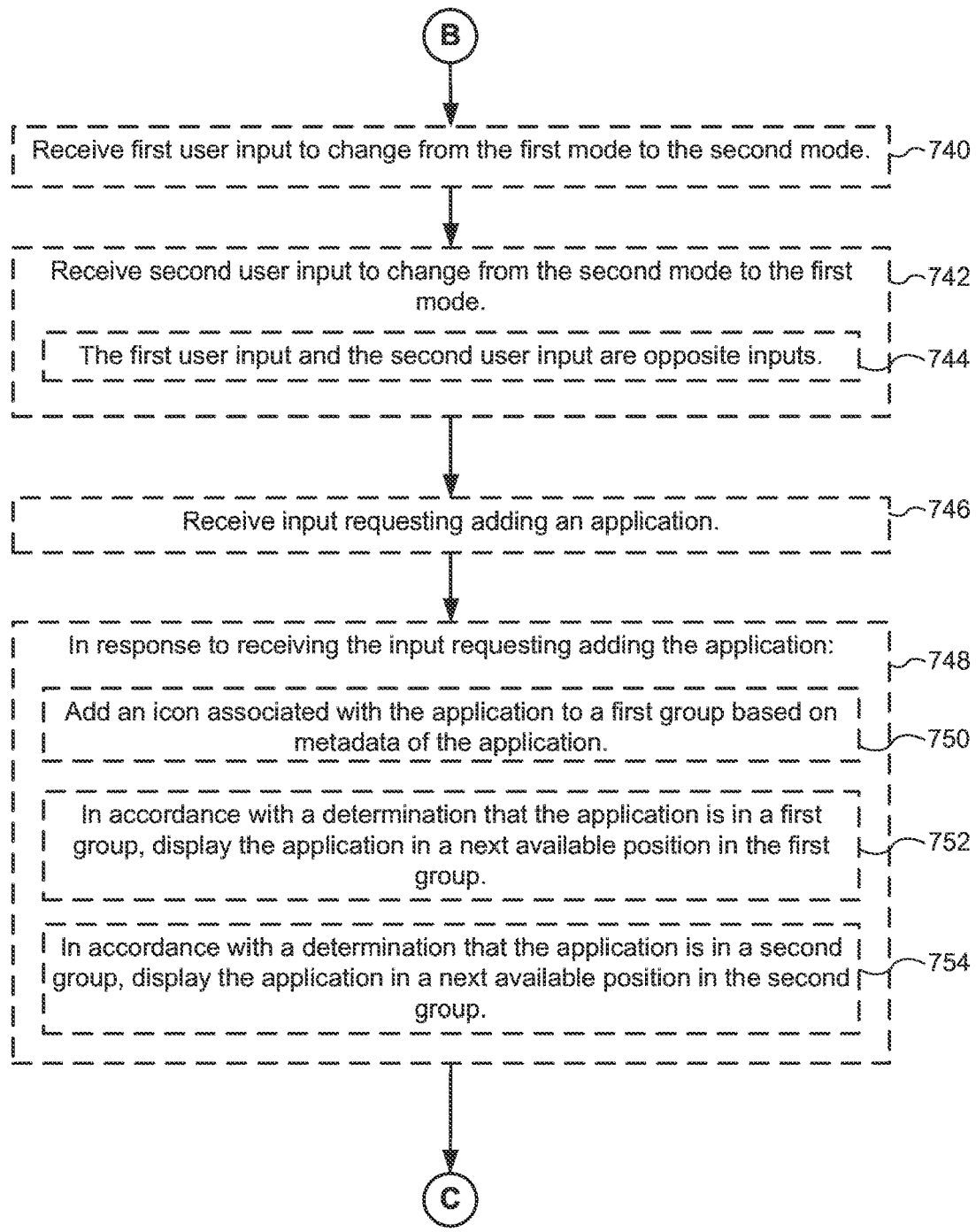
Figure 7D:
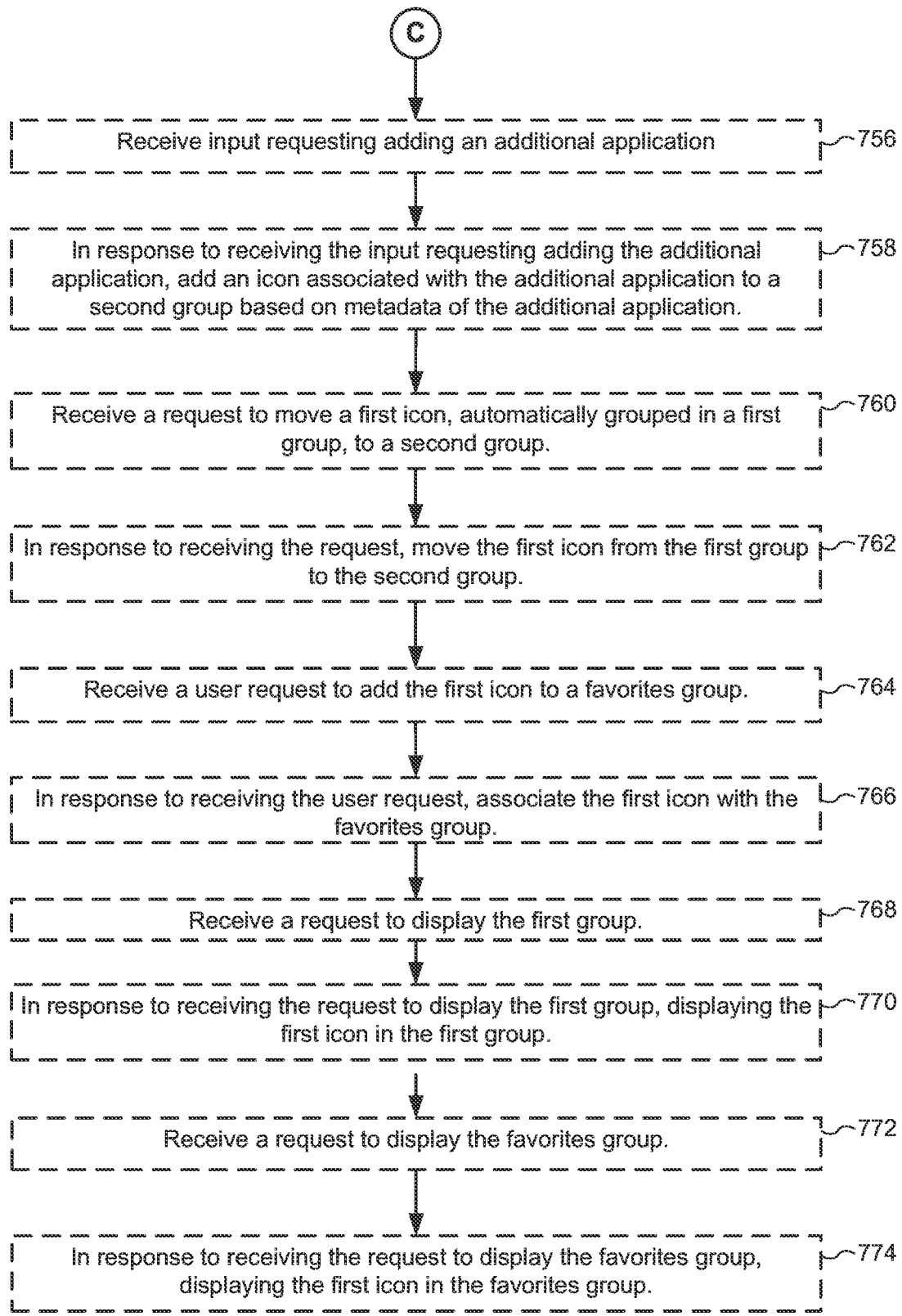

FIGS. 6A-6S illustrate exemplary user interfaces for automatically grouping icons in accordance with some embodiments of the disclosure. The user interfaces in these figures are used to illustrate the processes described below, including the processes described below with reference to FIGS. 7A-7D.

FIGS. 6A-6G illustrate an exemplary application menu user interface of an electronic device 500, presented on a display (e.g., display 514 of device 500). The application menu interface includes groups of icons, including a "Main" group 602-1, an "Entertainment" group 602-2, a "Sports" group 602-3, and a "Kids" group 602-4. Each group is presented adjacent to a corresponding heading "Main" 604-1, "Entertainment" 604-2, "Sports" 604-3 and "Kids" 604-4. The icons are automatically grouped based at least in part on metadata of applications associated with the icons. For example, the plurality of icons 602-2 are optionally grouped in the "Entertainment" group based on metadata of the applications associated with the icons, such as a category. Similarly, the applications associated with the icons in the "Sports" group 602-3 optionally have metadata categorizing the applications as "Sports" applications, and the associated icons are optionally grouped together accordingly. An application associated with an icon is optionally invoked in response to input highlighting an icon (e.g., the "Today" icon 606 in FIG. 6A, the "Music" icon 608 in FIG. 6B, or the "MLB" icon in FIG. 6C, etc.) and/or selecting the icon. Icons are optionally grouped based on metadata when an application is downloaded (or purchased), and the icons can be reorganized manually by a user.

FIGS. 6A-6C illustrate the user interface in a first mode, and FIGS. 6D-6G illustrate the user interface in a second mode. The first mode allows the user to easily select a particular icon, whereas the second mode gives the user a bird's eye view of the available groups and allows the user to quickly move between groups, while maintaining the arrangement from the first mode. In the second mode, the icons and/or headings are optionally displayed zoomed out relative to the icons and headings as displayed in the first mode to give the user a broader view of the various groups in the second mode. Further, scrolling among the icons optionally functions differently in the first and second modes. In the first mode, the groups of icons are optionally scrolled in proportion to a magnitude of the input, allowing free and continuous scrolling among the groups as shown in FIGS. 6A-6C. In the second mode, the plurality of groups are optionally scrolled from one group to the next in response to a swipe input. For example, FIGS. 6D-6G illustrate scrolling the groups of icons such that the next group is moved to the edge of the user interface (e.g., group 602-2 is moved to the left edge of the user interface in FIG. 6E, group 602-3 is moved to the left edge of the user interface in FIG. 6F, and group 602-4 is moved to the left edge of the user interface in FIG. 6G). This allows a user to quickly move to a desired group in the second mode.

FIGS. 6H-6L illustrate the user interface in a second mode allowing the rearranging of groups, and the new arrangement being maintained when the user interface is returned to the first mode in FIG. 6M. FIG. 6H illustrates group 602-2 being selected for rearrangement (e.g., in response to a selection input), and a visual characteristic of the group 602-2 being changed to indicate the group is selected (e.g., the group is displayed in a different color or otherwise highlighted). FIGS. 6I-6K illustrate the group 602-2 being moved to the left of group 602-1 and eventually switching places (e.g., in response to a movement input such as a swipe). FIGS. 6L and 6M illustrate the new arrangement of groups 602-2 and 602-1 being maintained between the second and first modes, respectively.

FIGS. 6N-6P illustrate automatically adding icons to groups based on metadata of associated applications. FIG. 6O illustrates adding a "Weather" icon 612 to the "Main" group 602-1 based on metadata of an associated weather application. For example, the metadata optionally indicates that the weather application should be associated a main application category. The "Weather" icon 612 is added to the next available position in the group 602-1. FIG. 6P illustrates adding a "Stream" icon 614 to the "Entertainment" group 602-2 based on metadata of an associated "Stream" application. For example, the metadata optionally indicates that the "Stream" application should be associated an entertainment application category. The "Stream" icon 614 is added to the next available position in the group 602-2.

FIGS. 6Q-6S illustrate adding an icon to a favorites group. Favorites group 618 is optionally displayed adjacent to a "Favorites" heading 616. In some embodiments, an application associated with icon 614 can be added to the favorites group, and the icon for the application can be displayed in both the favorites group 618 (icon 616) and the group 602-2 to which it was automatically added (icon 614), as illustrated in FIG. 6R. In some embodiments, an icon 614 can be moved from the group 602-2 to which it was automatically added to a different group, such as group 618, as illustrated in FIG. 6S.

FIGS. 7A-7D are flow diagrams illustrating a method of automatically grouping icons in accordance with some embodiments of the disclosure. The method is optionally performed at an electronic device as described above with reference to FIGS. 1A-B and 2-5 (e.g., electronic device 100, 300, or 500, etc.). Some operations in method 700 are, optionally, combined and/or the order of some operations is, optionally, changed.

As described below, the method 700 provides ways of automatically grouping icons in an application menu user interface. The method reduces the cognitive burden on a user when interacting with a user interface on the device by providing an intuitive user interface for selecting an application, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (702) for presentation on a display (e.g., a remote display device or a display that is integrated into the electronic device, such as display 514) a user interface including a plurality of groups of icons (e.g., groups of application icons, document icons, content icons, etc.). For example, FIGS. 6A-G illustrate groups of icons including a "Main" group 602-1, an "Entertainment" group 602-2, a "Sports" group 602-3, and a "Kids" group 602-4. A plurality of the icons have been grouped (704) based at least in part on metadata (e.g., an application category, such as entertainment, sports, kids, games, favorites, recent applications, among other possibilities) of applications associated with the icons.

The electronic device 500 receives (720) input selecting a respective icon. In response (722) to receiving the input selecting a respective icon, the electronic device 500 invokes (724) an instance of an application associated with the respective icon. For example, input is optionally received selecting a "Main" group 602-1, an "Entertainment" group 602-2, a "Sports" group 602-3, and a "Kids" group 602-4, and a corresponding application is optionally invoked.

In some embodiments, the user interface has (706) first and second modes. The electronic device 500 optionally displays (712) the icons having a first visual characteristic in the first mode (e.g., size, brightness, z-position in three-dimensional space), and optionally displays (716) the icons having a second visual characteristic (e.g., decreased size, increased brightness, or different z-position of the sets in three-dimensional space) in the second mode. In some embodiments, displaying the icons having the first visual characteristic includes displaying (714) a single group of icons at a first zoom level (with larger icons), and displaying the icons having the second visual characteristic includes displaying (718) multiple groups of icons at a second zoom level (with smaller icons). For example, more icons are displayed in the second mode, to give user context, while maintaining the arrangement from first mode, as illustrated in FIGS. 6A-6C (first mode) and FIGS. 6D-6G (second mode).

In some embodiments, the electronic device receives (726) input scrolling the plurality of groups of icons. In response (728) to the input scrolling the plurality of groups of icons, in the first mode, the electronic device 500 optionally scrolls (730) the plurality of groups of icons in proportion to a magnitude of the input (e.g., in proportion to a distance traveled by touch input, or velocity of touch input, etc.), as illustrated in FIGS. 6A-6C (scrolling groups 602-1, 602-2, 602-3, and 602-4). In response to the input (728) scrolling the plurality o groups of icons, in the second mode, the electronic device 500 optionally scrolls (732) the plurality of groups of icons from a first group to a second group based on a determination that a magnitude of the input exceeds a threshold (e.g., scrolling from the first group to the second group only if a distance traveled by touch input exceeds a distance threshold, and, otherwise, remaining on or bouncing back to the first group, among other possibilities), as illustrated in FIGS. 6D-6G (scrolling groups 602-1, 602-2, 602-3, and 602-4).

In some embodiments, the electronic device 500 receives (734) additional input. In response (736) to receiving the additional input, in the second mode, the electronic device 500 optionally rearranges (738) one or more groups of icons based on the additional input (e.g., changing a visual arrangement of the groups, removing/adding a group, renaming a group, etc.; the same input in the first mode does not rearrange the groups), as illustrated in FIGS. 6H-6L (rearranging group 602-2 and group 602-1 to change the order of the groups). In some embodiments, in accordance with a determination that the user interface is in the second mode, one or more icons are optionally rearranged within a group in response to receiving the additional input.

In some embodiments, the electronic device 500 receives (740) first user input to change from the first mode to the second mode, and optionally receives (742) second user input to change from the second mode to the first mode. The first user input and the second user input are optionally opposite inputs (744) (e.g., pinch in to enter second mode, pinch out to return to first mode; swipe up to enter second mode, swipe down to enter first mode; twist two fingers clockwise to enter second mode, twist two fingers counter-clockwise to enter first mode; etc.).

In some embodiments, the electronic device receives (746) input requesting adding an application (e.g., requesting installation of an application or requesting purchase of an application). In response (748) to receiving the input requesting adding the application, the electronic device optionally adds (750) an icon associated with the application to a first group based on metadata of the application (e.g., adding the icon to a category associated with the application). In some embodiments, the electronic device optionally receives (756) input requesting adding an additional application. In response (758) to receiving the input requesting adding the additional application, the electronic device optionally adds an icon associated with the additional application to a second group (different from the first group) based on metadata of the additional application. For example, FIG. 6O illustrates automatically adding icon 612 to group 602-1, and FIG. 6P illustrates automatically adding icon 614 to group 602-2 (different from group 602-1).

In some embodiments, in response (748) to receiving the input requesting adding the application, in accordance with a determination that the application is in a first group, the electronic device displays (752) the application in a next available position in the first group, and in accordance with a determination that the application is in a second group, the electronic device optionally displays (754) the application in a next available position in the second group. For example, FIG. 6O illustrates the icon 612 in the next available position in group 602-1, and FIG. 6P illustrates the icon 614 in the next available position in group 602-2.

In some embodiments, the plurality of icons includes a first icon automatically grouped in a first group, such as icon 614 automatically grouped in group 602-2, as illustrated in FIG. 6Q. The electronic device optionally receives (760) a request to move the first icon to a second group (e.g., user input dragging the first icon from the first group to the second group). In response to receiving the request, the electronic device optionally moves (762) the first icon from the first group to the second group. The icon is optionally maintained in the new user-specified location (e.g., metadata is for initial sorting step just when new app is added). For example, FIG. 6S illustrates icon 614 having been moved from group 602-2 to group 602-1.

In some embodiments, the electronic device receives (764) a user request to add the first icon to a favorites group (such as favorites group 616 in FIGS. 6Q and 6R). In response to receiving the user request, the electronic device optionally associates (766) the first icon with the favorites group. The electronic device optionally receives (768) a request to display the first group and, in response to receiving the request to display the first group, optionally displays (770) the first icon in the first group. The electronic device optionally receives (772) a request to display the favorites group and, in response to receiving the request to display the favorites group, optionally displays (774) the first icon in the favorites group. For example, FIG. 6R illustrates an "Stream" icon in both the favorites group 618 (as icon 616) and the group 602-2 (as icon 614).

In some embodiments, each group includes (708) a grid of icons, each grid of icons having a number of columns that depends on a number of items in the associated group. A first group of icons optionally has (710) a first number of columns based on a total number of icons in the first group (e.g., based on a maximum number of icons for each column in a grid of icons), and a second group of icons optionally has a second number of columns, different from the first number of columns, based on a total number of icons in the second group. For example, in FIGS. 6A-6C, the "Main" group 602-1 has 14 icons, arranged into 5 columns of at most 3 icons, and the "Entertainment" group 602-2 has 8 icons, arranged into 3 columns of at most 3 icons.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B. For example, generating operation 702, receiving operation 720, and invoking operation 724 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1300) are also applicable in an analogous manner to method 700 described above with respect to FIGS. 7A-7D. For example, the user interfaces, user interface objects, icons, groups, headings, visual content, and electronic devices described above with reference to method 700 optionally have one or more of the characteristics of the user interfaces, user interface objects, icons, groups, headings, visual content, and electronic devices described herein with reference to other methods described herein (e.g., methods 900, 1100, and 1300). For brevity, these details are not repeated here.

Application Switching User Interface

Many electronic devices provide user interfaces for switching between applications for consuming content items. There is a need to provide an intuitive interface for switching between content applications in an intuitive manner. The embodiments described below provide an intuitive application switching user interface including representations of states of various applications.

FIGS. 8A-8D illustrate an exemplary application switching user interface in accordance with some embodiments of the disclosure. The user interfaces in these figures are used to illustrate processes described below, including the processes described below with reference to FIGS. 9A-9C.

Figure 8A:
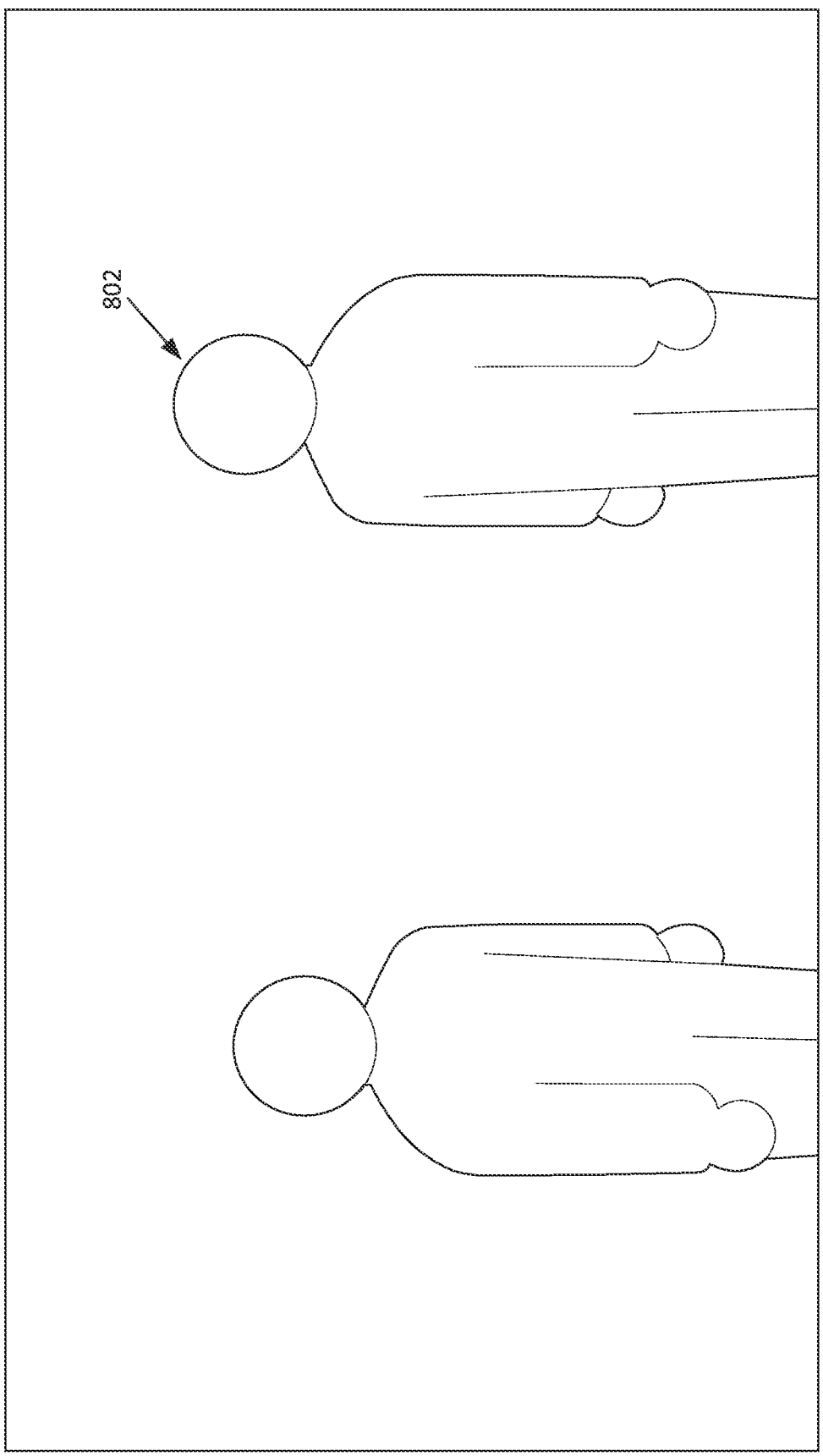
Figure 8B:
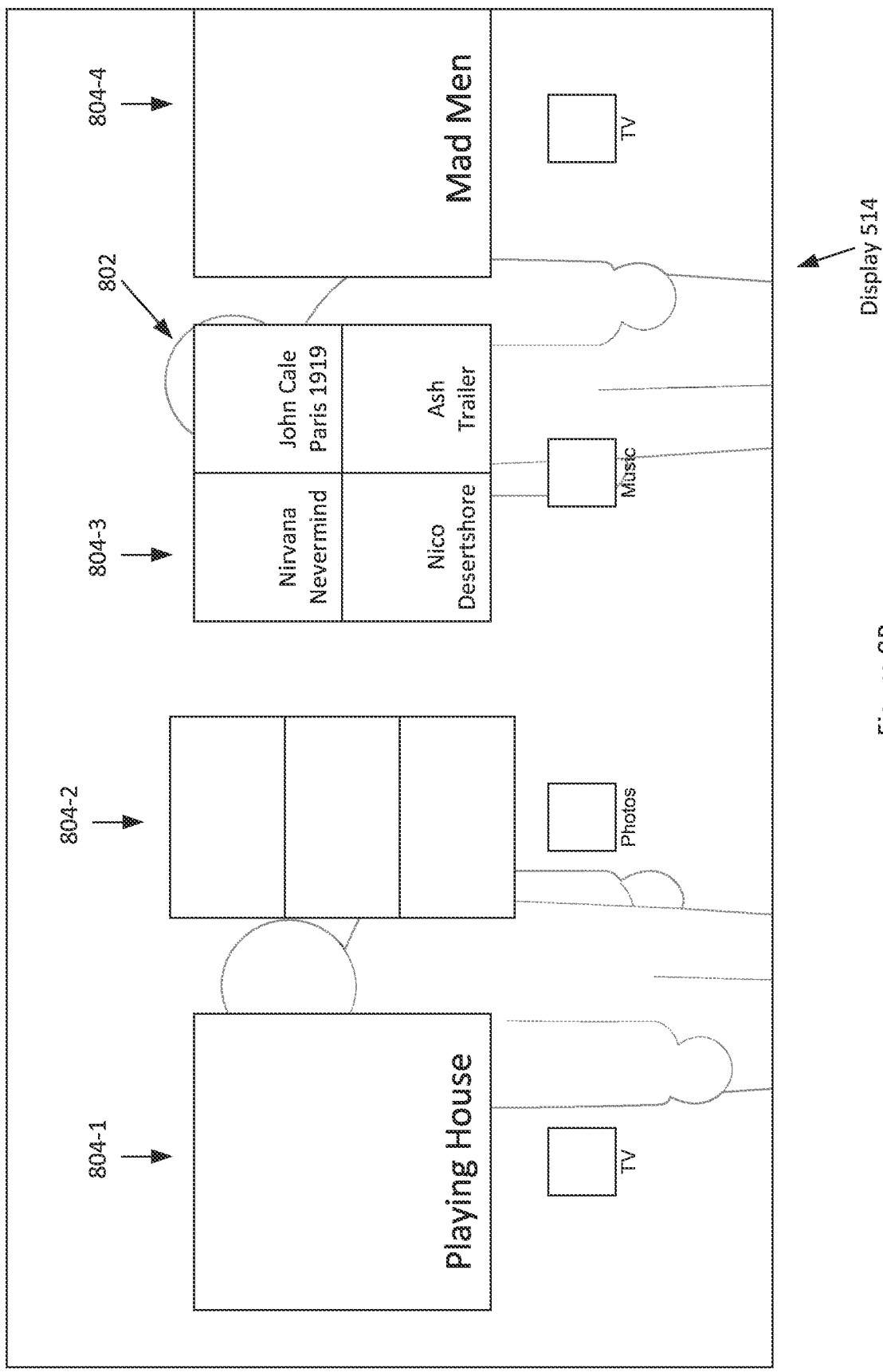
Figure 8C:
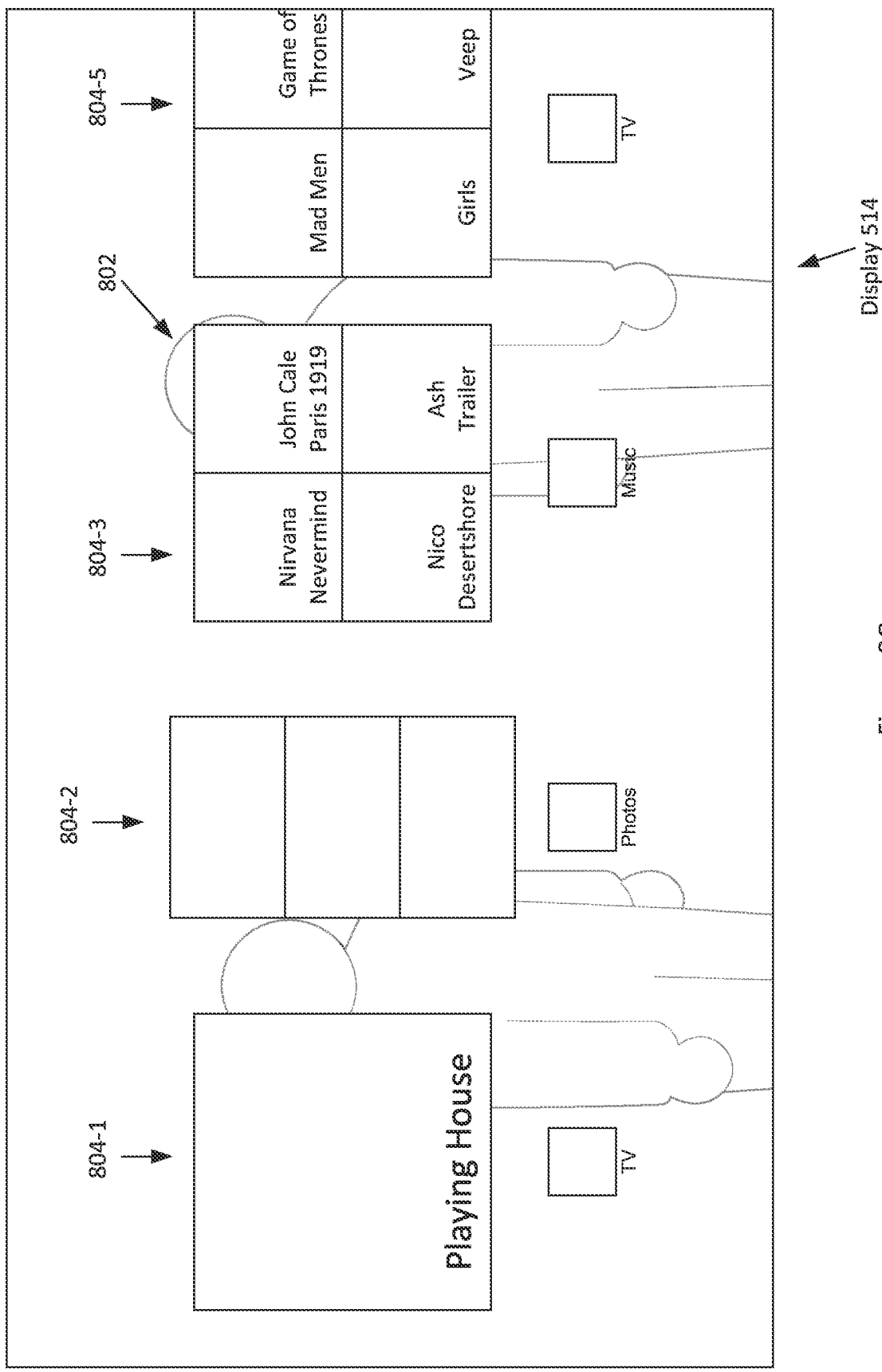

FIG. 8A illustrates visual content 802 displayed on a display 514 of an electronic device 500. The visual content 802 illustrated in FIG. 8A is video of a television show "Playing House" in a television (TV) application. A request to display an application switching user interface is optionally received, and the application switching user interface is displayed in response, as illustrated in FIGS. 8B-8D. FIGS. 8B-8D illustrate the application switching interface overlaid on the visual content 802.

In FIGS. 8B-8D, the application switching user interface includes user interface objects 804-1, 804-2, 804-3, 804-4 and 804-5 for switching between different applications corresponding to the user interface objects. User interface object 804-1 corresponds to the TV application and includes a representation of the TV application's state. However, in representing the state of the TV application, the user interface object 804-1 does not merely include a screenshot of the state of the TV application (as illustrated in FIG. 8A). Rather, the episode of "Playing House" was active in the TV application when the request to display the application switching interface was received, and the user interface object 804-1 includes the logo of "Playing House" accordingly.

Both user interface objects 804-1 and 804-4 correspond to the TV application, but each object represents a different aspect of the state of the TV application. User interface object 804-1 represents the currently playing episode of "Playing House", whereas user interface object 804-4 represents "Mad Men", other content available in the TV application. For example, "Mad Men" is optionally recently accessed content, content that is currently airing on a different channel, or content in a watch list or other queue, among other possibilities. Selection of either user interface objects 804-1 or 804-4 causes the device to invoke the TV application, but selecting 804-1 causes the device to invoke the TV application playing "Playing House" whereas selecting 804-4 causes the device to invoke the TV application playing "Mad Men".

User interface objects 804-2, 804-3, and 804-5 each include multiple images representing the state of corresponding applications. For example, the user interface object 804-2 includes three photos from a photos application. In some embodiments, selecting the user interface object 804-2 optionally invokes the photos application displaying any and/or all of the three photos in the user interface object 804-2. User interface object 804-3 includes four album covers from a music application. The album covers are, optionally, music that is currently playing, recently played, or upcoming in a music queue. Although the music application optionally only plays one song at a time, the corresponding user interface object 804-3 includes images representing multiple content items. Similarly, the user interface object 804-5 includes images representing multiple TV shows, and the TV application optionally only plays one episode at a time.

In FIG. 8D, the application switching user interface has been scrolled horizontally to reveal user interface object 804-6, representing the state of a messaging application. The state of the messaging application is optionally received from the messaging application itself and, as illustrated in FIG. 8D, shows a conversation. A most recent message in the conversation is optionally received after the application was last accessed. For example, when the messaging application was last accessed only the first two messages were displayed, and the current state of the application as illustrated in FIG. 8D now shows a more recent message "Available tonight for poker?"

Figure 9A:
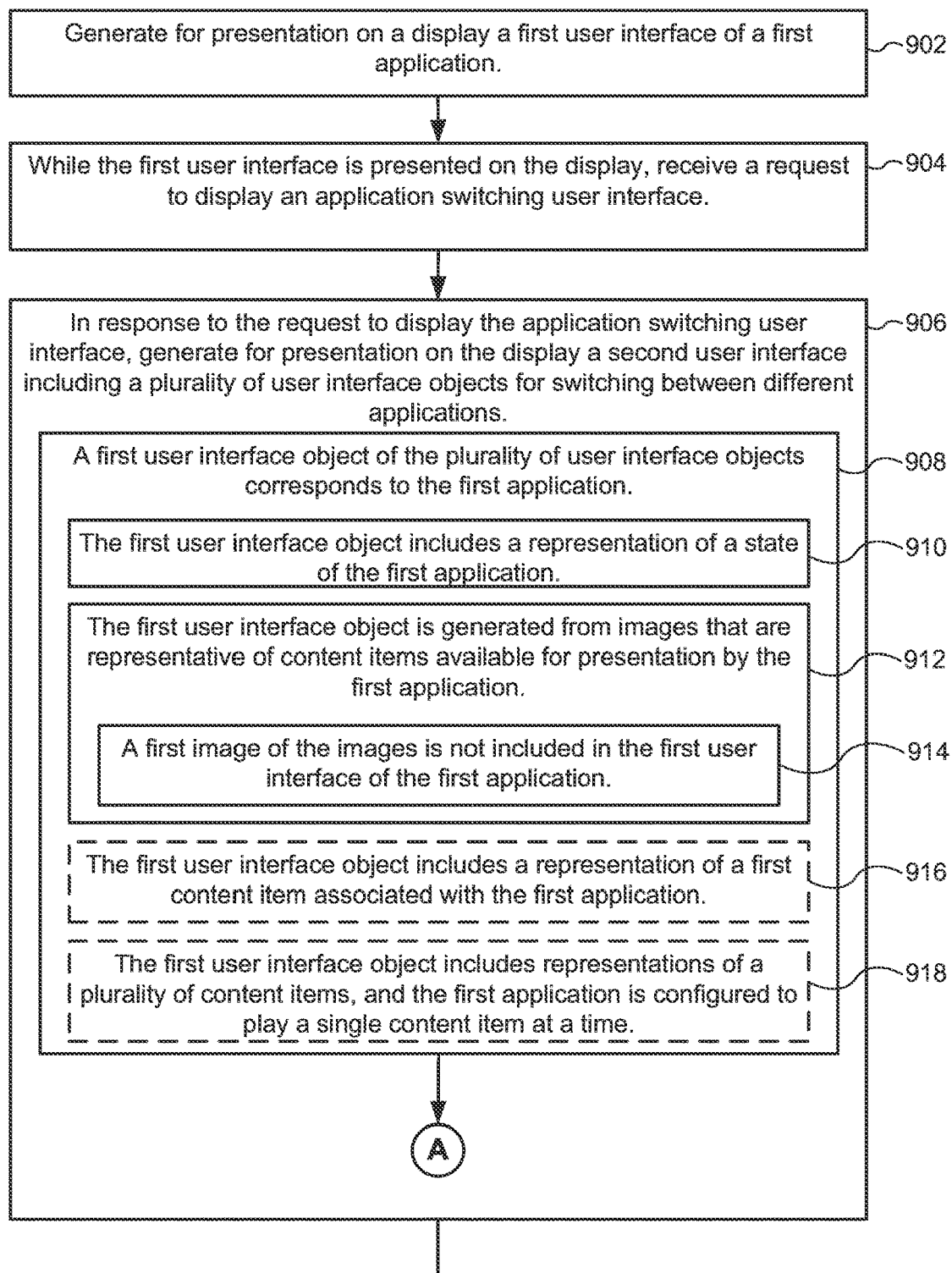
FIGS. 9A-9C are flow diagrams illustrating a method of an application switching user interface in accordance with some embodiments.
Figure 9B:
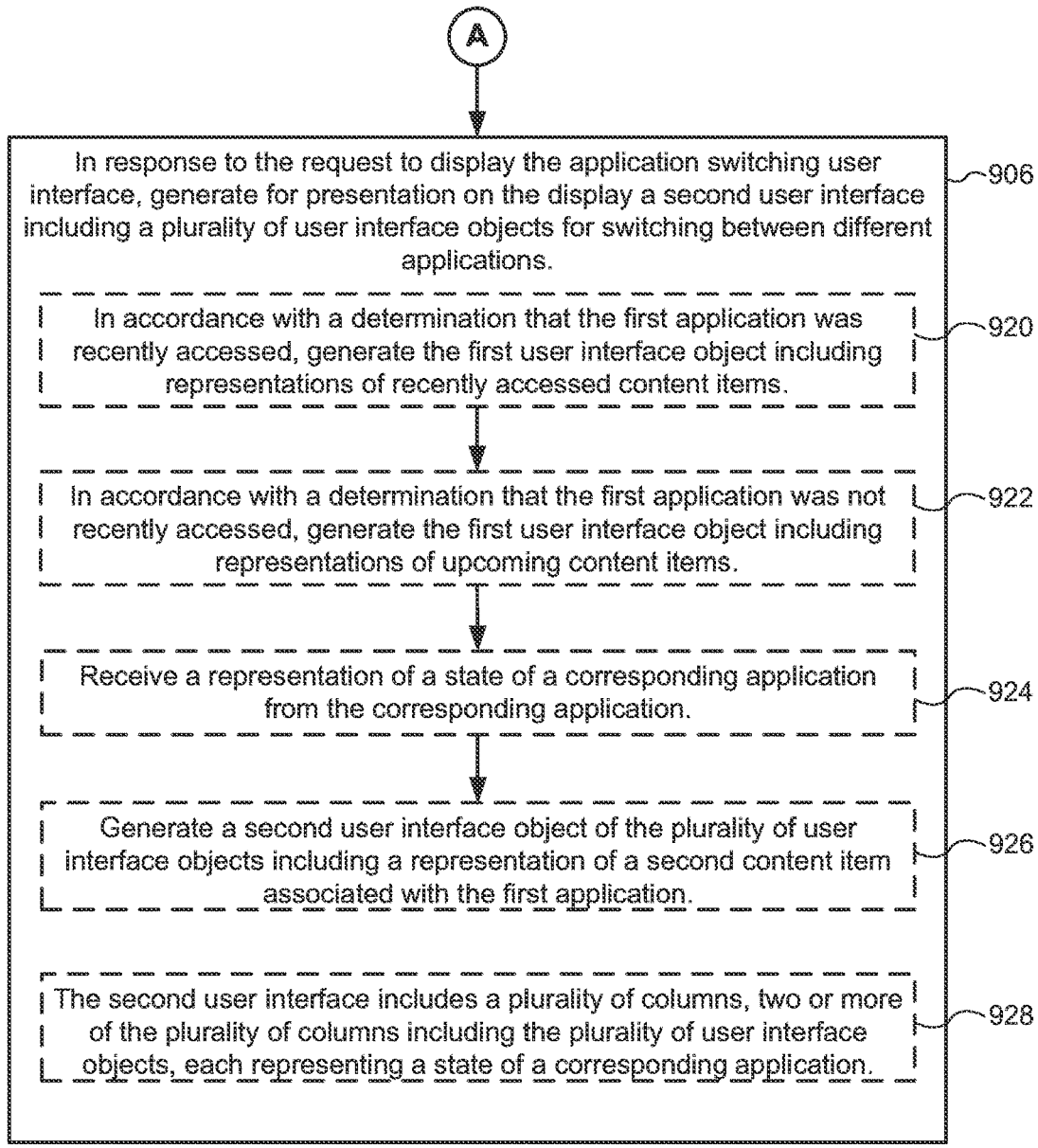
Figure 9C:
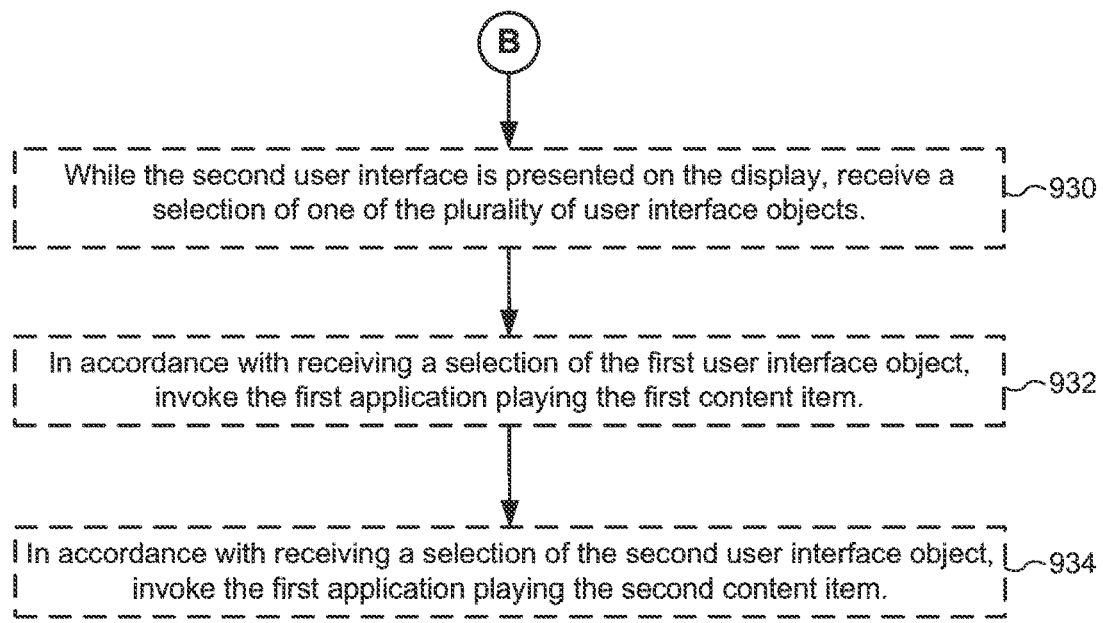

FIGS. 9A-9C are flow diagrams illustrating a method of an application switching user interface in accordance with some embodiments. The method is optionally performed at an electronic device as described above with reference to FIGS. 1-5 (e.g., electronic device 100, 300, or 500, etc.). Some operations in method 900 are, optionally, combined and/or the order of some operations is, optionally, changed.

As described below, the method 900 provides an application switching user interface. The method reduces the cognitive burden on a user when interacting with a user interface on the device by providing an intuitive user interface for switching applications, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (902) for presentation on a display (e.g., display 514) a first user interface of a first application (e.g., a user interface including playing video content, a user interface including representation(s) of playing audio content, such as album art, an audio progress bar, a playlist, etc.). For example, FIG. 8A illustrates a first user interface playing video content 802.

While the first user interface is presented on the display, the electronic device receives (904) a request to display an application switching user interface (e.g., user input to access an application switching user interface by pressing and holding a home button).

In response to the request to display the application switching user interface, the electronic device generates (906) for presentation on the display (e.g., a remote display device or a display that is integrated into the electronic device) a second user interface including a plurality of user interface objects for switching between different applications (e.g., objects 804-1, 804-2, 804-3, 804-4 and 804-5 in FIGS. 8B-8D). A first user interface object of the plurality of user interface objects corresponds (908) to the first application, and the first user interface object includes (910) a representation of a state of the first application. The first user interface object is generated (912) from images (e.g., album art images, movie poster images, etc.) that are representative of content items available for presentation by the first application. A first image of the images is not included (914) in the first user interface of the first application (e.g., the respective image corresponds to content that is not the content playing when the request to display the application switching user interface was received, and thus the respective image is not a screenshot or other snapshot of the first application). For example, in FIGS. 8A-8D, user interface object 804-1 corresponds to the TV application, and is generated from a logo representative of the TV show that was playing in the TV application, but the logo is not included in the user interface of the TV application as illustrated in FIG. 8A.

In some embodiments, generating the second user interface (906) includes, in accordance with a determination that the first application was recently accessed, generating (920) the first user interface object including representations of recently accessed content items (e.g., representations of TV shows, movies, songs, etc. that have been accessed within a predetermined threshold time period, such as in user interface object 804-1 in FIG. 8B), and, in accordance with a determination that the first application was not recently accessed, generating (922) the first user interface object including representations of upcoming content items (e.g., content items in a watch list, content items about to be released or air on television, etc., such as in user interface object 804-5 in FIG. 8D). The representation of the state of the application optionally includes a representation of content that is played when the first application is launched (not necessarily content that was playing when it was closed). For example, if a user last accessed the television app the previous night, upcoming television shows may be displayed in the application switching user interface, as opposed to the television shows that were viewed the previous night that are no longer being aired.

In some embodiments, generating the second user interface (906) includes receiving (924) a representation of a state of a corresponding application from the corresponding application (e.g., an application may provide its own representation of state, such as a current iMessage, a last Facebook post, etc.). For example, FIG. 8D illustrates a user interface object 804-6 corresponding to a messaging application with a current conversation.

In some embodiments, the first user interface object includes (916) a representation of a first content item associated with the first application. In some embodiments, generating the second user interface optionally includes generating (926) a second user interface object of the plurality of user interface objects including a representation of a second content item associated with the first application (e.g., multiple objects may be associated with the same app, one object for each of a certain number of recent channels/shows/movies that the user watched, and each object may be separately selectable to view the content item associated with the representation). For example, in FIG. 8B, user interface object 804-1 represents "Playing House" associated with the TV application, and user interface object 804-4 represents "Mad Men" associated with the TV application.

In some embodiments, while the second user interface is presented on the display, the electronic device optionally receives (930) a selection of one of the plurality of user interface objects. In accordance with receiving a selection of the first user interface object, the electronic device optionally invokes (932) the first application playing the first content item, and in accordance with receiving a selection of the second user interface object, the electronic device optionally invokes (934) the first application playing the second content item. For example, in FIG. 8B, selection of either user interface objects 804-1 or 804-4 causes the device to invoke the TV application, but selecting 804-1 causes the device to invoke the TV application playing "Playing House" whereas selecting 804-4 causes the device to invoke the TV application playing "Mad Men".

In some embodiments, the second user interface includes (928) a plurality of columns, two or more of the plurality of columns including the plurality of user interface objects, each representing a state of a corresponding application. For example, in FIG. 8D, each of user interface objects 804-2, 804-3, and 804-5 are columns including a plurality of user interface objects, each representing a state of a corresponding application.

In some embodiments, the first user interface object includes (918) representations of a plurality of content items, and the first application is configured to play a single content item at a time. For example, in FIG. 8D, the user interface object 804-5 includes images representing multiple TV shows, and the TV application optionally only plays one episode at a time.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B. For example, generating operation 902, receiving operation 904, and generating operation 906 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, and 1300) are also applicable in an analogous manner to method 900 described above with respect to FIGS. 9A-9C. For example, the user interfaces, user interface objects, icons, groups, headings, visual content, and electronic devices described above with reference to method 900 optionally have one or more of the characteristics of the user interfaces, user interface objects, icons, groups, headings, visual content, and electronic devices described herein with reference to other methods described herein (e.g., methods 700, 1100, and 1300). For brevity, these details are not repeated here.

Two-Dimensional and One-Dimensional Arrays of User Interface Objects

Many electronic devices provide user interfaces overlaid on visual content. There is a need to provide an intuitive interface overlaid on visual content that obscures a minimal portion of the visual content. The embodiments below provide an intuitive way two switch from a user interface including a two-dimensional array of user interface objects to a user interface including a one-dimensional array of the same user interface objects.

FIGS. 10A-10J illustrate an exemplary user interface including one-dimensional and two-dimensional arrays of user interface objects in accordance with some embodiments of the disclosure. The user interfaces in these figures are used to illustrate processes described below, including the processes described below with reference to FIGS. 11A-11C.

Figure 10A:
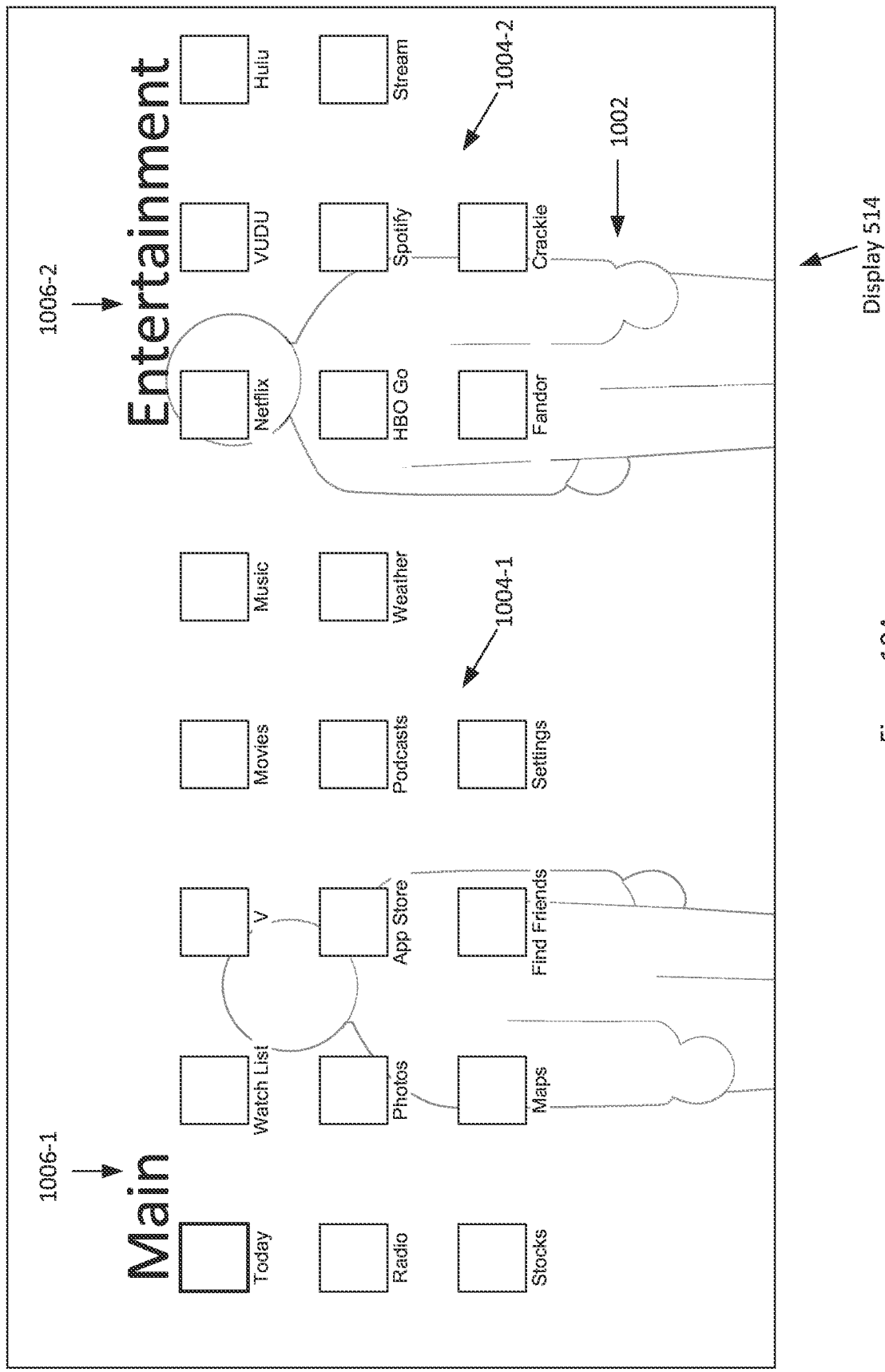
FIGS. 10A-10J illustrate an exemplary user interface including one-dimensional and two-dimensional arrays of user interface objects in accordance with some embodiments of the disclosure.
Figure 10B:
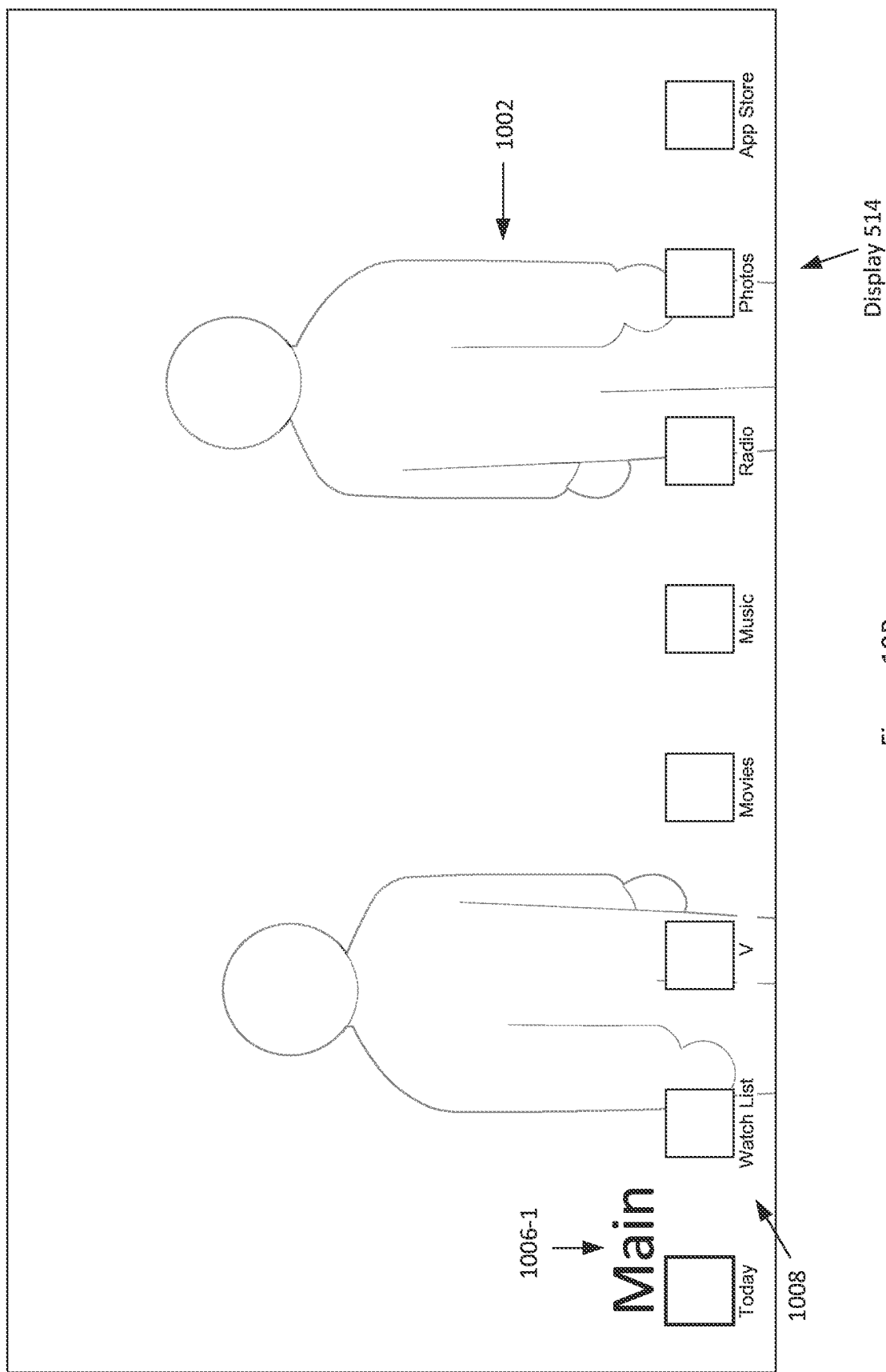
Figure 10C:
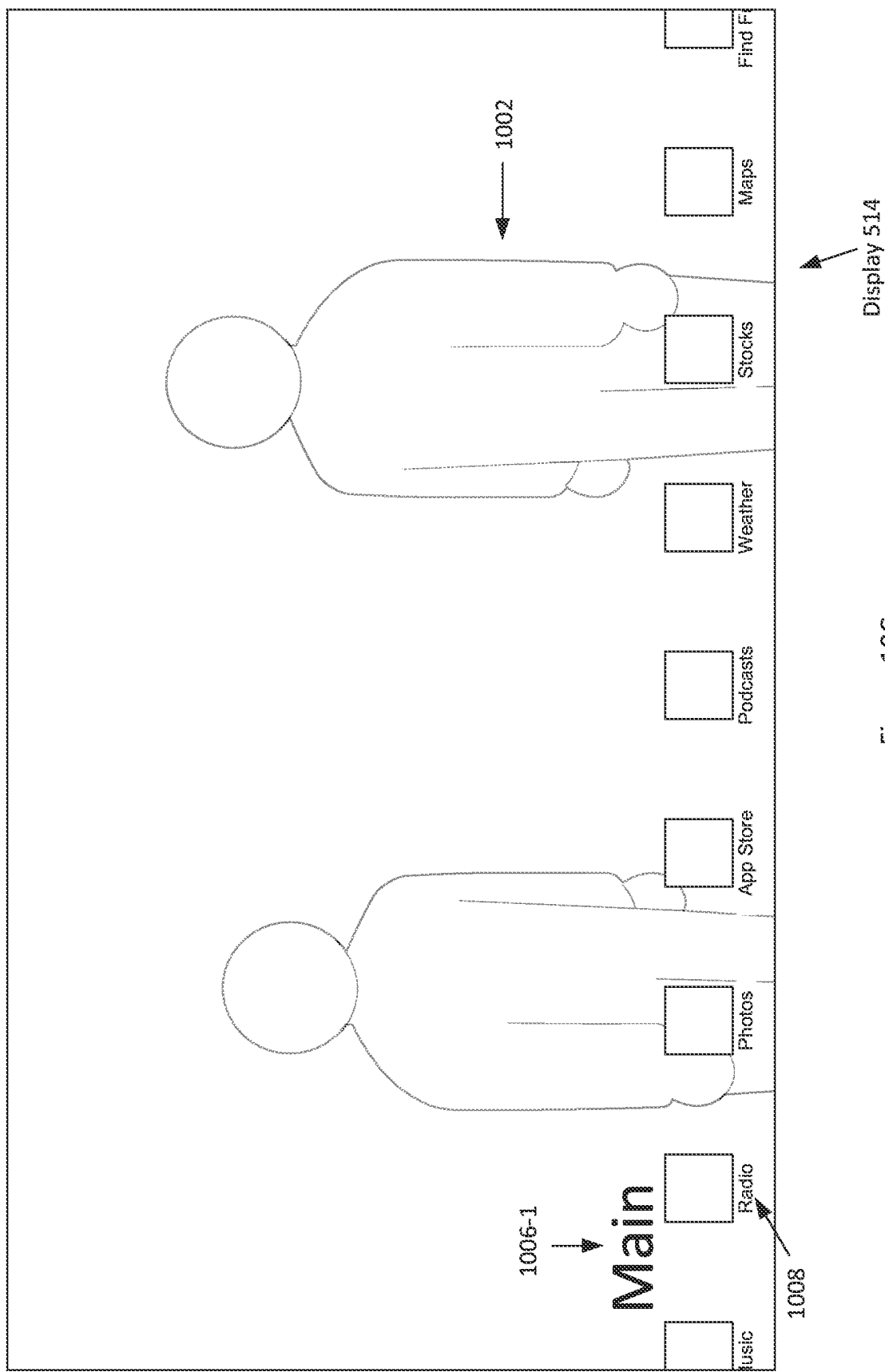

FIG. 10A illustrates an example user interface overlaid on visual content 1002 on a display 514 of an electronic device 500. The user interface includes groups of icons 1004-1 and 1004-2 arranged in a two-dimensional array of user interface objects. The user interface objects are divided into two groups: "Main" (with a corresponding heading 1006-1) and "Entertainment" (with a corresponding heading 1006-2).

In response to a request to change display of the set of icons, in FIGS. 10B-10G, the two-dimensional array is no longer presented on the display 514, and the user interface objects are presented arranged in a one-dimensional array 1008 that preserves the grouping from the two-dimensional array (e.g., even though the icons have been rearranged from a two-dimensional array to a one-dimensional array, they are still grouped into the same groups). The one-dimensional array 1008 in FIG. 10B obscures a smaller portion of the visual content 1002 than the two-dimensional array (made up of groups 1004-1 and 1004-2) in FIG. 10A.

As the one-dimensional array scrolls along the bottom edge of the display in FIGS. 10B-10G, the icons from the "Main" group remain grouped together, the icons from the "Entertainment" group remain grouped together, etc. Further, the heading corresponding to the group currently onscreen remains stationary on the left edge of the display as the icons scroll off screen. For example, "Main" heading 1006-1 remains at the edge of the display in FIGS. 10B-10D and is replaced by the "Entertainment" heading 1006-2 in FIG. 10E. The "Entertainment" heading 1006-2 remains stationary at the edge of the display in FIGS. 10F and 10G as icons in the one-dimensional array are scrolled along the bottom edge of the display.

Figure 10D:
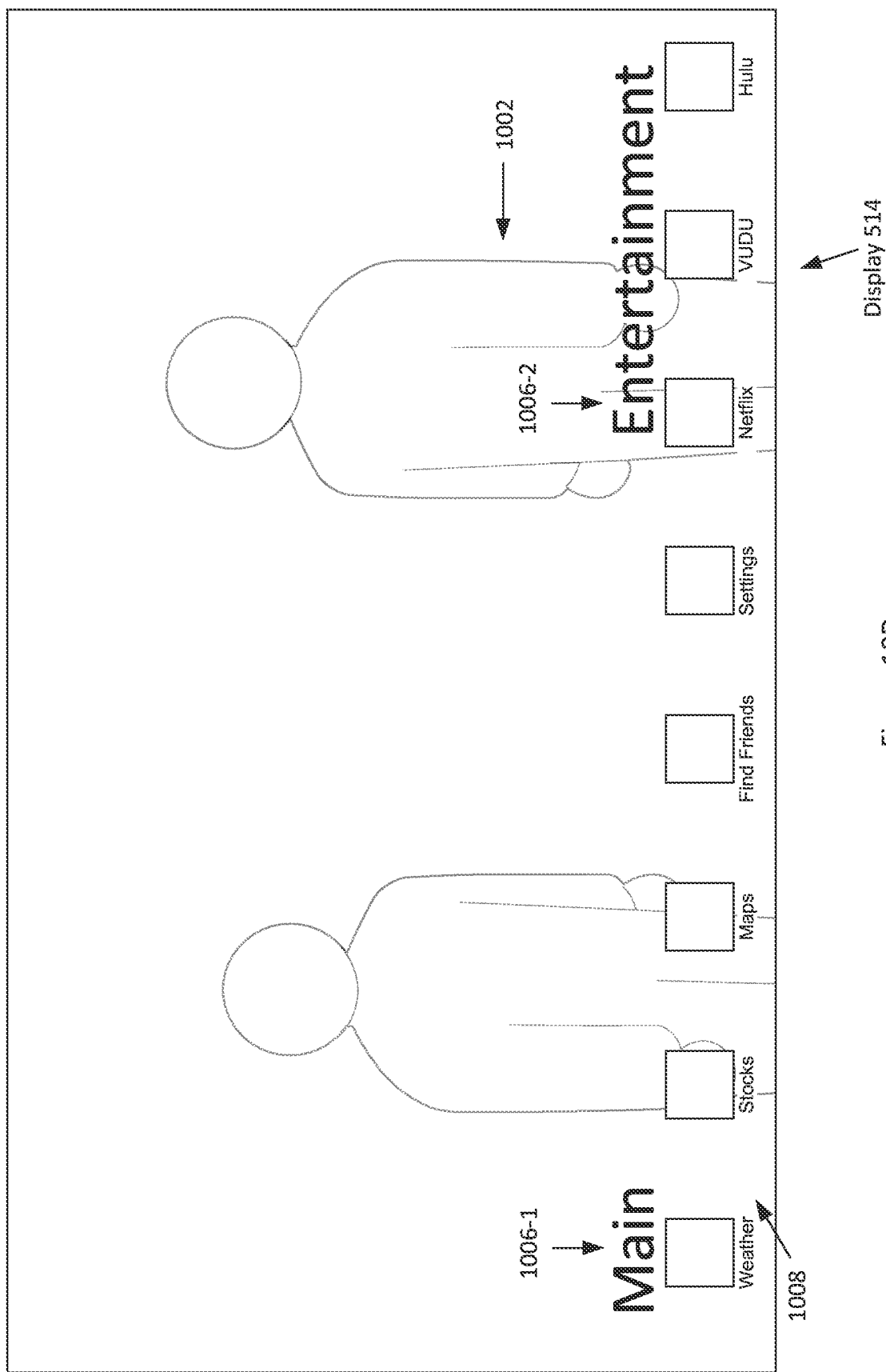
Figure 10E:
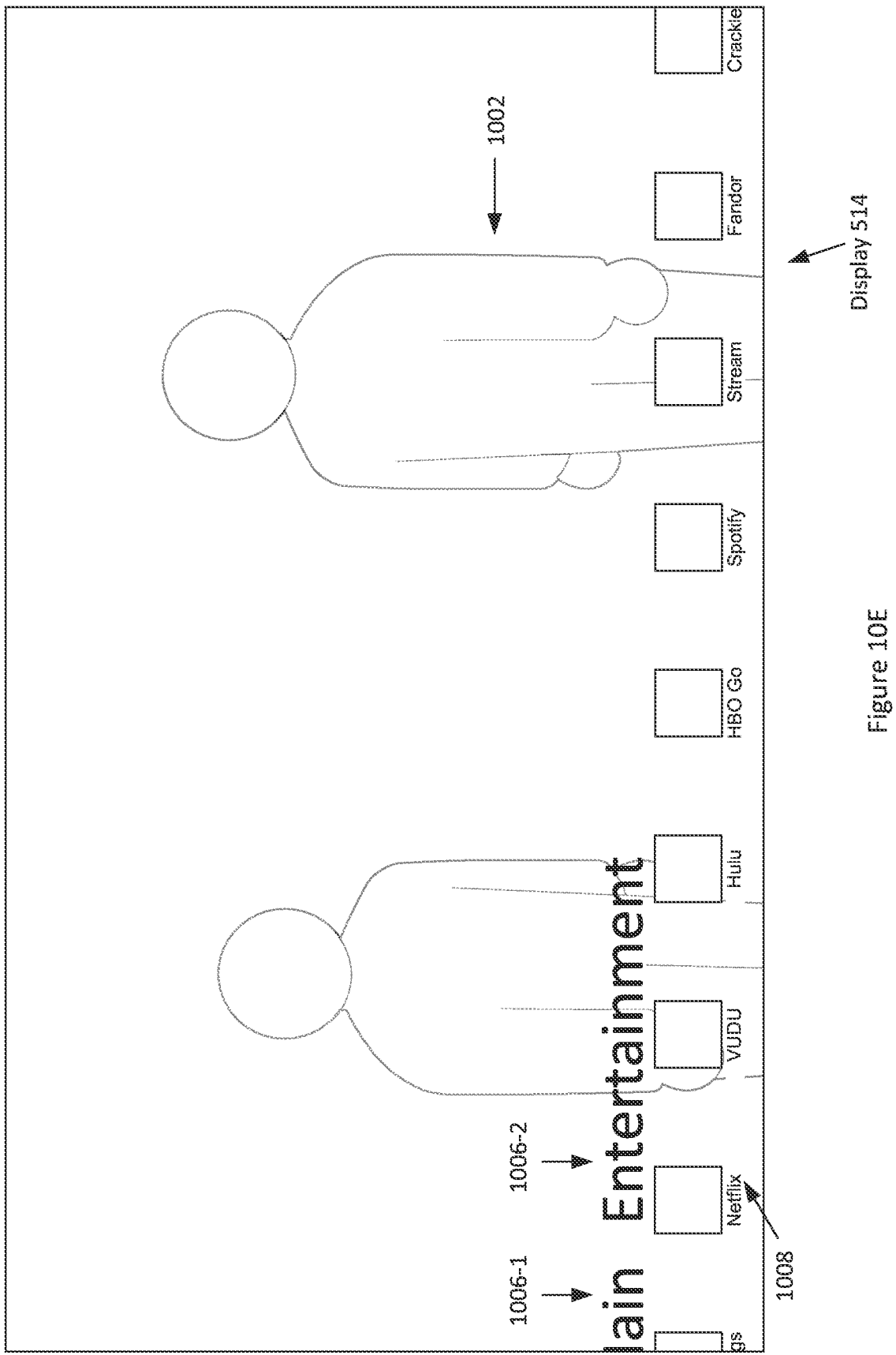
Figure 10F:
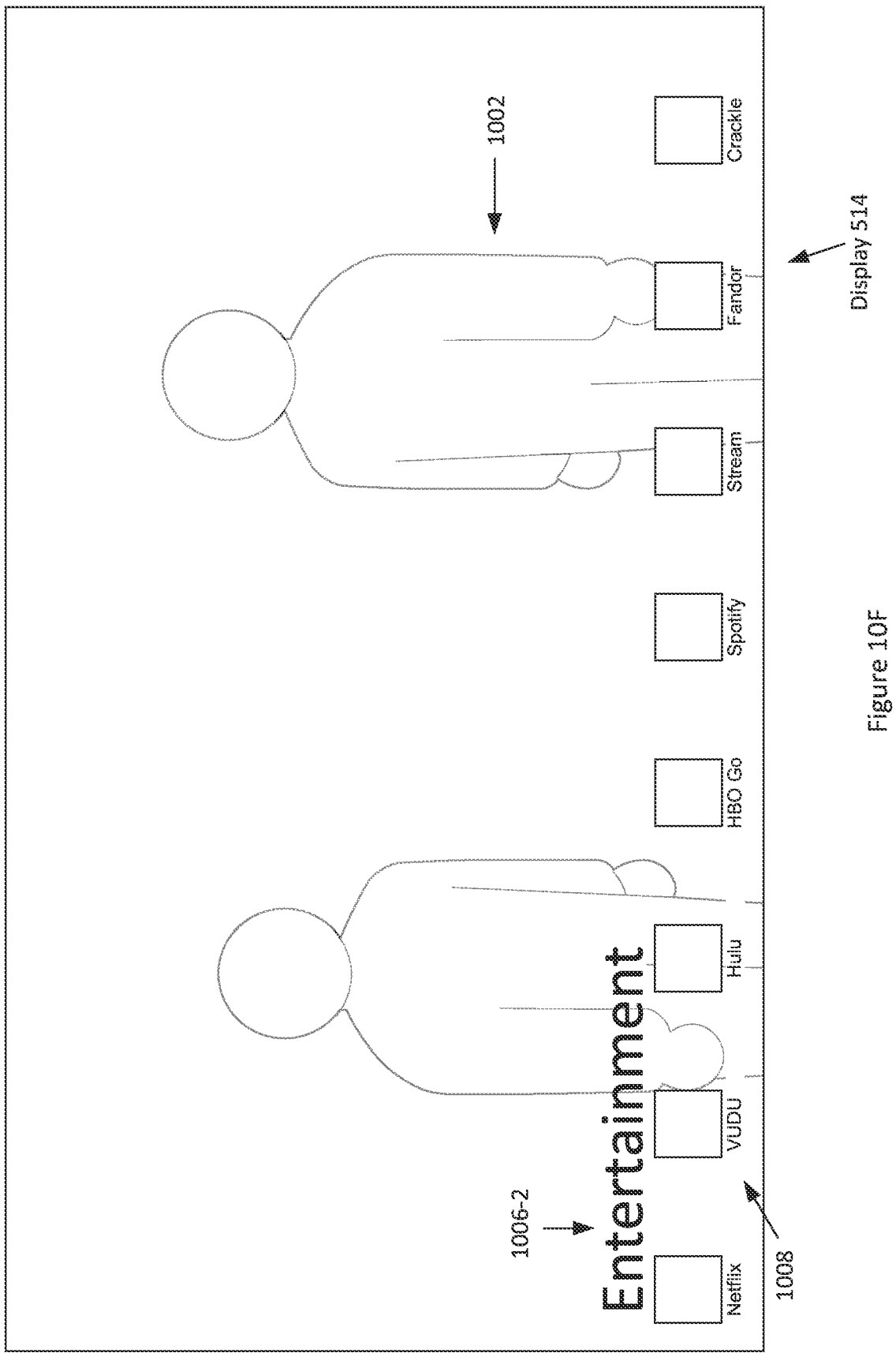
Figure 10G:
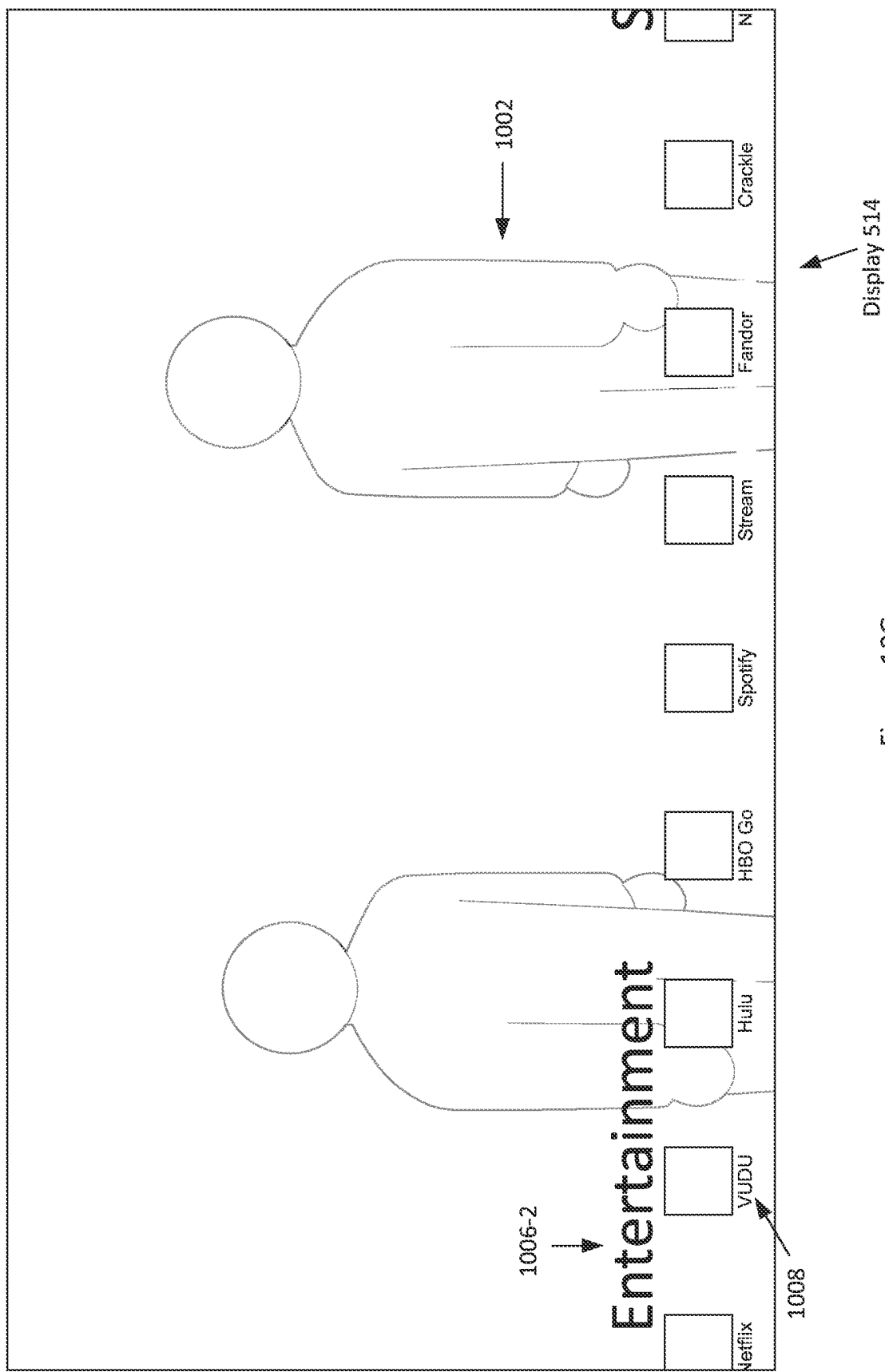
Figure 10H:
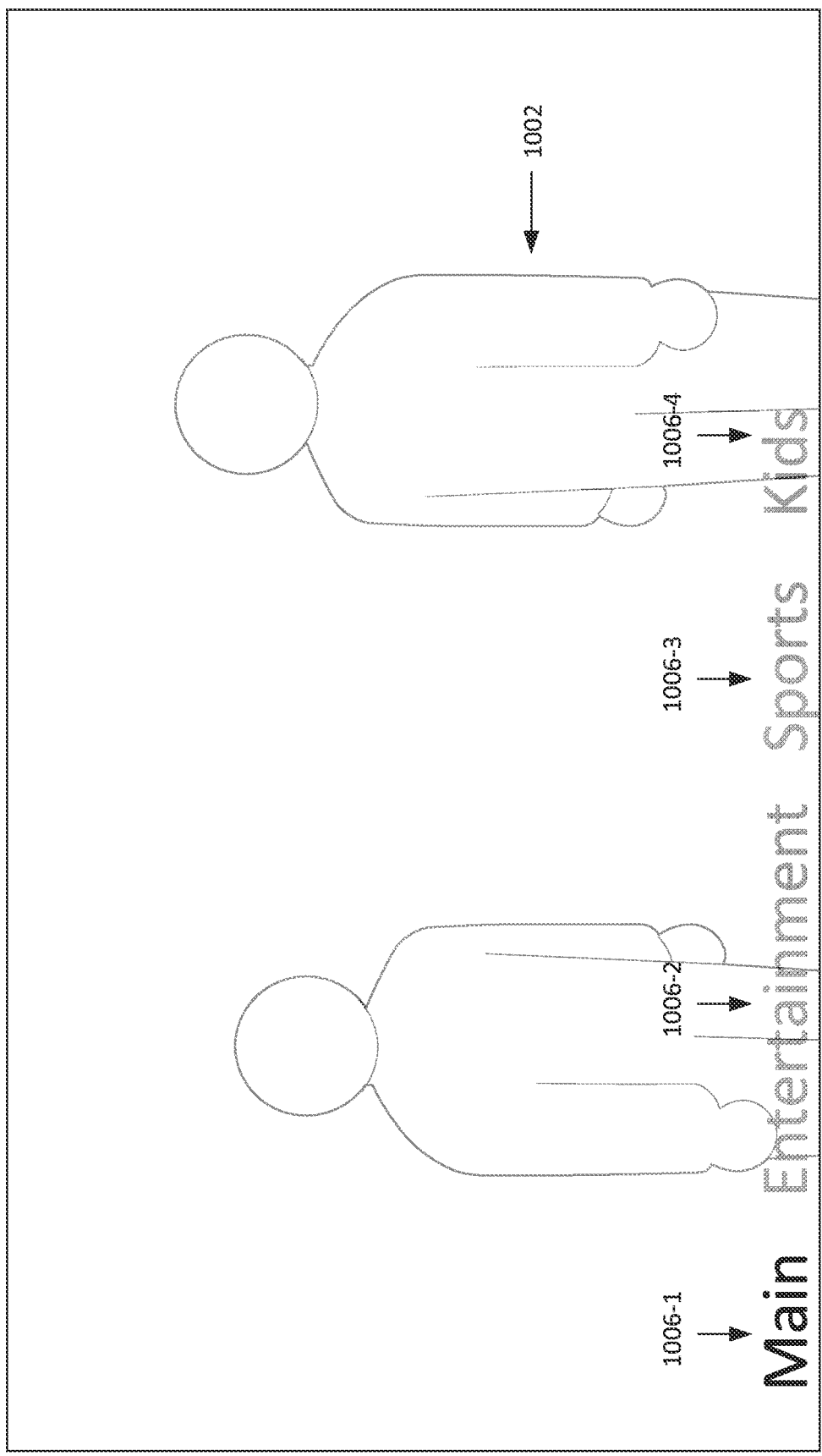
Figure 10I:
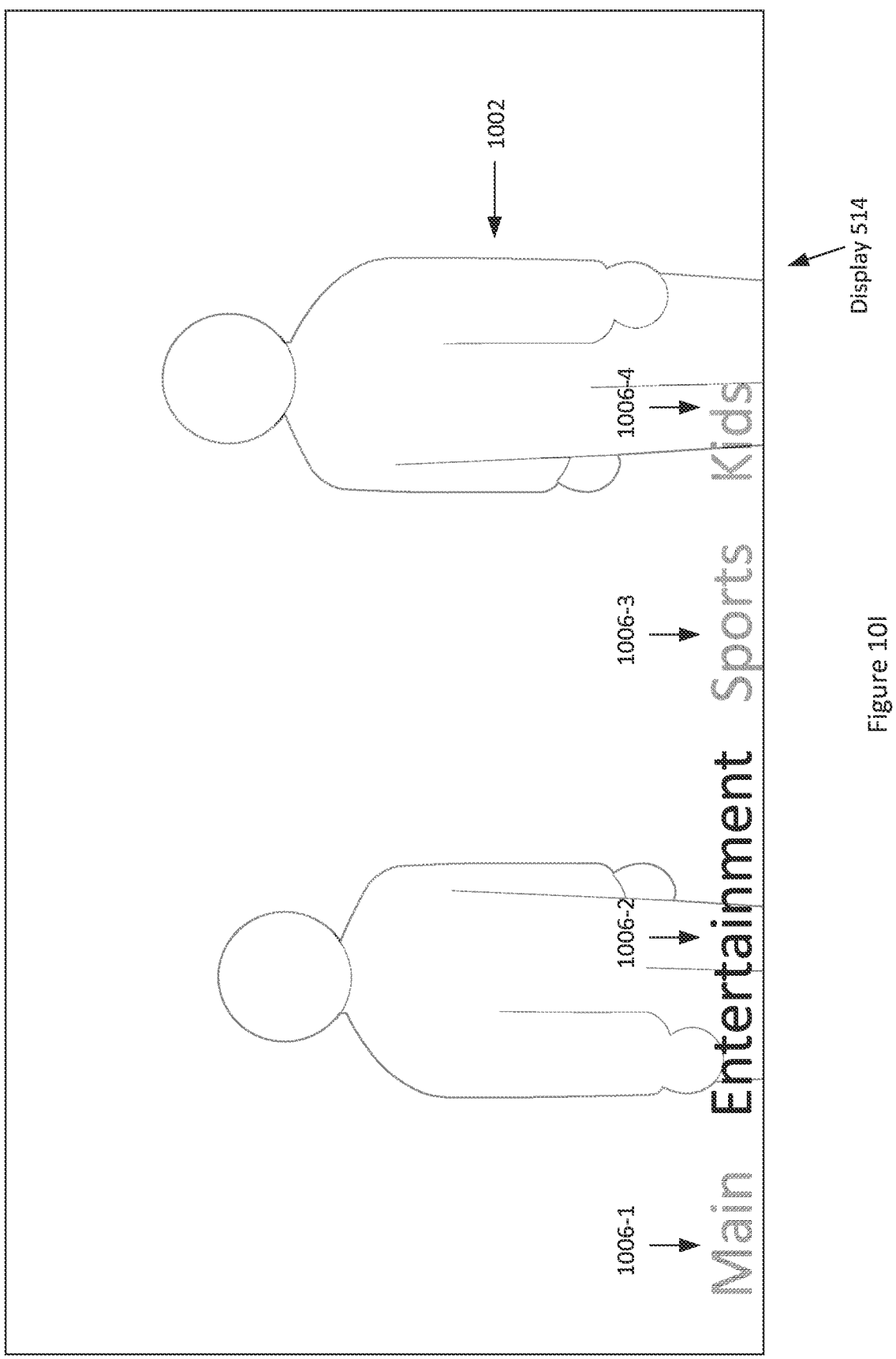

In response to an additional request to change display of the set of user interface objects, in FIGS. 10H and 10I, the one-dimensional array is no longer presented on the display 514, and only headings 1006-1, 1006-2, 1006-3, and 1006-4 are presented on the display. In FIG. 10H, the "Main" heading 1006-1 is highlighted, and in FIG. 10I, the "Entertainment" heading 1006-2 is highlighted. In response to receiving a selection of the "Entertainment" heading 1006-2 while it is highlighted, the user interface objects associated with the "Entertainment" group are displayed in a one-dimensional array in FIG. 10J. This enables a user to quickly switch between different groups of icons without requiring the user to scroll through the one-dimensional array to switch between groups.

Figure 11A:
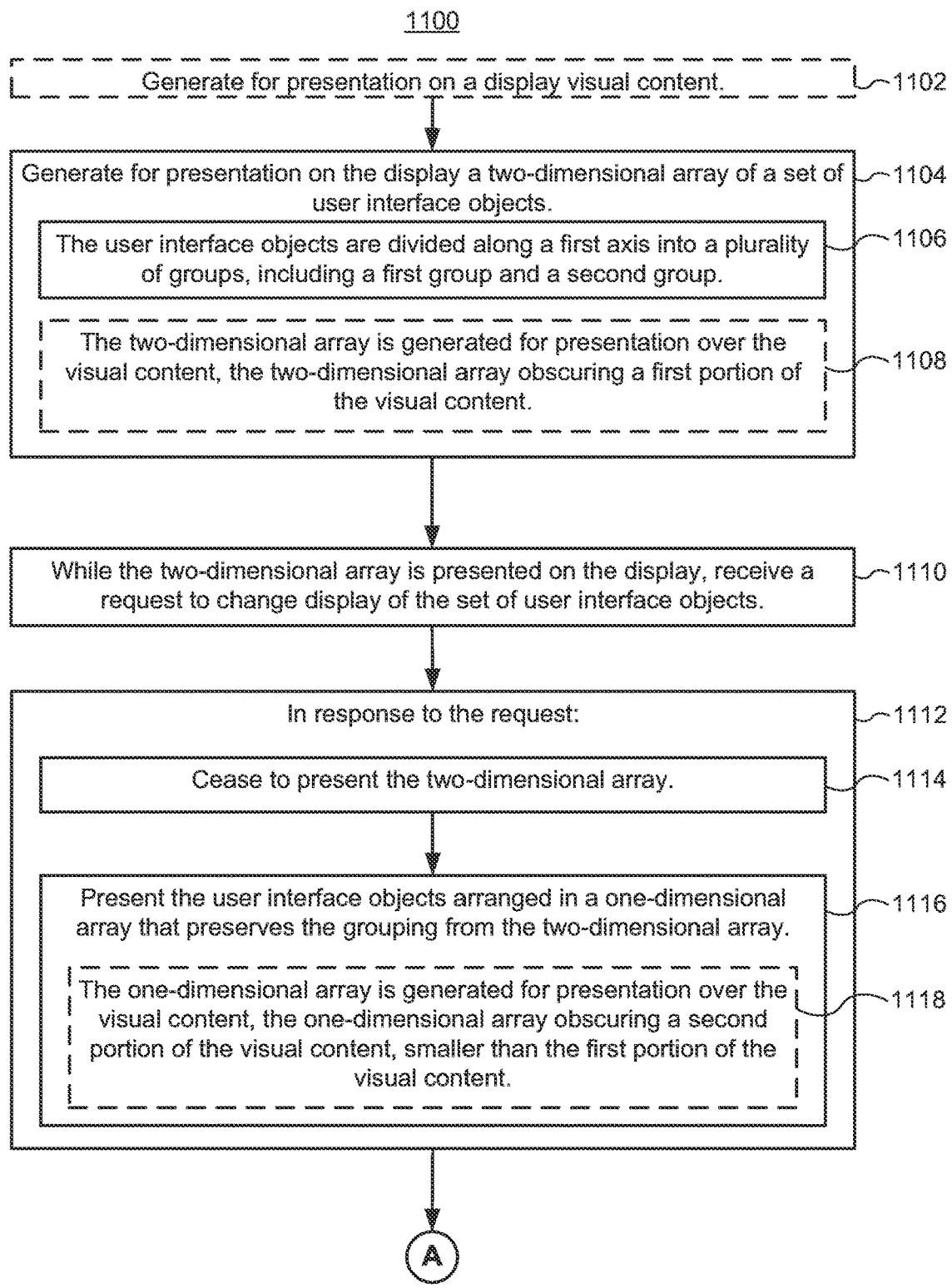
FIGS. 11A-11C are flow diagrams illustrating a method of a user interface including one-dimensional and two-dimensional arrays of user interface objects in accordance with some embodiments.
Figure 11B:
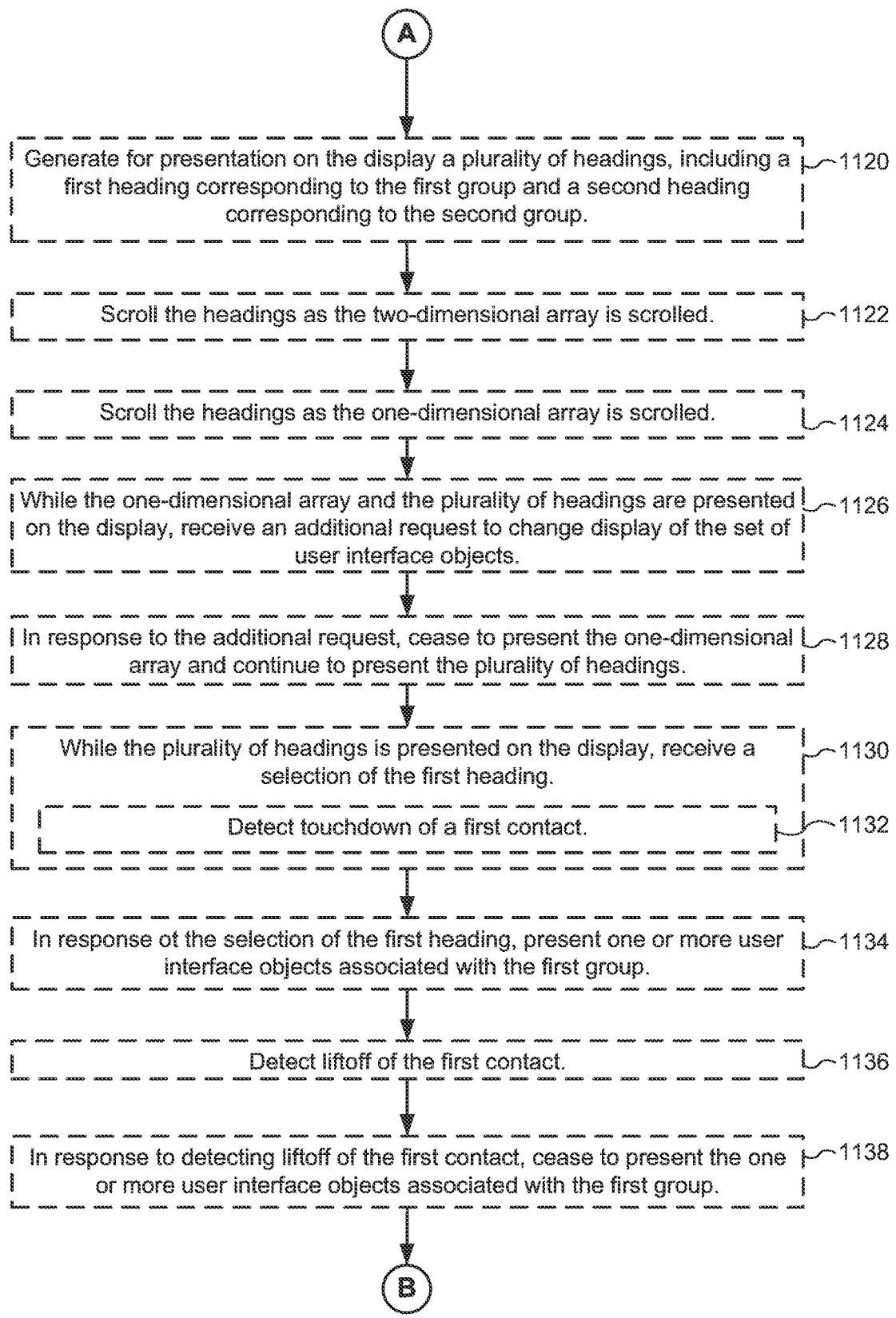
Figure 11C:
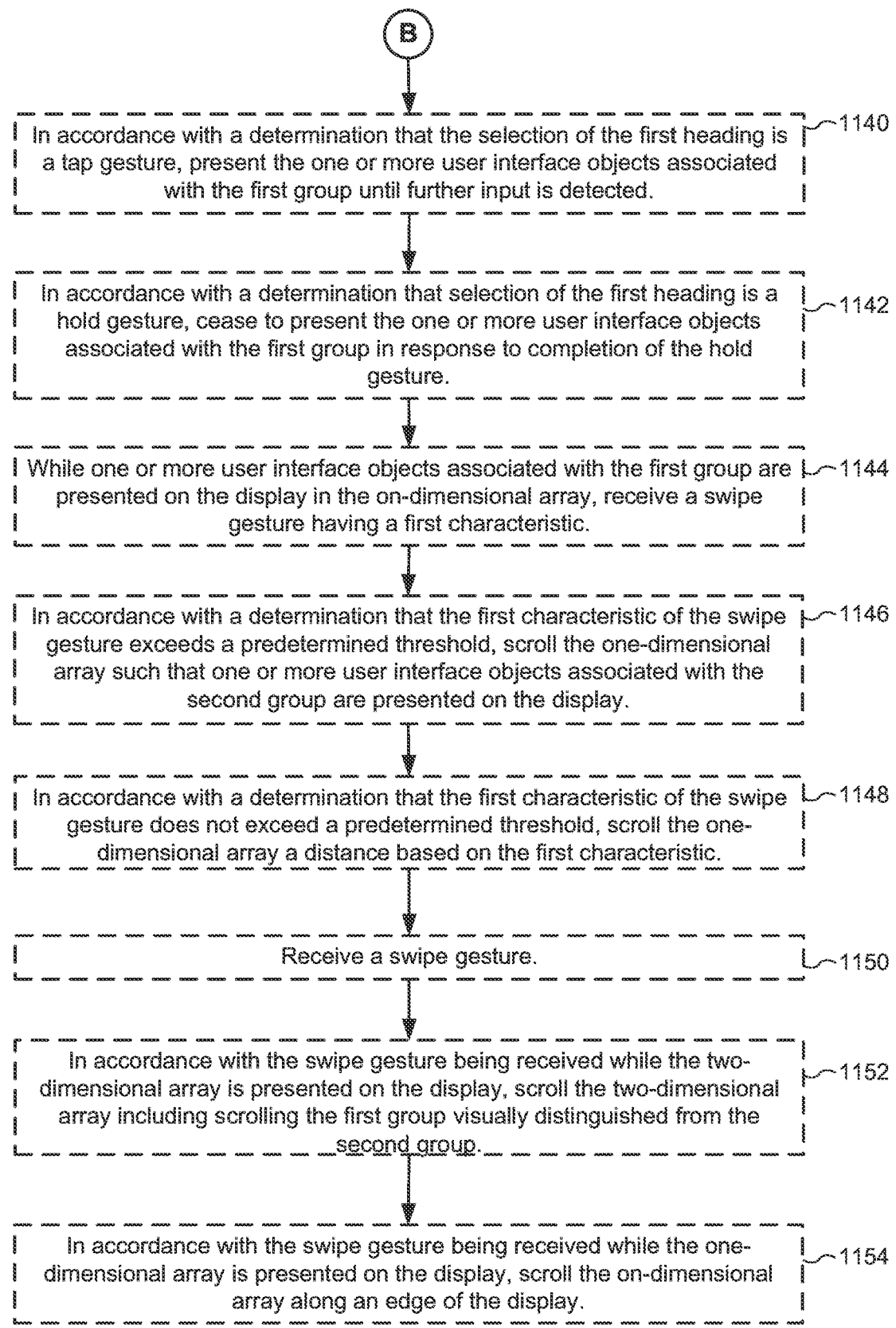

FIGS. 11A-11C are flow diagrams illustrating a method of a user interface including one-dimensional and two-dimensional arrays of user interface objects in accordance with some embodiments. The method is optionally performed at an electronic device as described above with reference to FIGS. 1-5 (e.g., electronic device 100, 300, or 500, etc.). Some operations in method 1100 are, optionally, combined and/or the order of some operations is, optionally, changed.

As described below, the method 1100 provides one-dimensional and two-dimensional arrays of user interface objects. The method reduces the cognitive burden on a user when interacting with a user interface on the device by providing an intuitive user interface that obscures a smaller portion of visual content, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (1104) for presentation on a display (e.g., a remote display device or a display that is integrated into the electronic device) a two-dimensional (e.g., a multi-column, multi-row) array of a set of user interface objects. The user interface objects are divided (1106) along a first (horizontal) axis into a plurality of groups, including a first group (that includes a plurality of columns, such as group 1004-1 in FIG. 10A) and a second group (that includes a plurality of columns, such as group 1004-2 in FIG. 10A).

While the two-dimensional array is presented on the display, the electronic device receives (1110) a request to change display of the set of user interface objects (e.g., a swipe up or down, a button press, etc.). In response to the request (1112), the electronic device ceases (1114) to present the two-dimensional array and presents (1116) the user interface objects arranged in a one-dimensional array (e.g., a single row or column) that preserves the grouping from the two-dimensional array. For example, FIGS. 10B-10G illustrate the one-dimensional array 1008 that preserves the grouping of the icons in the two-dimensional array illustrated in FIG. 10A.

In some embodiments, the electronic device generates (1102) for presentation on the display visual content (e.g., video content 1002 in FIG. 10A, one or more still images, a screen saver, etc.). The two-dimensional array is optionally generated (1108) for presentation over the visual content, the two-dimensional array obscuring a first portion of the visual content. For example, the groups 1004-1 and 1004-2 obscure a first portion of the visual content 1002 in FIG. 10A. The one-dimensional array is optionally generated (1118) for presentation over the visual content, the one-dimensional array obscuring a second portion of the visual content, smaller than the first portion of the visual content (e.g., the one-dimensional array presents fewer icons on the display than the two-dimensional array, thus a smaller portion of the visual content is obscured). For example, the one-dimensional array 1008 in FIG. 10B obscures smaller portion of the visual content 1002 than do the groups 1004-1 and 1004-2 in FIG. 10A.

In some embodiments, the electronic device generates (1120) for presentation on the display a plurality of headings, including a first heading corresponding to the first group and a second heading corresponding to the second group. The electronic device optionally scrolls (1122) the headings as the two-dimensional array is scrolled (e.g., the headings scroll off the display with the corresponding group, and headings are, optionally, not pinned to an edge of the user interface). The electronic device optionally scrolls (1124) the headings as the one-dimensional array is scrolled (e.g., with a heading pinned to an edge of the user interface, such that when a respective group of user interface objects is onscreen the corresponding heading is pinned to the edge of the user interface). For example, heading 1006-1 corresponds to group 1004-1 and heading 1006-2 corresponds to group 1004-2. The headings are pinned to the edge of the display when scrolled in the one-dimensional array, as illustrated in FIGS. 10B-10G.

In some embodiments, while the one-dimensional array and the plurality of headings are presented on the display, the electronic device optionally receives (1126) an additional request to change display of the set of user interface objects (e.g., a swipe up or down, a button press, etc.). In response to the additional request, the electronic device optionally ceases (1128) to present the one-dimensional array and continues to present the plurality of headings (and the user can select any of the headings to view the user interface objects associated with the heading). For example, FIGS. 10H and 10I illustrate the one-dimensional array 1008 no longer displayed while continuing to present headings 1006-1, 1006-2, 1006-3, and 1006-4.

Figure 10J:
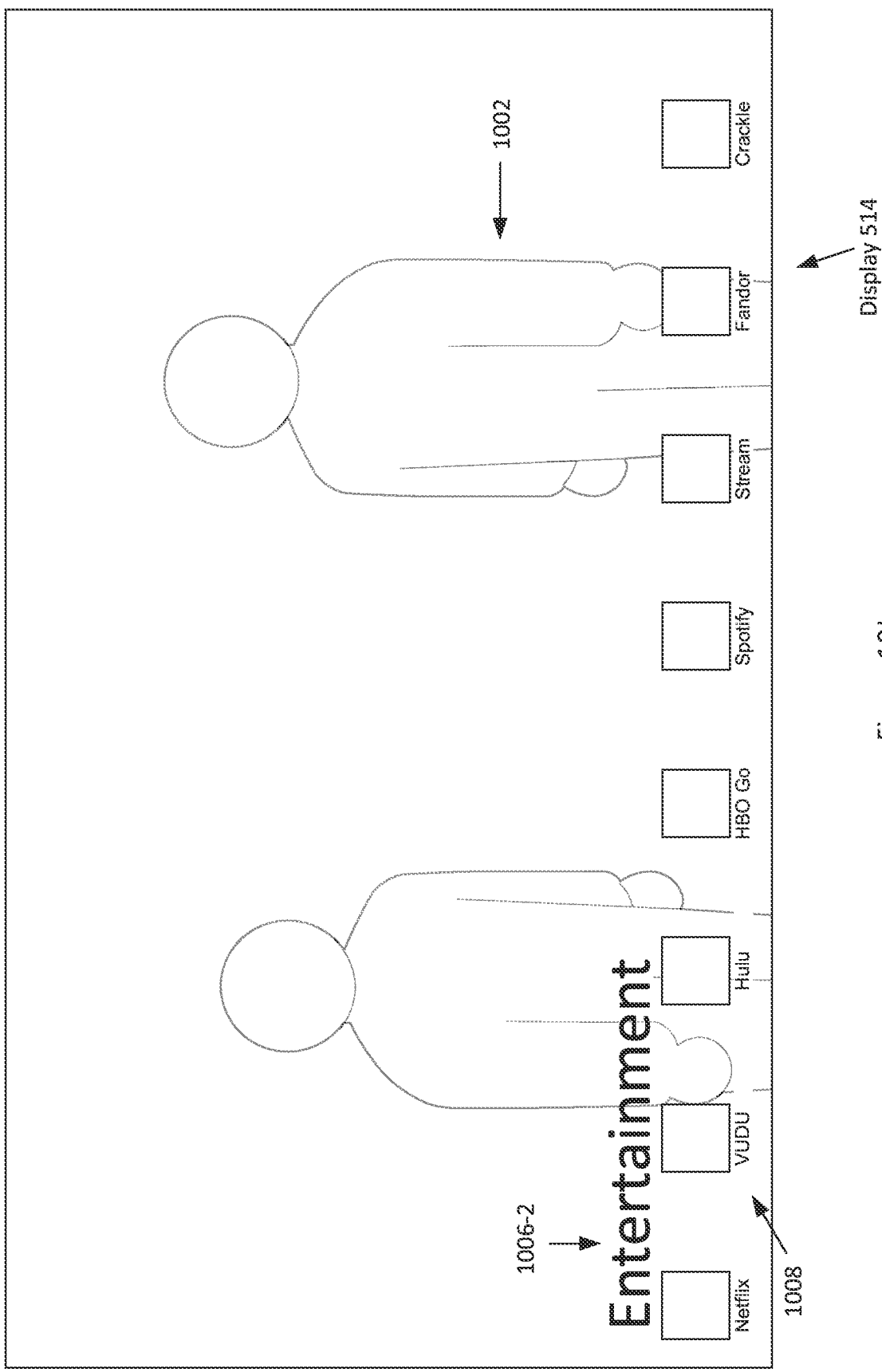

In some embodiments, while the plurality of headings is presented on the display, the electronic device optionally receives (1130) a selection of the first heading (e.g., a tap or a tap and hold while the first heading is highlighted. In response to the selection of the first heading, the electronic device optionally presents (1134) one or more user interface objects associated with the first group (the user interface objects arranged in the one-dimensional array). For example, FIG. 10J illustrates presenting icons associated with the "Entertainment" group in response to selection of the "Entertainment" heading in FIG. 10I.

In some embodiments, receiving the selection of the first heading includes (1132) detecting touchdown of a first contact. The electronic device optionally detects (1136) liftoff of the first contact and, in response to detecting liftoff of the first contact, ceases (1138) to present the one or more user interface objects associated with the first group.

In some embodiments, in accordance with a determination that the selection of the first heading is a tap gesture (e.g., the amount of time from touchdown of a contact to liftoff of the contact is less than a predetermined threshold), the electronic device optionally presents (1140) the one or more user interface objects associated with the first group until further input is detected. In accordance with a determination that the selection of the first heading is a hold gesture (e.g., the amount of time from touchdown of a contact to liftoff of the contact is exceeds a predetermined threshold), the electronic device optionally ceases (1142) to present the one or more user interface objects associated with the first group in response to completion of the hold gesture (e.g., in response to detecting liftoff of the contact from the touch-sensitive surface).

In some embodiments, while one or more user interface objects associated with the first group are presented on the display in the one-dimensional array, the electronic device optionally receives (1144) a swipe gesture having a first characteristic (e.g., a finger speed, a duration, etc.). In accordance with a determination that the first characteristic of the swipe gesture exceeds a predetermined threshold, the electronic device optionally scrolls (1146) the one-dimensional array such that one or more user interface objects associated with the second group are presented on the display (e.g., the row scrolls to the first icon in the next group). In accordance with a determination that the first characteristic of the swipe gesture does not exceed a predetermined threshold, the electronic device optionally scrolls (1148) the one-dimensional array a distance based on the first characteristic. For example, from FIG. 10B, receiving a swipe gesture that doesn't exceed the threshold optionally results in the one-dimensional array 1008 scrolling a distance based on the first characteristic and stopping partially between the two groups, as illustrated in FIG. 10D, whereas receiving a swipe gesture that does exceed the threshold optionally results in the one-dimensional array scrolling to the second group as illustrated in FIG. 10F.

In some embodiments, the electronic device receives (1150) a swipe gesture (e.g., detecting movement of a contact across the touch-sensitive surface in a first direction). In accordance with the swipe gesture being received while the two-dimensional array is presented on the display, the electronic device optionally scrolls (1152) the two-dimensional array including scrolling the first group visually distinguished from the second group (e.g., scrolling the first and second groups with a fixed space between the two groups, such as the fixed distance between groups 1004-1 and 1004-2 in FIG. 10A or the fixed distances between the groups 602-1, 602-2, 602-3, and 602-4 in FIGS. 6A-6C, scrolling the first and second groups with a vertical divider between the two groups, etc.). In some embodiments, the amount by which the two-dimensional array is scrolled is determined based on a parameter (e.g., speed, distance, velocity on liftoff) of the swipe gesture.

In some embodiments, in accordance with the swipe gesture being received while the one-dimensional array is presented on the display, the electronic device scrolls the one-dimensional array along an edge of the display (e.g., scrolling icons of the one-dimensional array along the bottom edge of the display with a fixed distance between the icons regardless of which groups the icons belong to, as shown with one-dimensional array 1008 in FIGS. 10B-10G, etc.). In some embodiments, the amount by which the one-dimensional array is scrolled is determined based on a parameter (e.g., speed, distance, velocity on liftoff) of the swipe gesture.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 11A-11C are, optionally, implemented by components depicted in FIGS. 1A-1B. For example, generating operation 1104, receiving operation 1110, ceasing operation 1114, and presenting operation 1116 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 11A-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1300) are also applicable in an analogous manner to method 1100 described above with respect to FIGS. 11A-11C. For example, the user interfaces, user interface objects, icons, groups, headings, visual content, and electronic devices described above with reference to method 1100 optionally have one or more of the characteristics of the user interfaces, user interface objects, icons, groups, headings, visual content, and electronic devices described herein with reference to other methods described herein (e.g., methods 700, 900, and 1300). For brevity, these details are not repeated here.

User Interface Animation Acceleration

Many electronic devices provide user interfaces that animate based on different inputs. There is a need to provide an intuitive interface that begins such animations before input is complete. The embodiments below provide an intuitive interface that seems to anticipate user intention before input is complete by beginning an animation portion that is common to two or more user interface responses.

FIGS. 12A-12F illustrate an exemplary user interface using a first animation portion to transition to either a first or second user interface response in accordance with some embodiments of the disclosure. The user interfaces in these figures are used to illustrate processes described below, including the processes described below with reference to FIGS. 13A-13C.

FIGS. 12A-12F illustrate first and second user interface responses to first and second gestures. For example, a first gesture optionally includes a single tap and a second gesture optionally includes a swipe up. In response to a single tap, a single row of icons is optionally displayed, and in response to a swipe up, a multi-column, multi-row array of icons is optionally displayed. After a touch down is received, it may not be determined whether a swipe up will be received, but the electronic device 500 optionally presents a first animation portion (e.g., displaying the single row of icons) that is common to both the first and second user interface responses.

Figure 12A:
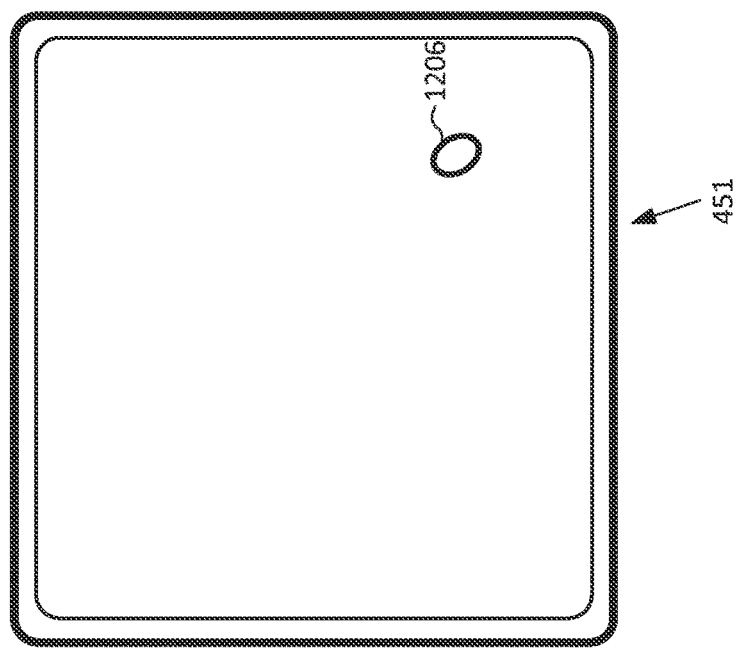
Figure 12A:
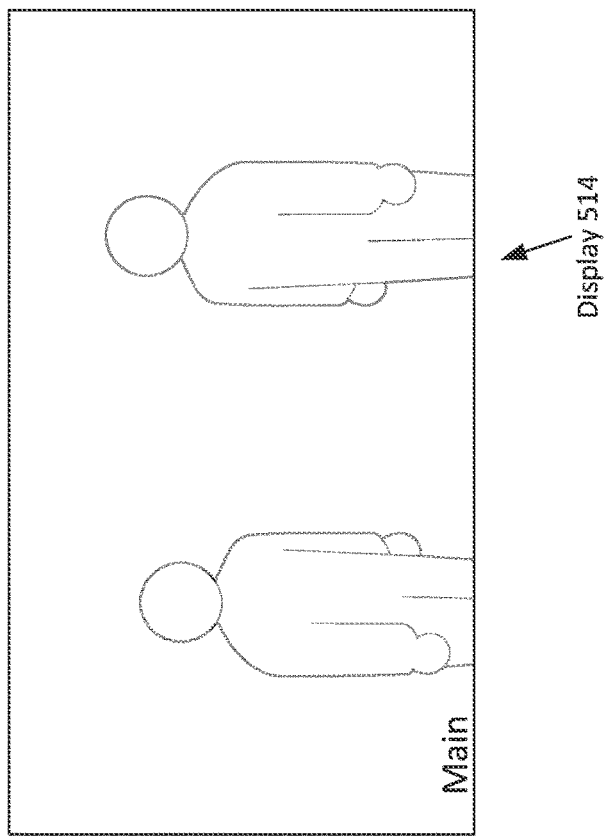
Figure 12B:
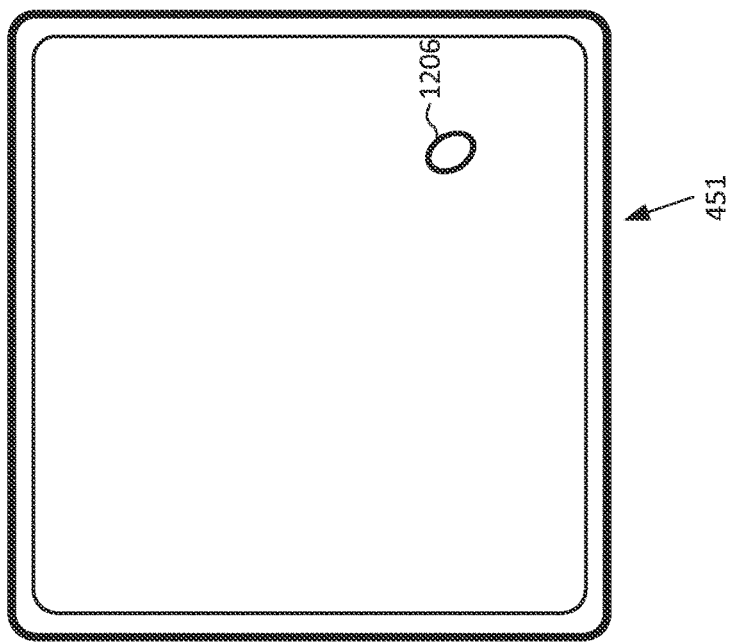
Figure 12B:
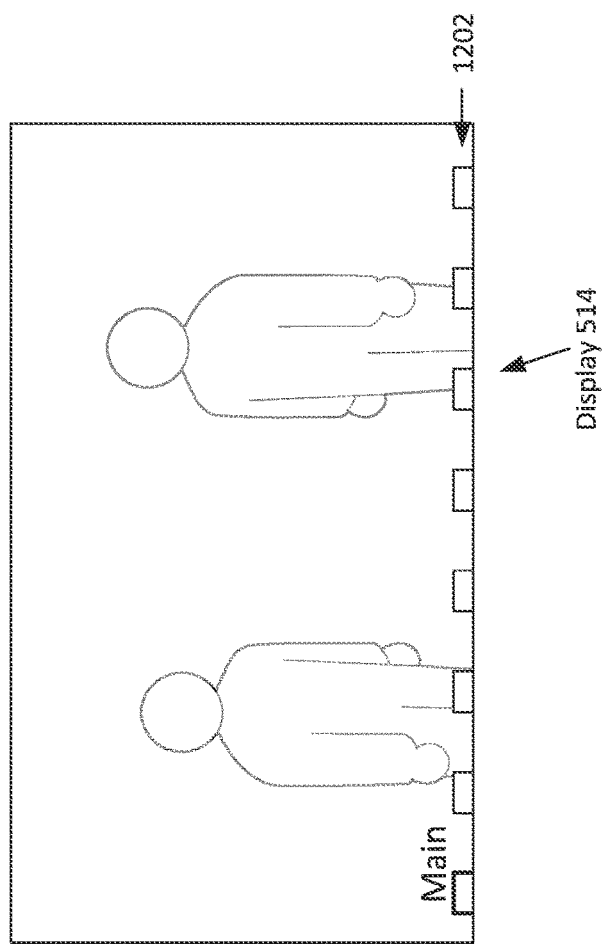
Figure 12D:
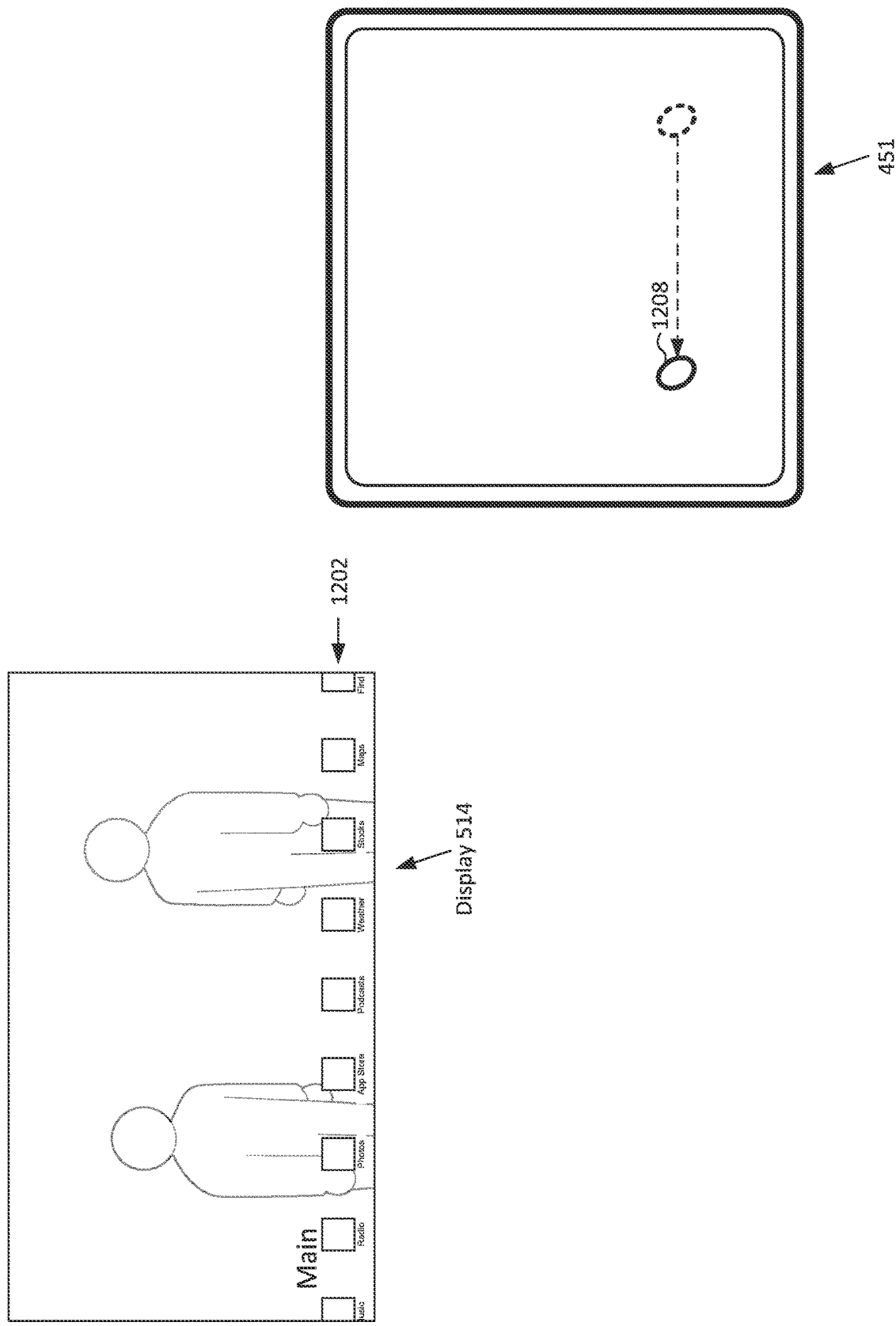
Figure 12E:
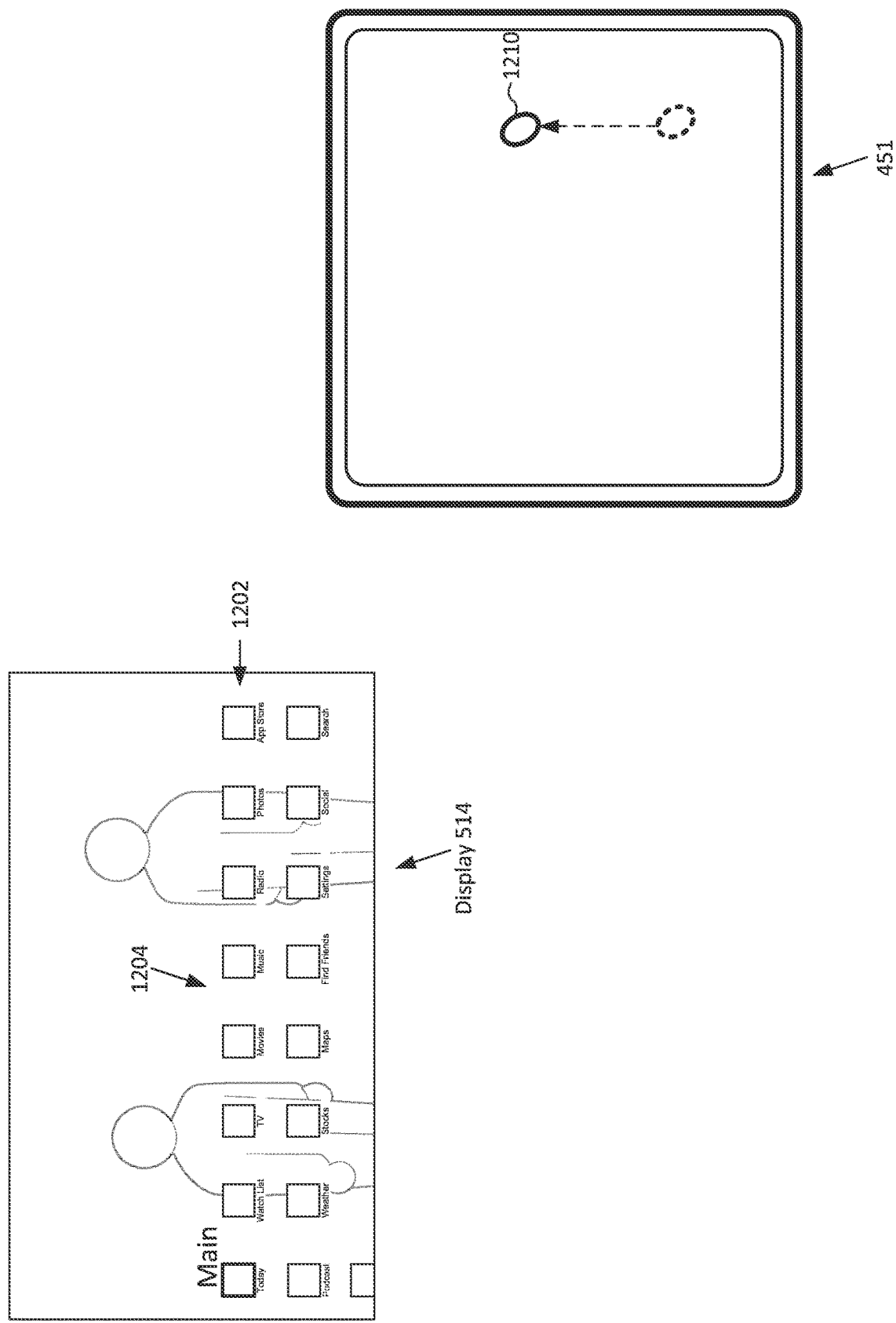
Figure 12F:
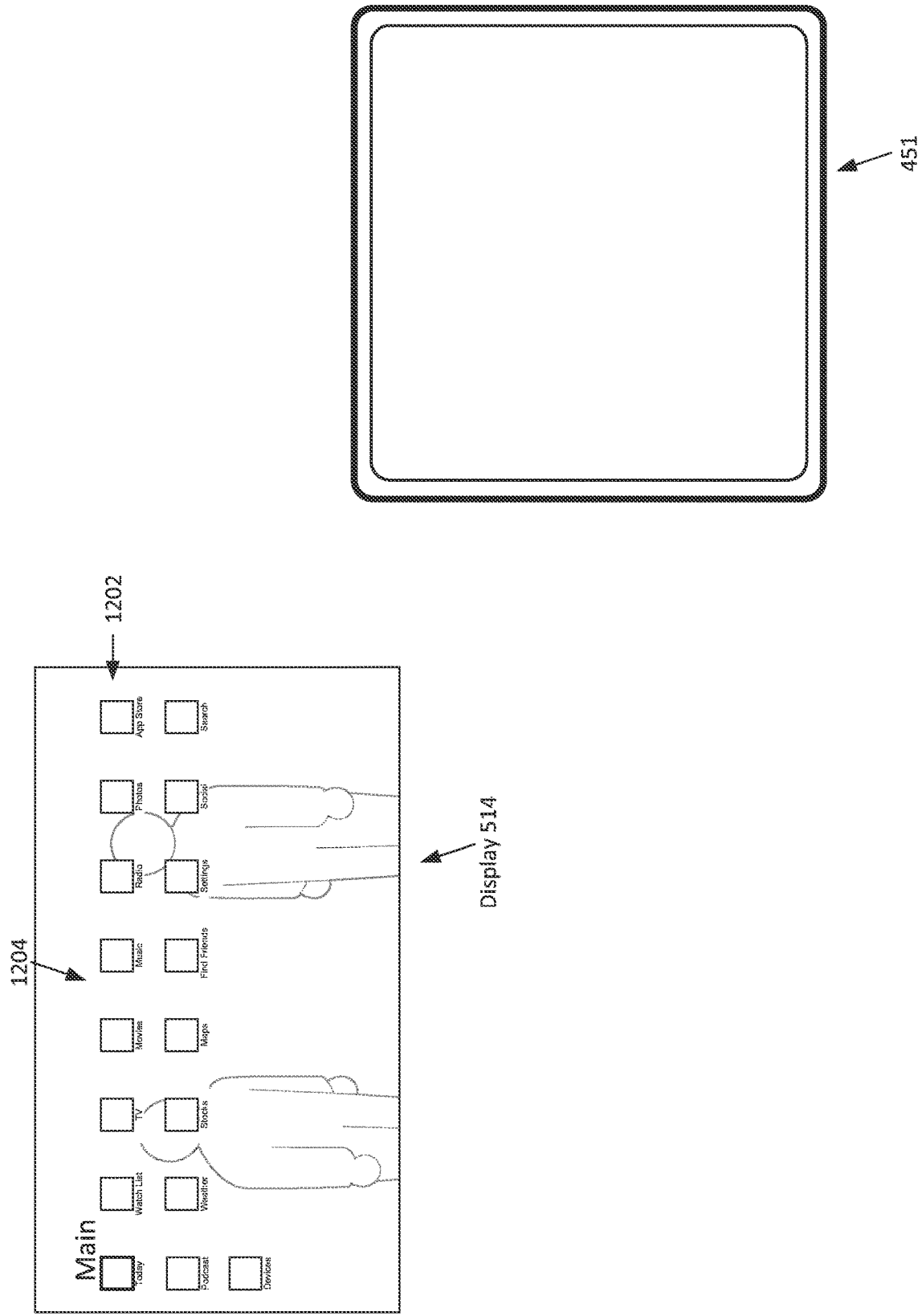

FIGS. 12A-12C illustrate the first animation portion gradually displaying a single row of icons 1202 from the bottom edge of the display 514, and FIGS. 12E-12F illustrate a second animation portion gradually displaying a multi-row, multi-column array of icons 1204 (which includes the single row 1202 as its first row). After a touch down 1206 is received on the touch sensitive surface 451, the electronic device optionally begins the first animation portion in FIGS. 12A-12C.

In FIG. 12D, a swipe left gesture 1208 is received. In response, it is determined that the touch down 1206 was not part of a swipe up gesture, the animation stops after the first animation portion in 12C, and the single row of icons 1202 scrolls in response to the swipe left gesture 1208, as illustrated in FIG. 12D.

In contrast, FIGS. 12E-12F illustrate receiving a swipe up gesture 1210 following the touch down 1206. In response, the electronic device continues the animation with a second animation portion as illustrated in FIGS. 12E-12F optionally in a continuous, smooth animation. FIGS. 12A-12C and 12E-F illustrate the first and second animation portions together in the continuous, smooth animation in response to the touch down 1206 and swipe gesture 1210.

The user interface illustrated in FIG. 12A is optionally the same as the heading user interface illustrated in FIGS. 10H-10I. The user interface including the row of icons 1202 in FIGS. 12B-12C is optionally the same as the single row user interface illustrated in FIGS. 10B-10G and 10J. The user interface including the multi-row, multi-column array of icons 1204 in FIGS. 12E-12F is optionally the same as the multi-row, multi-column user interface illustrated in FIGS. 6A-S and 10A.

Figure 13A:
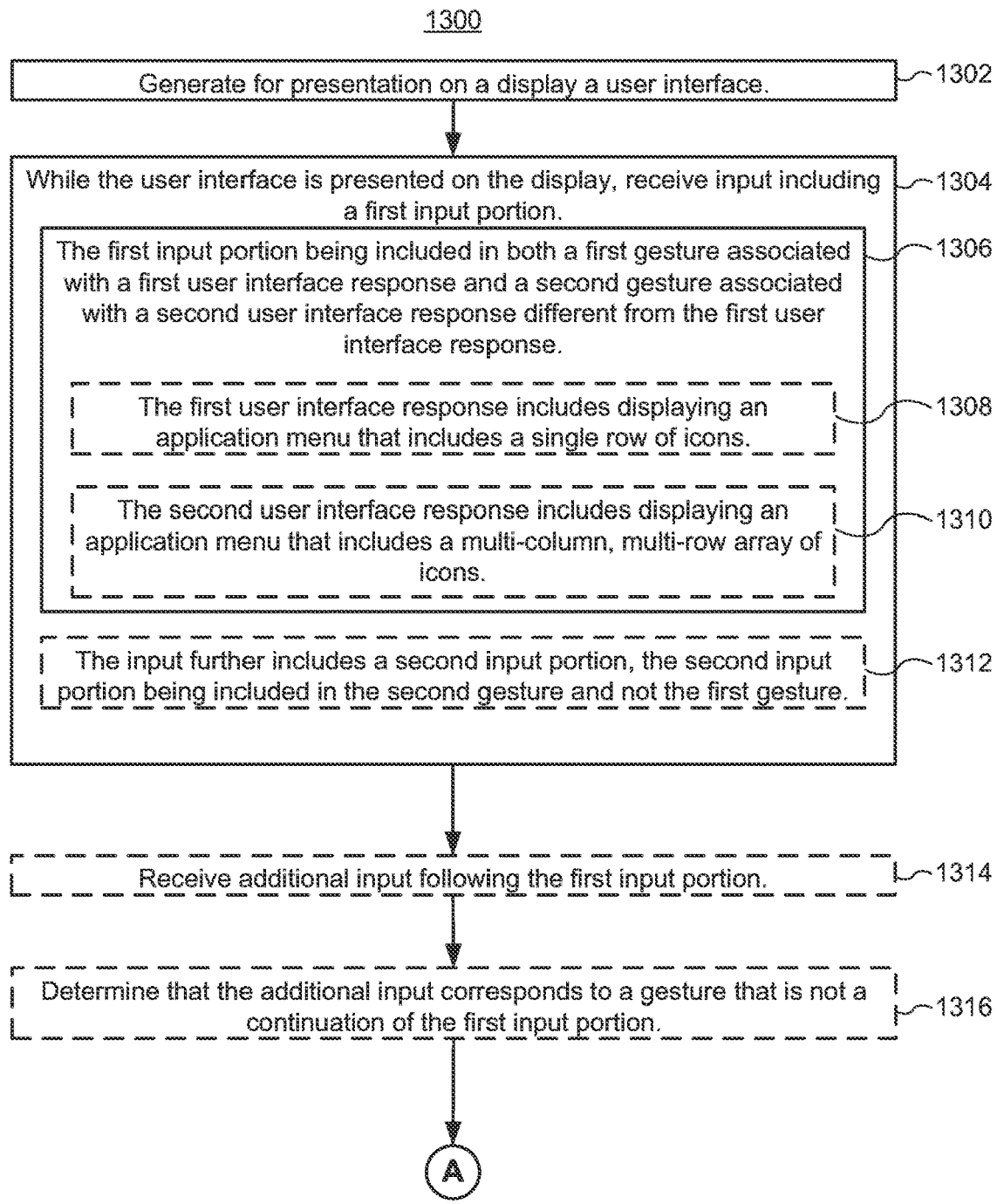
Figure 13B:
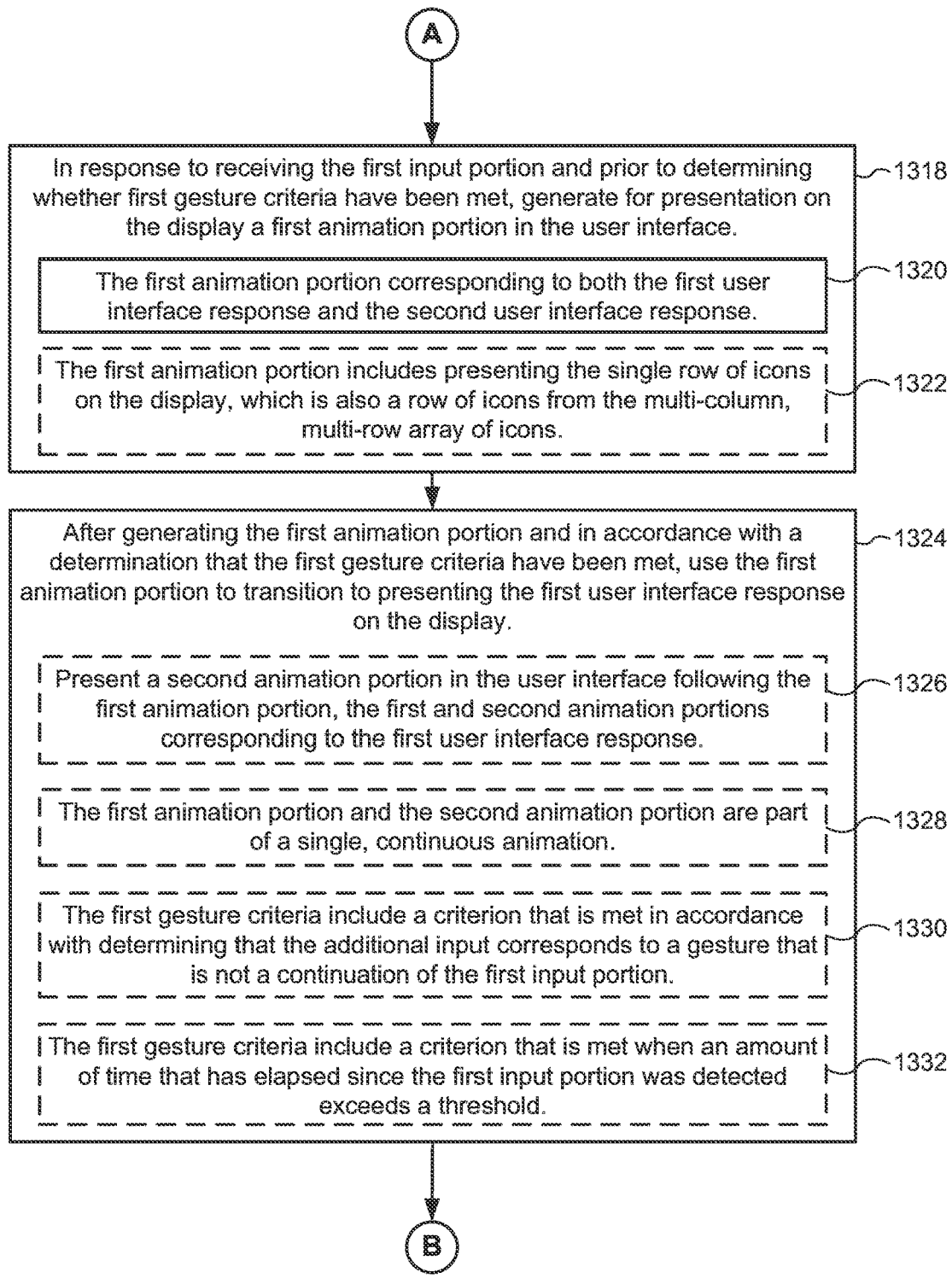

FIGS. 13A-13C are flow diagrams illustrating a method of using a first animation portion to transition to either a first or second user interface response in accordance with some embodiments. The method is optionally performed at an electronic device as described above with reference to FIGS. 1-5 (e.g., electronic device 100, 300, or 500, etc.). Some operations in method 1100 are, optionally, combined and/or the order of some operations is, optionally, changed.

As described below, the method 1100 provides ways of using a first animation portion to transition to either a first or second user interface response. The method reduces the cognitive burden on a user when interacting with a user interface on the device by providing an intuitive user interface that seems to anticipate the user's input before it is complete, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (1302) for presentation on a display (e.g., a remote display device or a display that is integrated into the electronic device) a user interface. While the user interface is presented on the display, the electronic device receives (1304) input including a first input portion (e.g., the touch down 1206 received on touch sensitive surface 451 in FIGS. 12A-12C). The first input portion is included (1306) in both a first gesture associated with a first user interface response and a second gesture associated with a second user interface response different from the first user interface response (e.g., the first input portion is a first tap, the first gesture is a single tap, and the second gesture is a double tap; the first input portion is a touch down, the first gesture is a single tap, and the second gesture is a swipe up; the first input portion is touch down of two fingers, the first gesture is a two finger swipe, and the second gesture is a two finger pinch to zoom; etc.). For example, the touch down 1206 in FIGS. 12A-12C is included in both a single tap gesture associated with displaying the single row of icons 1202 and a swipe up gesture (when the touch down 1206 is followed by swipe up 1210) associated with displaying a multi-row, multi-column array of icons 1204.

In response to receiving the first input portion and prior to determining whether first gesture criteria have been met (e.g., prior to determining whether the input corresponds to the first gesture or the second gesture), the electronic device generates (1318) for presentation on the display a first animation portion in the user interface, the first animation portion corresponding to both the first user interface response and the second user interface response (because the first animation portion corresponds to both the first gesture and the second gesture, the first animation portion can begin even before it has been determined wither the input corresponds to the first gesture or the second gesture). For example, in FIGS. 12A-12F, the first animation portion from 12A-12C corresponds to both displaying a single row of icons and displaying a multi-row, multi-column array of icons.

After generating the first animation portion (and, optionally, after the first animation portion has been at least partially presented on the display) and in accordance with a determination that the first gesture criteria have been met (e.g., determining that the input corresponds to the first gesture), the electronic device uses (1324) the first animation portion to transition to presenting the first user interface response on the display. For example, the first animation portion from FIGS. 12A-12C is used to transition to the first user interface response of displaying a single row of icons 1202 in FIG. 12C.

In some embodiments, using the first animation portion to transition to presenting the first user interface response includes presenting (1326) a second animation portion in the user interface following the first animation portion, the first and second animation portions corresponding to the first user interface response (and not the second user interface response). The first animation portion and the second animation portion are optionally part (1328) of a single, continuous animation (e.g., the first animation portion includes a row of icons appearing partially from an edge of the display, and the second animation portion includes the row of icons fully appearing from the edge of the display, such that the first and second animation portions include a single, continuous animation of the row of icons appearing from the edge of the display, as illustrated in FIGS. 12A-12C).

In some embodiments, the input includes (1312) a second input portion, the second input portion being included in the second gesture and not the first gesture (e.g., the swipe up 1210 in FIG. 12E is included in a swipe up gesture but not a single tap gesture). After generating the first animation portion (and, optionally, after the first animation portion has been at least partially presented on the display) and in accordance with a determination that second gesture criteria have been met (e.g., determining that input corresponds to the second gesture), the electronic device optionally presents (1334) a third animation portion in the user interface following the first animation portion, the first and third animation portions corresponding to the second user interface response on the display (and not the first user interface response). The first animation portion and the third animation portion are optionally part (1336) of a single, continuous animation that corresponds to the second user interface response and is different from an animation corresponding to the first user interface response (e.g., the first user interface response includes only a single row of icons appearing from an edge of the display, and the second user interface response includes a multi-column, multi-row array of icons appearing from the edge of the display; the first animation portion includes just the single row 1202 appearing, and in the second user interface response the third animation portion continues in a single, continuous animation until the entire multi-column, multi-row array 1204 is presented on the display, as illustrated in FIGS. 12A-12C and 12E-12F).

In some embodiments, the electronic device receives (1314) additional input following the first input portion, and determines (1316) that the additional input corresponds to a gesture that is not a continuation of the first input portion. The first gesture criteria optionally include (1330) a criterion that is met in accordance with determining that the additional input corresponds to a gesture that is not a continuation of the first input portion (e.g., it is determined the input corresponds to the first gesture if new input is received that cannot be a continuation of the first input portion).

In some embodiments, the first gesture criteria include (1332) a criterion that is met when an amount of time that has elapsed since the first input portion was detected exceeds a threshold.

In some embodiments, the first user interface response includes displaying (1308) an application menu that includes a single row of icons (e.g., the row of icons 1202 displayed in FIG. 12C), the second user interface response optionally includes displaying (1310) an application menu that includes a multi-column, multi-row array of icons (e.g., the array of icons 1204 displayed in FIG. 12E-12F), and the first animation portion optionally includes (1322) presenting the single row of icons on the display, which is also a row of icons from the multi-column, multi-row array of icons (e.g., the first animation portion from 12A-12C of the row of icons 1202, which is also a row from the array of icons 1204 in FIGS. 12E-12F).

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 13A-13C are, optionally, implemented by components depicted in FIGS. 1A-1B. For example, generating operation 1302, receiving operation 1304, generating operation 1318, and using operation 1324 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1100) are also applicable in an analogous manner to method 1300 described above with respect to FIGS. 13A-13C. For example, the user interfaces, user interface objects, icons, groups, headings, visual content, and electronic devices described above with reference to method 1300 optionally have one or more of the characteristics of the user interfaces, user interface objects, icons, groups, headings, visual content, and electronic devices described herein with reference to other methods described herein (e.g., methods 700, 900, and 1100). For brevity, these details are not repeated here.

Figure 14:
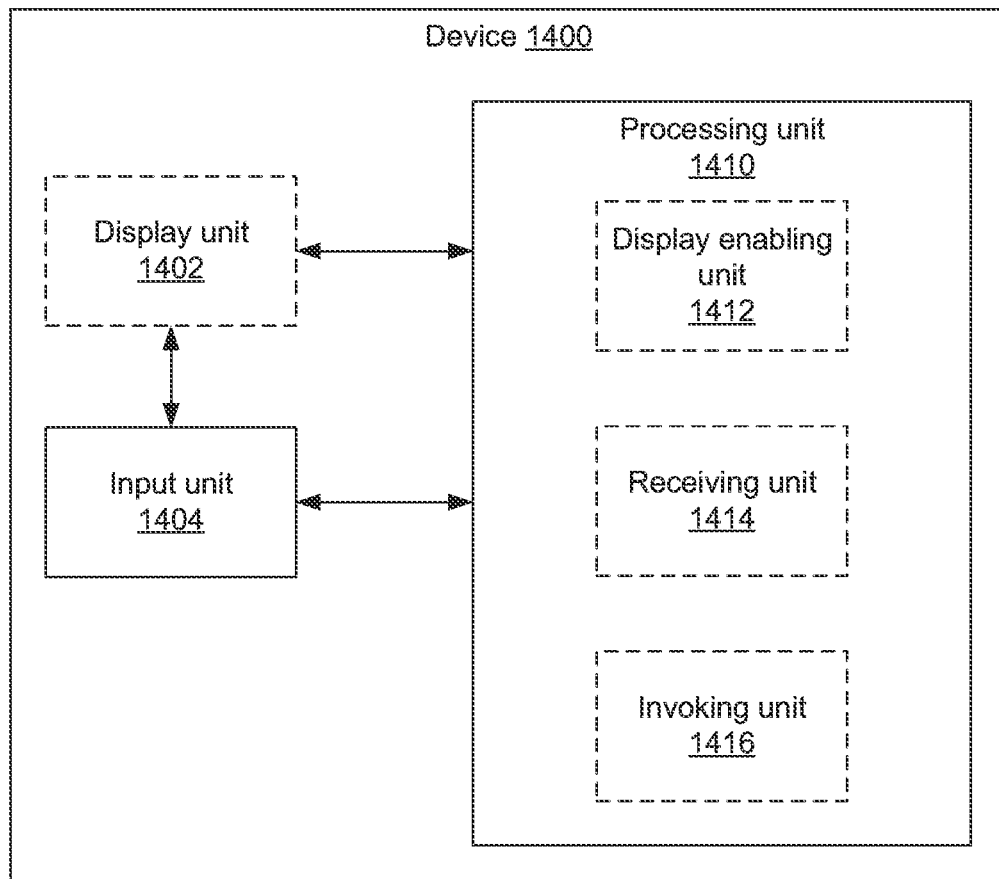
FIGS. 14-17 show functional block diagrams of electronic devices configured in accordance with the principles of the various described embodiments, in accordance with some embodiments of the disclosure.

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 optionally includes a display unit 1402 configured to display a user interface including one or more user interface objects (e.g., icons associated with applications); an input unit 1404 to receive user input, selections, etc. (e.g., touch-sensitive surface, keyboard, mouse, or other input unit); and a processing unit 1410 coupled to the display unit 1402 and the input unit 1404. In some embodiments, the processing unit 1410 optionally includes a display enabling unit 1412, a receiving unit 1414, and an invoking unit 1416.

In some embodiments, the processing unit 1410 is configured to generate (e.g., with the display enabling unit 1412) for presentation on a display a user interface including a plurality of groups of icons, wherein a plurality of the icons have been grouped based at least in part on metadata of applications associated with the icons. The processing unit 1410 is further configured to receive input (e.g., with the receiving unit 1414) selecting a respective icon, and, in response to receiving the input selecting a respective icon, invoke (e.g., with the invoking unit 1416) an instance of an application associated with the respective icon.

In some embodiments, the user interface has first and second modes, and the processing unit 1410 is further configured to display (e.g., with the display enabling unit 1412) the icons having a first visual characteristic in the first mode, and display (e.g., with the display enabling unit 1412) the icons having a second visual characteristic in the second mode. In some embodiments, displaying the icons having the first visual characteristic includes displaying a single group of icons at a first zoom level, and displaying the icons having the second visual characteristic includes displaying multiple groups of icons at a second zoom level.

In some embodiments, the processing unit 1410 is further configured to receive (e.g., with the receiving unit 1414) input scrolling the plurality of groups of icons, and, in response to the input scrolling the plurality of groups of icons: in the first mode, scroll (e.g., with the display enabling unit 1412) the plurality of groups of icons in proportion to a magnitude of the input, and in the second mode, scroll (e.g., with the display enabling unit 1412) the plurality of groups of icons from a first group to a second group based on a determination that a magnitude of the input exceeds a threshold.

In some embodiments, the processing unit 1410 is further configured to receive additional input, and, in response to receiving the additional input: in the second mode, rearrange (e.g., with the display enabling unit 1412) one or more groups of icons based on the additional input.

In some embodiments, the processing unit 1410 is further configured to receive (e.g., with the receiving unit 1414) first user input to change from the first mode to the second mode, and receive (e.g., with the receiving unit 1414) second user input to change from the second mode to the first mode. In some embodiments, the first user input and the second user input are opposite inputs In some embodiments, the processing unit 1410 is further configured to receive (e.g., with the receiving unit 1414) input requesting adding an application, and, in response to receiving the input requesting adding the application, add (e.g., with the display enabling unit 1412) an icon associated with the application to a first group based on metadata of the application.

In some embodiments, the processing unit 1410 is further configured to receive (e.g., with the receiving unit 1414) input requesting adding an additional application, and, in response to receiving the input adding the additional application, add (e.g., with the display enabling unit 1412) an icon associated with the additional application to a second group based on metadata of the additional application.

In some embodiments, the processing unit 1410 is further configured to receive input requesting adding an application, and, in response to receiving the input requesting adding the application: in accordance with a determination that the application is in a first group, display (e.g., with the display enabling unit 1412) the application in a next available position in the first group; and in accordance with a determination that the application is in a second group, display (e.g., with the display enabling unit 1412) the application in a next available position in the second group.

In some embodiments, the plurality of icons include a first icon automatically grouped in a first group, and the processing unit 1410 is further configured to receive (e.g., with the receiving unit 1414) a request to move the first icon to a second group, and, in response to receiving the request, move (e.g., with the display enabling unit 1412) the first icon from the first group to the second group.

In some embodiments, the processing unit 1410 is further configured to receive (e.g., with the receiving unit 1414) a user request to add the first icon to a favorites group, and, in response to receiving the user request, associate the first icon with the favorites group. The processing unit 1410 is further configured to receive (e.g., with the receiving unit 1414) a request to display the first group; in response to receiving the request to display the first group, display (e.g., with the display enabling unit 1412) the first icon in the first group; receive (e.g., with the receiving unit 1414) a request to display the favorites group; and, in response to receiving the request to display the favorites group, display (e.g., with the display enabling unit 1412) the first icon in the favorites group.

In some embodiments, each group includes a grid of icons, each grid of icons having a number of columns that depends on a number of items in the associated group. In some embodiments, a first group of icons has a first number of columns based on a total number of icons in the first group, and a second group of icons has a second number of columns, different from the first number of columns, based on a total number of icons in the second group.

Figure 15:
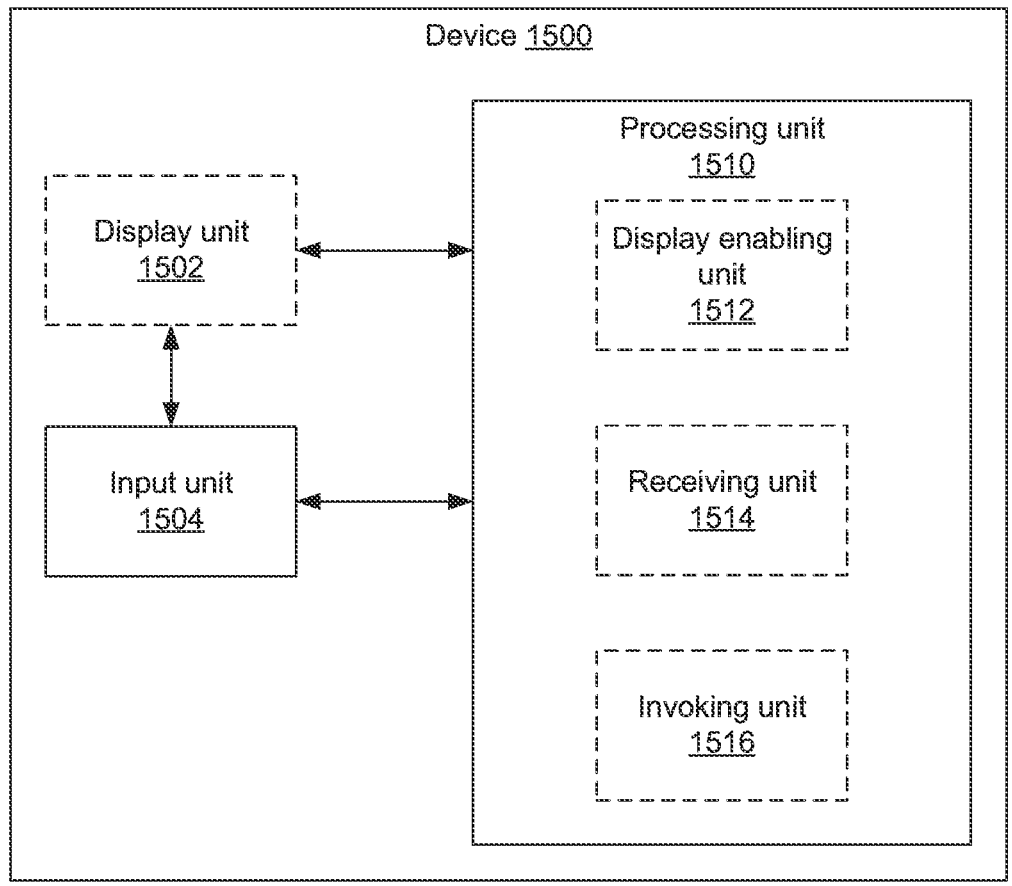

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 optionally includes a display unit 1502 configured to display a user interface including one or more user interface objects (e.g., icons associated with applications); an input unit 1504 to receive user input, selections, etc. (e.g., touch-sensitive surface, keyboard, mouse, or other input unit); and a processing unit 1510 coupled to the display unit 1502 and the input unit 1504. In some embodiments, the processing unit 1510 optionally includes a display enabling unit 1512, a receiving unit 1514, and an invoking unit 1516.

In some embodiments, the processing unit 1510 is configured to generate (e.g., with the display enabling unit 1512) for presentation on a display a first user interface of a first application. While the first user interface is presented on the display, the processing unit 1510 is further configured to receive (e.g., with the receiving unit 1514) a request to display an application switching user interface. In response to the request to display the application switching user interface, The processing unit 1510 is configured to generate for presentation on the display a second user interface including a plurality of user interface objects for switching between different applications, wherein a first user interface object of the plurality of user interface objects corresponds to the first application, the first user interface object includes a representation of a state of the first application, and the first user interface object is generated from images that are representative of content items available for presentation by the first application, wherein a first image of the images is not included in the first user interface of the first application.

In some embodiments, generating the second user interface includes: in accordance with a determination that the first application was recently accessed, generating (e.g., with the display enabling unit 1512) the first user interface object including representations of recently accessed content items; and in accordance with a determination that the first application was not recently accessed, generating (e.g., with the display enabling unit 1512) the first user interface object including representations of upcoming content items.

In some embodiments, generating the second user interface includes receiving (e.g., at the receiving unit 1514) a representation of a state of a corresponding application from the corresponding application.

In some embodiments, the first user interface object includes a representation of a first content item associated with the first application, and generating the second user interface further includes generating (e.g., with the display enabling unit 1512) a second user interface object of the plurality of user interface objects including a representation of a second content item associated with the first application.

In some embodiments, the processing unit 1510 is further configured to, while the second user interface is presented on the display, receive (e.g., with the receiving unit 1514) a selection of one of the plurality of user interface objects; in accordance with receiving a selection of the first user interface object, invoke (e.g., with the invoking unit 1516) the first application playing the first content item; and in accordance with receiving a selection of the second user interface object, invoke (e.g., with the invoking unit 1516) the first application playing the second content item.

In some embodiments, the second user interface includes a plurality of columns, two or more of the plurality of columns including the plurality of user interface objects, each representing a state of a corresponding application. In some embodiments, the first user interface object includes representations of a plurality of content items, and the first application is configured to play a single content item at a time.

Figure 16:
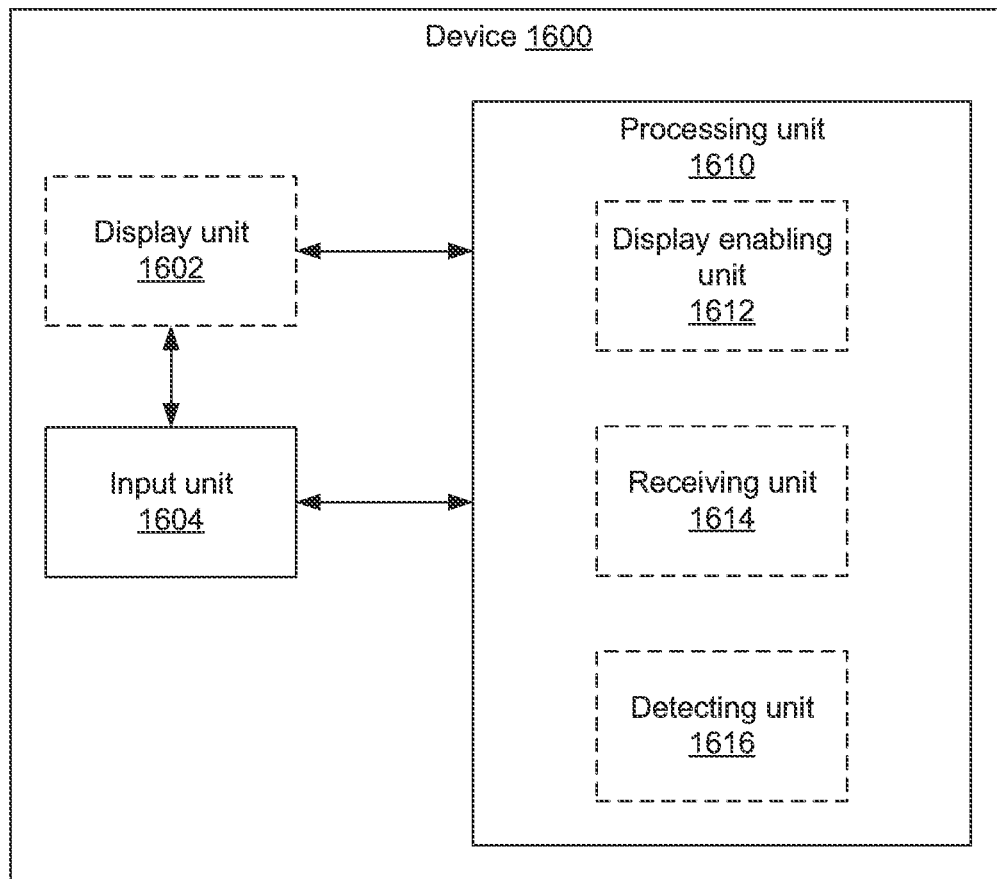

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 optionally includes a display unit 1602 configured to display a user interface including one or more user interface objects (e.g., icons associated with applications); an input unit 1604 to receive user input, selections, etc. (e.g., touch-sensitive surface, keyboard, mouse, or other input unit); and a processing unit 1610 coupled to the display unit 1602 and the input unit 1604. In some embodiments, the processing unit 1610 optionally includes a display enabling unit 1612, a receiving unit 1614, and a detecting unit 1616.

In some embodiments, the processing unit 1610 is configured to generate (e.g., with the display enabling unit 1612) for presentation on a display a two-dimensional array of a set of user interface objects, wherein the user interface objects are divided along a first axis into a plurality of groups, including a first group and a second group. The processing unit 1610 is further configured to, while the two-dimensional array is presented on the display, receive (e.g., with the receiving unit 1614) a request to change display of the set of user interface objects. The processing unit 1610 is further configured to, in response to the request, cease (e.g., with the display enabling unit 1612) to present the two-dimensional array and present (e.g., with the display enabling unit 1612) the user interface objects arranged in a one-dimensional array that preserves the grouping from the two-dimensional array.

In some embodiments, the processing unit 1610 is further configured to generate (e.g., with the display enabling unit 1612) for presentation on the display visual content, wherein the two-dimensional array is generated (e.g., with the display enabling unit 1612) for presentation over the visual content, the two-dimensional array obscuring a first portion of the visual content, and wherein the one-dimensional array is generated (e.g., with the display enabling unit 1612) for presentation over the visual content, the one-dimensional array obscuring a second portion of the visual content, smaller than the first portion of the visual content.

In some embodiments, the processing unit 1610 is further configured to generate (e.g., with the display enabling unit 1612) for presentation on the display a plurality of headings, including a first heading corresponding to the first group and a second heading corresponding to the second group, and scroll (e.g., with the display enabling unit 1612) the headings as the two-dimensional array is scrolled.

In some embodiments, the processing unit 1610 is further configured to generate (e.g., with the display enabling unit 1612) for presentation on the display a plurality of headings, including a first heading corresponding to the first group and a second heading corresponding to the second group, and scroll (e.g., with the display enabling unit 1612) the headings as the one-dimensional array is scrolled.

In some embodiments, the processing unit 1610 is further configured to, while the one-dimensional array and the plurality of headings are presented on the display, receive (e.g., with the receiving unit 1614) an additional request to change display of the set of user interface objects, and in response to the additional request, cease (e.g., with the display enabling unit 1612) to present the one-dimensional array and continue (e.g., with the display enabling unit 1612) to present the plurality of headings.

In some embodiments, the processing unit 1610 is further configure to, while the plurality of headings is presented on the display, receive (e.g., with the receiving unit 1614) a selection of the first heading, and, in response to the selection of the first heading, present (e.g., with the display enabling unit 1612) one or more user interface objects associated with the first group.

In some embodiments, receiving the selection of the first heading includes detecting (e.g., with the detecting unit 1616) touchdown of a first contact, and the processing unit 1610 is further configured to detect (e.g., with the detecting unit 1616) liftoff of the first contact, and, in response to detecting liftoff of the first contact, cease (e.g., with the display enabling unit 1612) to present the one or more user interface objects associated with the first group.

In some embodiments, the processing unit 1610 is further configured to, in accordance with a determination that the selection of the first heading is a tap gesture, present (e.g., with the display enabling unit 1612) the one or more user interface objects associated with the first group until further input is detected, and in accordance with a determination that the selection of the first heading is a hold gesture, cease (e.g., with the display enabling unit 1612) to present the one or more user interface objects associated with the first group in response to completion of the hold gesture.

In some embodiments, the processing unit 1610 is further configured to: while one or more user interface objects associated with the first group are presented on the display in the one-dimensional array, receive (e.g., with the receiving unit 1614) a swipe gesture having a first characteristic; in accordance with a determination that the first characteristic of the swipe gesture exceeds a predetermined threshold, scroll (e.g., with the display enabling unit 1612) the one-dimensional array such that one or more user interface objects associated with the second group are presented on the display; and in accordance with a determination that the first characteristic of the swipe gesture does not exceed a predetermined threshold, scroll (e.g., with the display enabling unit 1612) the one-dimensional array a distance based on the first characteristic.

In some embodiments, the processing unit 1610 is further configured to receive (e.g., with the receiving unit 1614) a swipe gesture, and, in accordance with the swipe gesture being received while the two-dimensional array is presented on the display, scroll (e.g., with the display enabling unit 1612) the two-dimensional array including scrolling the first group visually distinguished from the second group. In some embodiments, the processing unit 1610 is further configured to, in accordance with the swipe gesture being received while the one-dimensional array is presented on the display, scroll (e.g., with the display enabling unit 1612) the one-dimensional array along an edge of the display.

Figure 17:
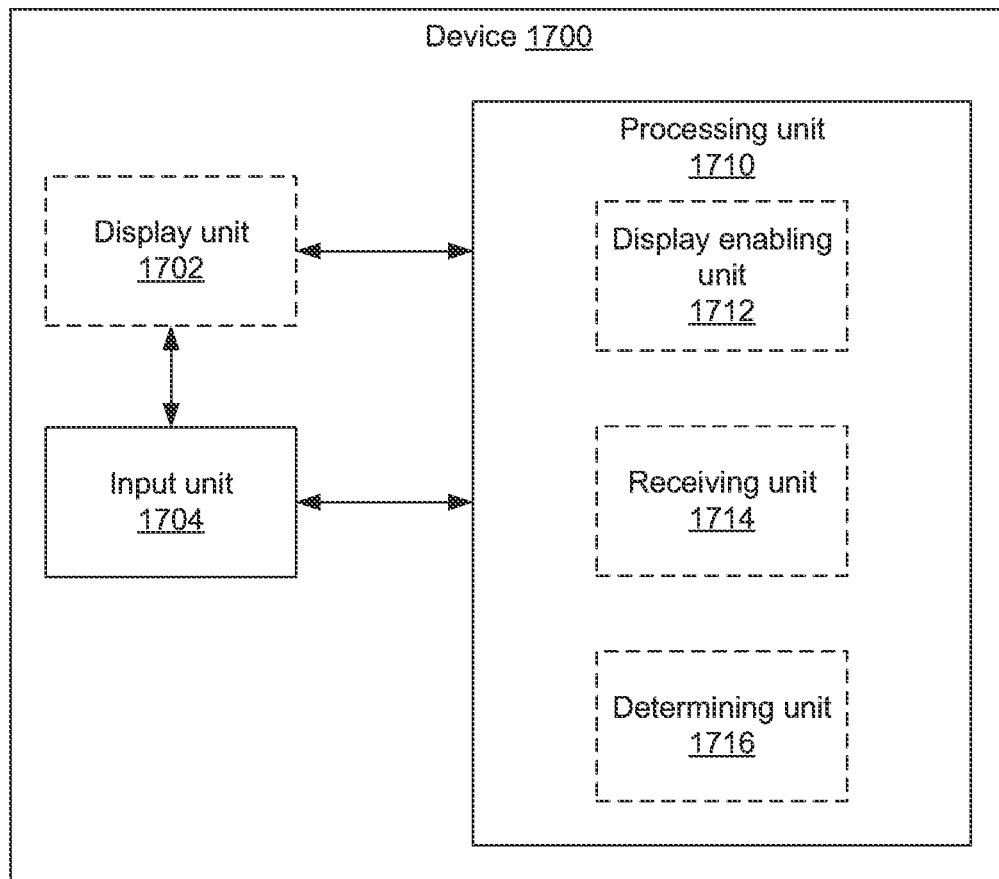

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 optionally includes a display unit 1702 configured to display a user interface including one or more user interface objects (e.g., icons associated with applications); an input unit 1704 to receive user input, selections, etc. (e.g., touch-sensitive surface, keyboard, mouse, or other input unit); and a processing unit 1710 coupled to the display unit 1702 and the input unit 1704. In some embodiments, the processing unit 1710 optionally includes a display enabling unit 1712, a receiving unit 1714, and a determining unit 1716.

In some embodiments, the processing unit 1710 is configured to generate (e.g., with the display enabling unit 1712) for presentation on a display a user interface. The processing unit 1710 is further configured to, while the user interface is presented on the display, receive (e.g., with the receiving unit 1714) input including a first input portion, the first input portion being included in both a first gesture associated with a first user interface response and a second gesture associated with a second user interface response different from the first user interface response. The processing unit 1710 is further configured to, in response to receiving the first input portion and prior to determining whether first gesture criteria have been met, generate (e.g., with the display enabling unit 1712) for presentation on the display a first animation portion in the user interface, the first animation portion corresponding to both the first user interface response and the second user interface response. The processing unit 1710 is further configured to, after generating the first animation portion and in accordance with a determination that the first gesture criteria have been met, use the first animation portion (e.g., with the display enabling unit 1712) to transition to presenting the first user interface response on the display.

In some embodiments, using the first animation portion to transition to presenting the first user interface response includes presenting (e.g., with the display enabling unit 1712) a second animation portion in the user interface following the first animation portion, the first and second animation portions corresponding to the first user interface response. In some embodiments, the first animation portion and the second animation portion are part of a single, continuous animation.

In some embodiments, the input further includes a second input portion, the second input portion being included in the second gesture and not the first gesture, and the processing unit 1710 is further configured to, after generating the first animation portion and in accordance with a determination that second gesture criteria have been met, present (e.g., with the display enabling unit 1712) a third animation portion in the user interface following the first animation portion, the first and third animation portions corresponding to the second user interface response on the display. In some embodiments, the first animation portion and the third animation portion are part of a single, continuous animation that corresponds to the second user interface response and is different from an animation corresponding to the first user interface response.

In some embodiments, the processing unit 1710 is further configured to receive (e.g., with the receiving unit 1714) additional input following the first input portion, and determine (e.g., with the determining unit 1716) that the additional input corresponds to a gesture that is not a continuation of the first input portion, wherein the first gesture criteria include a criterion that is met in accordance with determining that the additional input corresponds to a gesture that is not a continuation of the first input portion.

In some embodiments, the first gesture criteria include a criterion that is met when an amount of time that has elapsed since the first input portion was detected exceeds a threshold.

In some embodiments, the first user interface response includes displaying (e.g., with the display enabling unit 1712) an application menu that includes a single row of icons, the second user interface response includes displaying (e.g., with the display enabling unit 1712) an application menu that includes a multi-column, multi-row array of icons, and the first animation portion includes presenting (e.g., with the display enabling unit 1712) the single row of icons on the display, which is also a row of icons from the multi-column, multi-row array of icons.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device with one or more processors and memory:

displaying, on a display, a user interface in a first state;

while the user interface is displayed on the display, receiving, via one or more input devices, input including a first input portion, the first input portion being included in both a first gesture associated with a first user interface response and a second gesture associated with a second user interface response different from the first user interface response, wherein the first user interface response results in the user interface being in a second state and the second user interface response results in the user interface being in a third state, and the first state, the second state and the third state are different states;

in response to receiving the first input portion and prior to determining whether first gesture criteria or second gesture criteria have been met, displaying, on the display, a first animation portion in the user interface, the first animation portion corresponding to both the first user interface response and the second user interface response; and after displaying the first animation portion:

in accordance with a determination that the first gesture criteria have been met, including a criterion that is satisfied when the first input portion is followed by a second input portion that is included in the first gesture and not the second gesture, using the first animation portion to transition to displaying the first user interface response on the display; and in accordance with a determination that the second gesture criteria have been met, including a criterion that is satisfied when the first input portion is followed by a third input portion that is included in the second gesture and not the first gesture, using the first animation portion to transition to displaying the second user interface response on the display, without displaying the first user interface response on the display.

2. The method of claim 1, wherein using the first animation portion to transition to presenting the first user interface response includes presenting a second animation portion in the user interface following the first animation portion, the first and second animation portions corresponding to the first user interface response, and using the first animation portion to transition to displaying the second user interface response includes presenting a third animation portion in the user interface following the first animation portion.

3. The method of claim 2, wherein the first animation portion and the second animation portion are part of a single, continuous animation, and the first animation portion and the third animation portion are part of a single, continuous animation that is different from the single, continuous animation corresponding to the first user interface response.

4. The method of claim 1, further comprising:

receiving additional input following the first input portion; and determining that the additional input corresponds to a gesture that is not a continuation of the first input portion;

wherein the first gesture criteria include a criterion that is met in accordance with determining that the additional input corresponds to a gesture that is not a continuation of the first input portion.

5. The method of claim 1, wherein the first gesture criteria include a criterion that is met when an amount of time that has elapsed since the first input portion was detected exceeds a threshold.

6. The method of claim 1, wherein:

the first user interface response includes displaying an application menu that includes a single row of icons;

the second user interface response includes displaying an application menu that includes a multi-column, multi-row array of icons; and the first animation portion includes displaying the single row of icons on the display, which is also a row of icons included in the multi-column, multi-row array of icons.

7. An electronic device, comprising:

one or more processors;

memory; and one or more programs, wherein the one or more programs are stored in the memory and configured to be executed by the one or more processors, the one or more programs including instructions for:

displaying, on a display, a user interface in a first state;

while the user interface is displayed on the display, receiving, via one or more input devices, input including a first input portion, the first input portion being included in both a first gesture associated with a first user interface response and a second gesture associated with a second user interface response different from the first user interface response, wherein the first user interface response results in the user interface being in a second state and the second user interface response results in the user interface being in a third state, and the first state, the second state and the third state are different states;

in response to receiving the first input portion and prior to determining whether first gesture criteria or second gesture criteria have been met, displaying, on the display, a first animation portion in the user interface, the first animation portion corresponding to both the first user interface response and the second user interface response; and after displaying the first animation portion:

in accordance with a determination that the first gesture criteria have been met, including a criterion that is satisfied when the first input portion is followed by a second input portion that is included in the first gesture and not the second gesture, using the first animation portion to transition to displaying the first user interface response on the display; and in accordance with a determination that the second gesture criteria have been met, including a criterion that is satisfied when the first input portion is followed by a third input portion that is included in the second gesture and not the first gesture, using the first animation portion to transition to displaying the second user interface response on the display, without displaying the first user interface response on the display.

8. The electronic device of claim 7, wherein using the first animation portion to transition to presenting the first user interface response includes presenting a second animation portion in the user interface following the first animation portion, the first and second animation portions corresponding to the first user interface response, and using the first animation portion to transition to displaying the second user interface response includes presenting a third animation portion in the user interface following the first animation portion.

9. The electronic device of claim 8, wherein the first animation portion and the second animation portion are part of a single, continuous animation, and the first animation portion and the third animation portion are part of a single, continuous animation that is different from the single, continuous animation corresponding to the first user interface response.

10. The electronic device of claim 7, the one or more programs further including instructions for:
receiving additional input following the first input portion; and
determining that the additional input corresponds to a gesture that is not a continuation of the first input portion;
wherein the first gesture criteria include a criterion that is met in accordance with determining that the additional input corresponds to a gesture that is not a continuation of the first input portion.

11. The electronic device of claim 7, wherein the first gesture criteria include a criterion that is met when an amount of time that has elapsed since the first input portion was detected exceeds a threshold.

12. The electronic device of claim 7, wherein:
the first user interface response includes displaying an application menu that includes a single row of icons;
the second user interface response includes displaying an application menu that includes a multi-column, multi-row array of icons; and
the first animation portion includes displaying the single row of icons on the display, which is also a row of icons included in the multi-column, multi-row array of icons.

13. A non-transitory computer readable storage medium storing one or more programs, the one or more programs comprising instructions, which when executed by an electronic device with one or more processors and memory, cause the device to:
display, on a display, a user interface in a first state;
while the user interface is displayed on the display, receive, via one or more input devices, input including a first input portion, the first input portion being included in both a first gesture associated with a first user interface response and a second gesture associated with a second user interface response different from the first user interface response, wherein the first user interface response results in the user interface being in a second state and the second user interface response results in the user interface being in a third state, and the first state, the second state and the third state are different states;
in response to receiving the first input portion and prior to determining whether first gesture criteria or second gesture criteria have been met, display, on the display, a first animation portion in the user interface, the first animation portion corresponding to both the first user interface response and the second user interface response; and
after displaying the first animation portion:
in accordance with a determination that the first gesture criteria have been met, including a criterion that is satisfied when the first input portion is followed by a second input portion that is included in the first gesture and not the second gesture, use the first animation portion to transition to displaying the first user interface response on the display; and
in accordance with a determination that the second gesture criteria have been met, including a criterion that is satisfied when the first input portion is followed by a third input portion that is included in the second gesture and not the first gesture, use the first animation portion to transition to displaying the second user interface response on the display, without displaying the first user interface response on the display.

14. The non-transitory computer readable storage medium of claim 13, wherein using the first animation portion to transition to presenting the first user interface response includes presenting a second animation portion in the user interface following the first animation portion, the first and second animation portions corresponding to the first user interface response, and using the first animation portion to transition to displaying the second user interface response includes presenting a third animation portion in the user interface following the first animation portion.

15. The non-transitory computer readable storage medium of claim 14, wherein the first animation portion and the second animation portion are part of a single, continuous animation, and the first animation portion and the third animation portion are part of a single, continuous animation that is different from the single, continuous animation corresponding to the first user interface response.

16. The non-transitory computer readable storage medium of claim 13, wherein the one or more programs further comprising instructions for:
receiving additional input following the first input portion; and
determining that the additional input corresponds to a gesture that is not a continuation of the first input portion;
wherein the first gesture criteria include a criterion that is met in accordance with determining that the additional input corresponds to a gesture that is not a continuation of the first input portion.

17. The non-transitory computer readable storage medium of claim 13, wherein the first gesture criteria include a criterion that is met when an amount of time that has elapsed since the first input portion was detected exceeds a threshold.

18. The non-transitory computer readable storage medium of claim 13, wherein:
the first user interface response includes displaying an application menu that includes a single row of icons;
the second user interface response includes displaying an application menu that includes a multi-column, multi-row array of icons; and
the first animation portion includes displaying the single row of icons on the display, which is also a row of icons included in the multi-column, multi-row array of icons.

* * * * *